US012543889B2

(12) United States Patent
Hyde et al.

(10) Patent No.: US 12,543,889 B2
(45) Date of Patent: Feb. 10, 2026

(54) TRANSVERSELY-LOADABLE ROTISSERIE BASKETS FOR GRILLS

(71) Applicant: Weber-Stephen Products LLC, Palatine, IL (US)

(72) Inventors: Christian Hyde, Schaumburg, IL (US); Daniel Ramirez, Des Plaines, IL (US); Robert Farmer, Naperville, IL (US); Romualdo Sonny Siazon, Woodstock, IL (US); Brian C. Donnelly, Naperville, IL (US); Cassandra A.S. McVey, Palatine, IL (US); Shannon Ella Cerny, Aurora, IL (US); Michelle Stohl, Glenview, IL (US)

( * ) Notice: Subject to any disclaimer, the term of this patent is extended or adjusted under 35 U.S.C. 154(b) by 919 days.

(21) Appl. No.: 17/834,715

(22) Filed: Jun. 7, 2022

(65) Prior Publication Data

US 2023/0044392 A1 Feb. 9, 2023

Related U.S. Application Data

(60) Provisional application No. 63/203,925, filed on Aug. 4, 2021.

(51) Int. Cl.
*A47J 37/04* (2006.01)
*A47J 37/07* (2006.01)

(52) U.S. Cl.
CPC ........... *A47J 37/047* (2013.01); *A47J 37/041* (2013.01); *A47J 37/0786* (2013.01)

(58) Field of Classification Search
CPC ..... A47J 37/047; A47J 37/041; A47J 37/0786
USPC ........................................................ 99/421 H
See application file for complete search history.

(56) References Cited

U.S. PATENT DOCUMENTS

| | | | |
|---|---|---|---|
| 2,762,293 | A | 9/1956 | Boyajian |
| 2,882,812 | A | 4/1959 | Greenwald |
| 3,104,605 | A | 9/1963 | McKinney |
| 3,126,814 | A | 3/1964 | Brown |
| 4,334,516 | A | 6/1982 | Dittmer et al. |
| 4,403,595 | A | 9/1983 | Maesk |
| 4,483,241 | A | 11/1984 | Vaughn |

(Continued)

FOREIGN PATENT DOCUMENTS

| | | |
|---|---|---|
| EP | 1769710 | 9/2008 |
| EP | 2857757 | 3/2017 |

(Continued)

OTHER PUBLICATIONS

Weber mesh Rotisserie Basket (Year: 2017).*

(Continued)

*Primary Examiner* — Ibrahime A Abraham
*Assistant Examiner* — Solan Oliva
(74) *Attorney, Agent, or Firm* — Avantech Law, LLP

(57) ABSTRACT

Example transversely-loadable rotisserie baskets are disclosed. An example rotisserie basket includes a base and a lid coupled to the base. The lid is movable relative to the base between an open position and a closed position. The example rotisserie basket further includes a first mounting bracket coupled to a first side of the base, and a second mounting bracket coupled to a second side of the base located opposite the first side of the base. The first mounting bracket and the second mounting bracket are respectively configured to be transversely loadable onto a rotisserie spit.

20 Claims, 42 Drawing Sheets

(56) References Cited

U.S. PATENT DOCUMENTS

| | | | |
|---|---|---|---|
| 4,688,477 | A | 8/1987 | Waltman |
| 5,001,971 | A | 3/1991 | Beller |
| 5,224,676 | A | 7/1993 | Johnston |
| 5,445,064 | A | 8/1995 | Lopata |
| 5,471,915 | A | 12/1995 | Lopata |
| 5,473,977 | A | 12/1995 | Koether et al. |
| 5,715,744 | A | 2/1998 | Coutant |
| 6,047,633 | A | 4/2000 | Khaytman |
| 6,138,553 | A | 10/2000 | Toebben |
| 6,170,390 | B1 | 1/2001 | Backus et al. |
| 6,173,645 | B1 | 1/2001 | Backus et al. |
| 6,253,665 | B1 | 7/2001 | Backus et al. |
| 6,330,853 | B1 | 12/2001 | Yu |
| 6,347,577 | B1 | 2/2002 | Harneit |
| 6,354,195 | B1 | 3/2002 | Huang |
| 6,367,373 | B2 | 4/2002 | Bargman |
| 6,408,742 | B1 | 6/2002 | Backus et al. |
| 6,439,109 | B1 | 8/2002 | Rehill |
| 6,450,087 | B2 | 9/2002 | Backus et al. |
| 6,536,334 | B2 | 3/2003 | Backus et al. |
| 6,561,083 | B2 | 5/2003 | Hsu |
| 6,568,315 | B2 | 5/2003 | Backus et al. |
| 6,568,316 | B1 | 5/2003 | Backus et al. |
| 6,595,119 | B1 | 7/2003 | Cheung |
| 6,634,281 | B1 | 10/2003 | Conigliaro |
| 6,837,151 | B2 | 1/2005 | Chen |
| 6,965,095 | B1 | 11/2005 | Popeil et al. |
| 7,036,426 | B2 | 5/2006 | Cheung |
| 7,138,609 | B2 | 11/2006 | Popeil et al. |
| 7,475,629 | B2 | 1/2009 | Turatti |
| 7,487,716 | B2 | 2/2009 | Swank et al. |
| 7,500,428 | B2 | 3/2009 | Backus et al. |
| 7,514,651 | B2 | 4/2009 | Popeil et al. |
| 7,823,502 | B2 | 11/2010 | Hecker et al. |
| 8,017,167 | B2 | 9/2011 | Backus et al. |
| D650,228 | S | 12/2011 | Gardner |
| 8,122,817 | B2 | 2/2012 | Nimerovskiy |
| 8,850,966 | B2 | 10/2014 | Dondurur et al. |
| 9,022,047 | B2 | 5/2015 | Cantrell et al. |
| D740,069 | S | 10/2015 | Nichols et al. |
| D749,358 | S | 2/2016 | Hyp et al. |
| D749,900 | S | 2/2016 | Hyp |
| 9,603,485 | B2 | 3/2017 | Hopkins et al. |
| 9,603,486 | B2 | 3/2017 | James |
| 9,610,803 | B2 | 4/2017 | Schlanger |
| 9,820,608 | B2 | 11/2017 | Kessell |
| 9,993,109 | B2 | 6/2018 | Brown |
| 10,045,661 | B2 | 8/2018 | Mollet |
| 10,136,760 | B2 | 11/2018 | Markussen et al. |
| 10,638,877 | B2 | 5/2020 | Kessell |
| 10,800,206 | B2 | 10/2020 | Chang |
| 2003/0101877 | A1 | 6/2003 | Backus et al. |
| 2006/0290155 | A1* | 12/2006 | Smith .................. B36D 296/29 |
| 2009/0277339 | A1 | 11/2009 | Andrade |
| 2014/0216271 | A1 | 8/2014 | Arling et al. |
| 2017/0007071 | A1* | 1/2017 | Zvi Lavie ............. A46J 37/041 |
| 2017/0055768 | A1 | 3/2017 | Brown |
| 2018/0263414 | A1 | 9/2018 | Mansueto et al. |
| 2018/0317703 | A1 | 11/2018 | Khachatrian |
| 2019/0038074 | A1 | 2/2019 | Maraggi |
| 2019/0082883 | A1 | 3/2019 | Jones et al. |
| 2019/0208958 | A1 | 7/2019 | Zhang |
| 2019/0239686 | A1 | 8/2019 | Mansueto et al. |
| 2020/0288910 | A1 | 9/2020 | Broadrick et al. |
| 2021/0315418 | A1* | 10/2021 | Pruitt ...................... A47J 37/04 |

FOREIGN PATENT DOCUMENTS

| | | |
|---|---|---|
| EP | 3476261 | 5/2019 |
| FR | 2809945 B3 | 4/2002 |
| FR | 2949655 | 8/2013 |
| KR | 20000009297 | 2/2000 |
| KR | 101874249 | 7/2018 |
| WO | 2014120239 A1 | 8/2014 |

OTHER PUBLICATIONS

Australian Government, IP Australia, “Notice of Acceptance,” issued in connection with Australian Patent Application No. 2022322742, dated Apr. 7, 2025, 3 pages.

International Bureau, “International Preliminary Report on Patentability,” issued in connection with International Patent Application No. PCT/US2022/033791, mailed Feb. 15, 2024, 6 pages.

European Patent Office, “Extended European Search Report,” issued in connection with European Patent Application No. 22853668.6, dated Apr. 7, 2025, 6 pages.

Canadian Intellectual Property Office, “Office Action No. 1,” issued in connection with Canadian Patent Application No. 3,223,480, dated Apr. 11, 2025, 4 pages.

International Searching Authority, “International Search Report and Written Opinion,” issued in connection with International Patent Application No. PCT/US2022/033789, mailed Oct. 7, 2022, 9 pages.

International Searching Authority, “International Search Report and Written Opinion,” issued in connection with International Patent Application No. PCT/US2022/033791, mailed Oct. 11, 2022, 9 pages.

International Searching Authority, “International Search Report and Written Opinion,” issued in connection with International Patent Application No. PCT/US2022/033795, mailed Oct. 7, 2022, 9 pages.

Australian Government, IP Australia, “Examination Report No. 1,” issued in connection with Australian Patent Application No. 2022322742, dated Jan. 16, 2025, 4 pages.

* cited by examiner

TRANSVERSELY-LOADABLE ROTISSERIE BASKETS FOR GRILLS

RELATED APPLICATIONS

This application claims priority to U.S. Provisional Patent Application No. 63/203,925, filed Aug. 4, 2021. The entirety of U.S. Provisional Patent Application No. 63/203,925 is hereby incorporated by reference herein.

FIELD OF THE DISCLOSURE

This disclosure relates generally to rotisserie baskets and, more specifically, to transversely-loadable rotisserie baskets for grills.

BACKGROUND

Rotisserie baskets are routinely used in connection with grills (e.g., gas grills, charcoal grills, electric grills, etc.) to facilitate rotisserie-style cooking of one or more food item (s) (e.g., vegetables, french fries, chicken wings, shrimp, etc.) within the grill. Known rotisseries baskets typically have a cylindrical or tubular shape formed by a metal lattice (e.g., a metal screen or a wire mesh) that is configured to retain food items within an interior of the rotisserie basket while also enabling heated air to pass from an exterior of the rotisserie basket into the interior of the rotisserie basket. Such known rotisserie baskets are typically structured such that food items can be loaded into or removed from the interior of the rotisserie basket either by opening an access door formed within a portion of the rotisserie basket, or by separating one portion of the rotisserie basket from another portion of the rotisserie basket (e.g., separating an upper portion from a lower portion).

Known rotisserie baskets also typically include a pair of mounting brackets having a centrally-located lateral (e.g., axial) passageway extending therethrough. The lateral passageway is configured to receive and/or accommodate the cross-sectional area of a rotisserie spit. In this regard, known rotisserie baskets are configured to be attached to a rotisserie spit by (1) removing the rotisserie spit from its supported position on and/or within a cookbox of a grill, (2) loading the rotisserie basket onto an end of the rotisserie spit such that the lateral passageway of the mounting brackets of the rotisserie basket is coaxially aligned with a longitudinal axis of the rotisserie spit, (3) sliding the rotisserie basket along the longitudinal axis of the rotisserie spit until the rotisserie basket reaches a desired position (e.g., typically a centralized position) on the rotisserie spit, and (4) replacing the rotisserie spit in its supported position on and/or within the cookbox of the grill. In some instances, the performance of steps (1) and (4) requires detaching and/or attaching one end of the rotisserie spit to a motor of a rotisserie cooking system of the grill, whereby the motor is configured to rotate the rotisserie spit (e.g., about the longitudinal axis of the rotisserie spit) within the cookbox of the grill. Detaching and/or removing such known rotisserie baskets from a rotisserie spit involves a reversal of the aforementioned four-step process.

Figure 1:
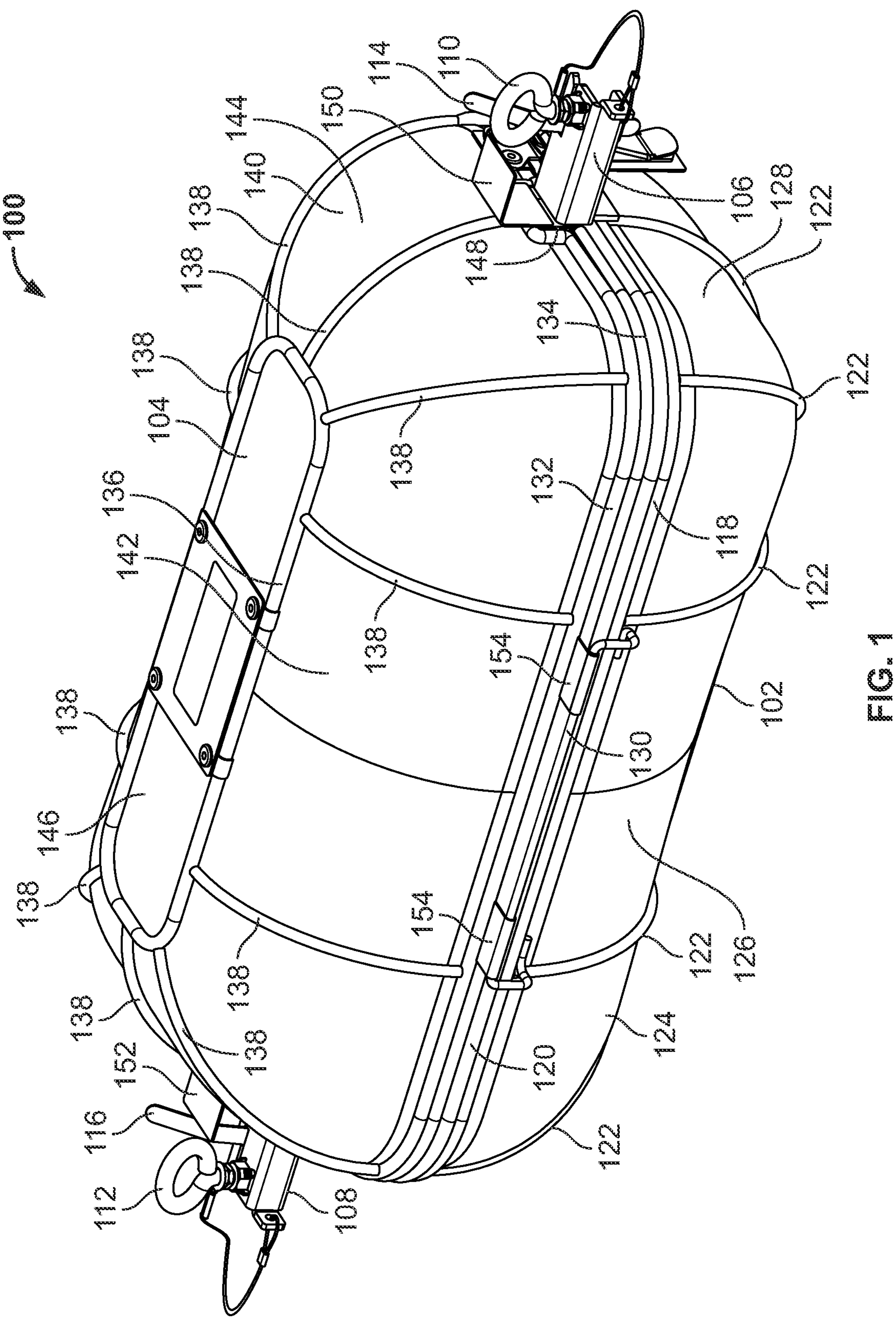
FIG. 1 is a first perspective view of an example rotisserie basket constructed in accordance with teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Known rotisserie baskets are configured to be attached to a rotisserie spit by (1) removing the rotisserie spit from its supported position on and/or within a cookbox of a grill, (2) loading the rotisserie basket onto an end of the rotisserie spit such that the lateral passageway of the mounting brackets of the rotisserie basket are coaxially aligned with a longitudinal axis of the rotisserie spit, (3) sliding the rotisserie basket along the longitudinal axis of the rotisserie spit until the rotisserie basket reaches a desired position (e.g., typically a centralized position) on the rotisserie spit, and (4) replacing the rotisserie spit in its supported position on and/or within the cookbox of the grill. In some instances, the performance of steps (1) and (4) is further complicated by requiring that one end of the rotisserie spit be detached and/or attached to a motor of a rotisserie cooking system of the grill, whereby the motor is configured to rotate the rotisserie spit (e.g., about the longitudinal axis of the rotisserie spit) within the cookbox of the grill. Detaching and/or removing such known rotisserie baskets from a rotisserie spit involves a reversal of the aforementioned four-step process. Performing such a four-step process can often be difficult for an end user and, at a minimum, is undesirably time consuming.

Unlike known rotisserie baskets that are configured to be longitudinally loaded onto a rotisserie spit, example rotisserie baskets disclosed herein are advantageously configured to be transversely loaded onto a rotisserie spit. By comparison to the above-described four-step process associated with longitudinally loading known rotisserie baskets onto a rotisserie spit, example rotisserie baskets disclosed herein can advantageously be transversely loaded onto (and transversely unloaded from) a rotisserie spit without removing the rotisserie spit from its supported position on and/or within a cookbox of a grill, without having to thread the rotisserie basket onto an end of the rotisserie spit, and without having to slide the rotisserie basket along a longitudinal axis of the rotisserie spit to a desired position. These advantages attributed to the transversely-loadable nature of the example rotisserie baskets disclosed herein provide a user experience that is drastically improved relative to the user experience associated with known rotisserie baskets that are only capable of being longitudinally loaded onto a rotisserie spit.

The above-identified features as well as other advantageous features of example transversely-loadable rotisserie baskets as disclosed herein are further described below in connection with the figures of the application. As used herein, the term "configured" means sized, shaped, arranged, structured, oriented, positioned and/or located. For example, in the context of a first object configured to fit within a second object, the first object is sized, shaped, arranged, structured, oriented, positioned and/or located to fit within the second object. As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary. For example, a plurality of trees can circumscribe a field.

Figure 2:
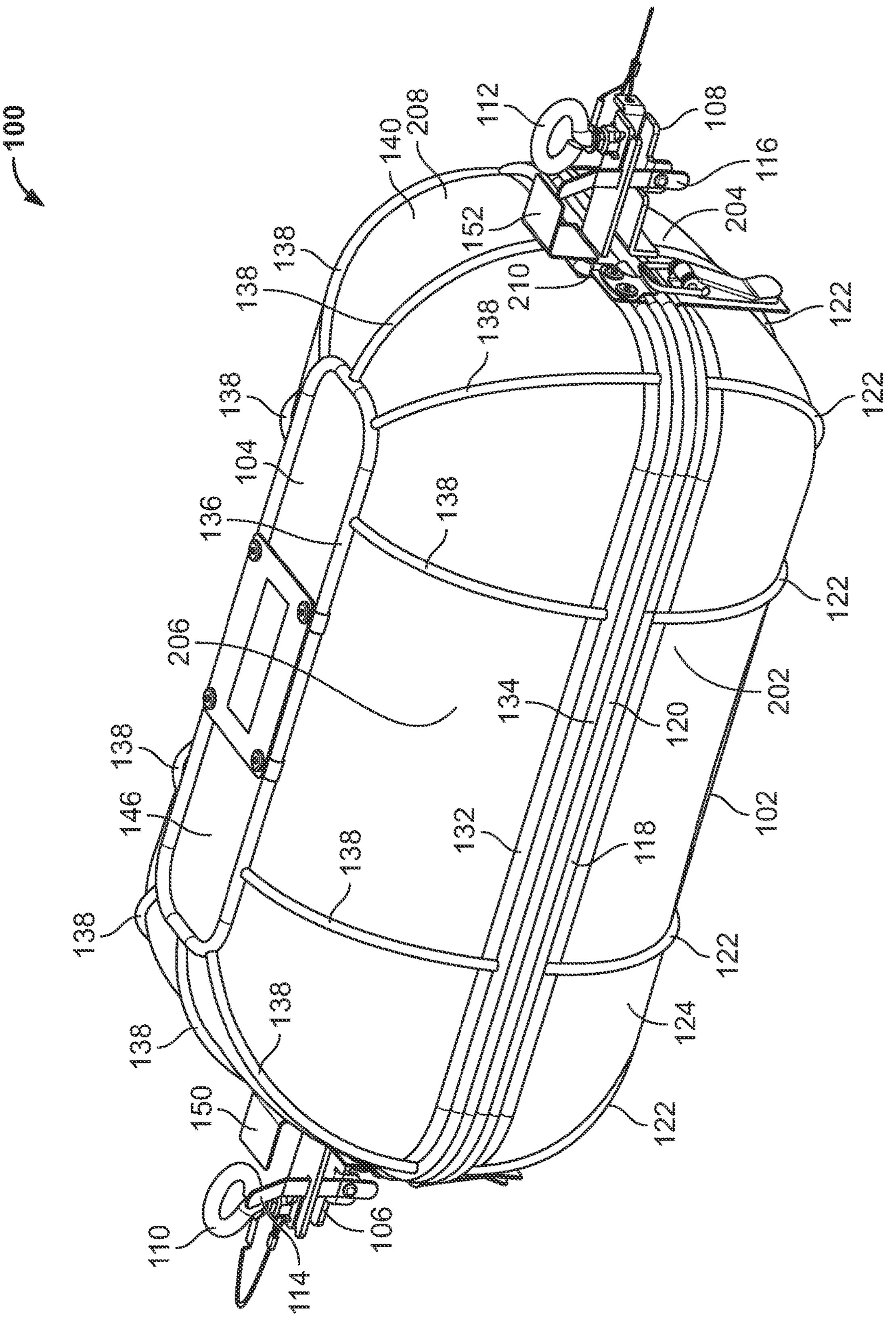
FIG. 2 is a second perspective view of the rotisserie basket of FIG. 1.
Figure 3:
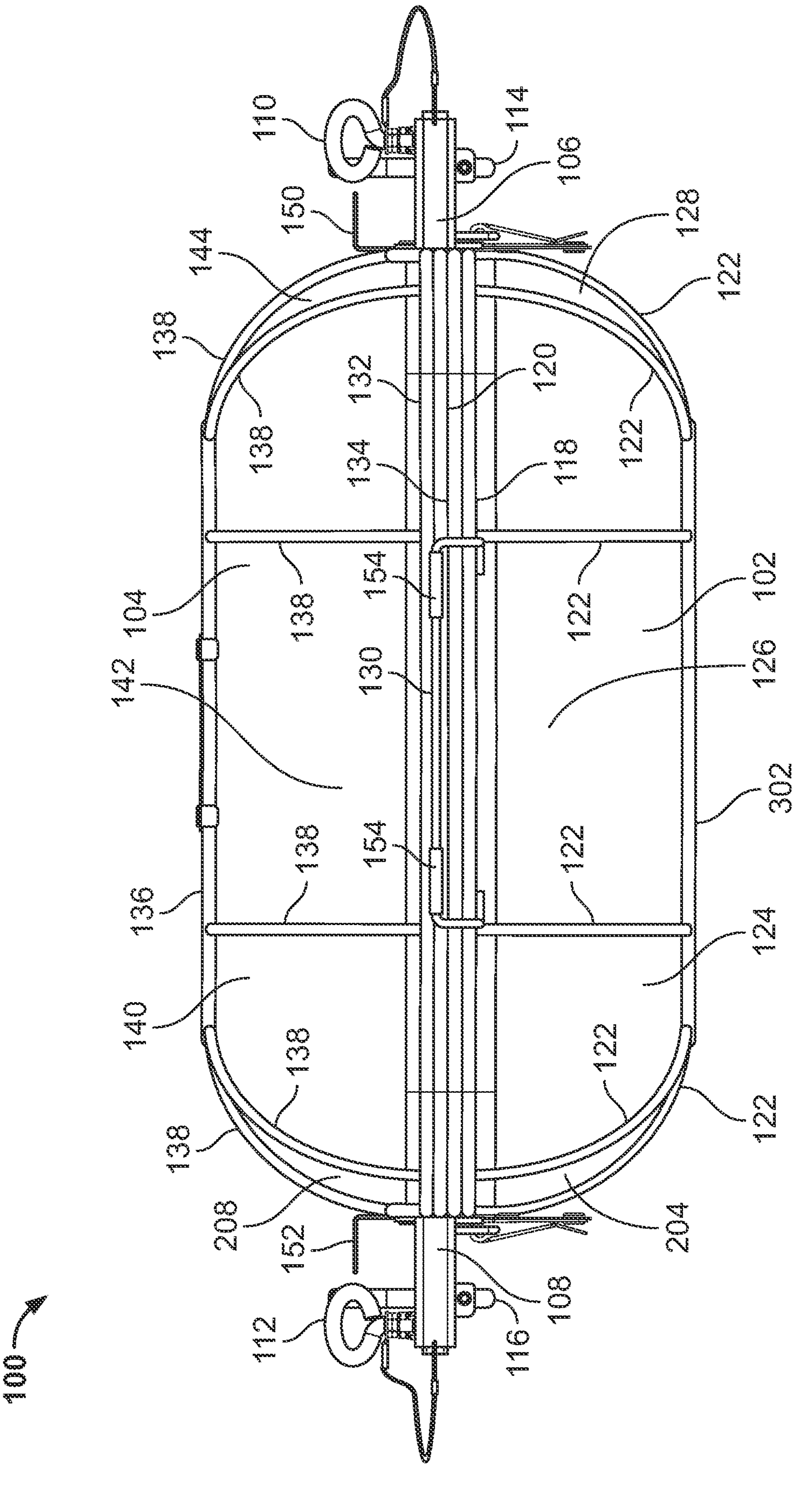
FIG. 3 is a front view of the rotisserie basket of FIGS. 1 and 2.
Figure 4:
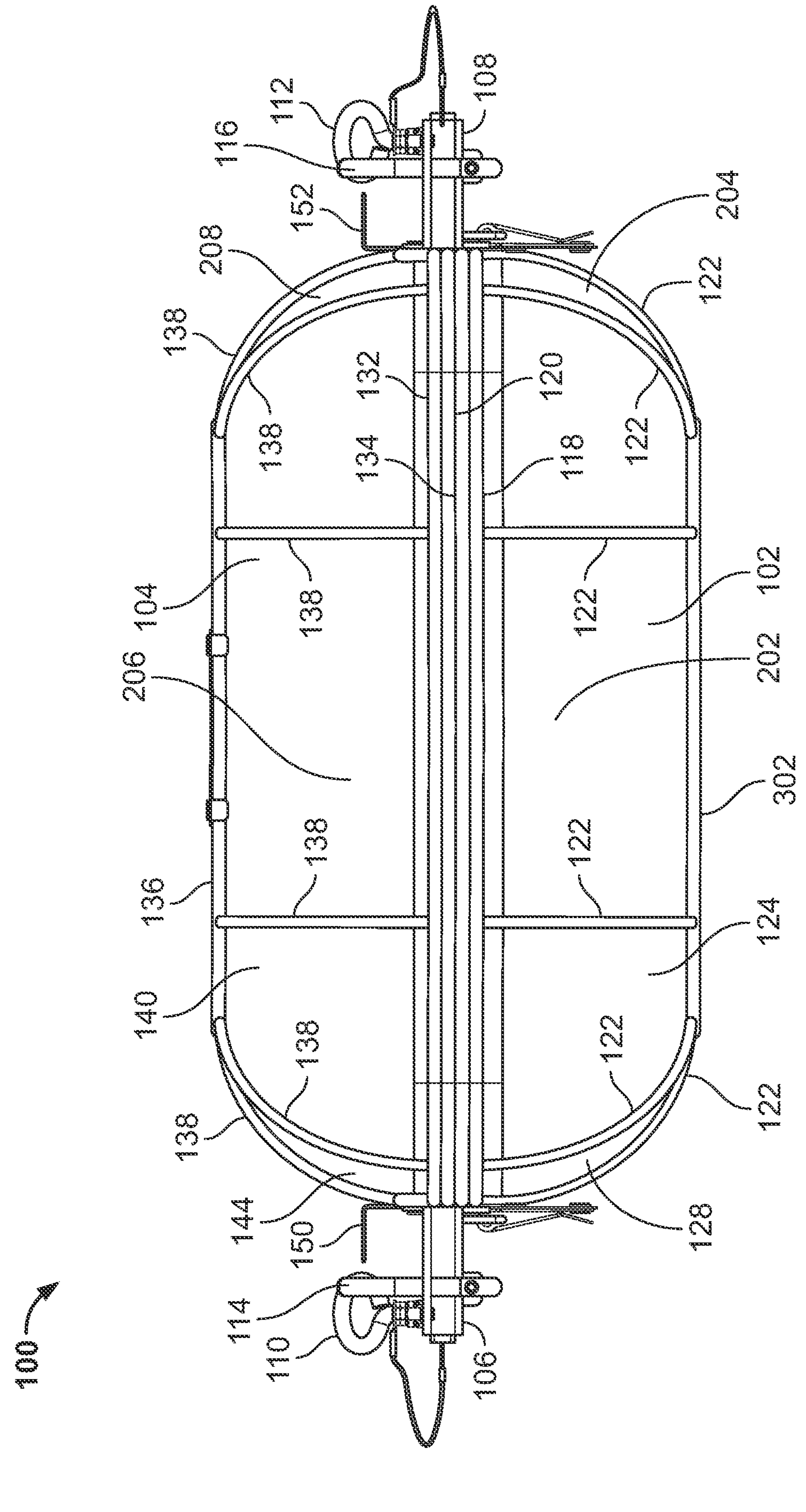
FIG. 4 is a rear view of the rotisserie basket of FIGS. 1-3.
Figure 5:
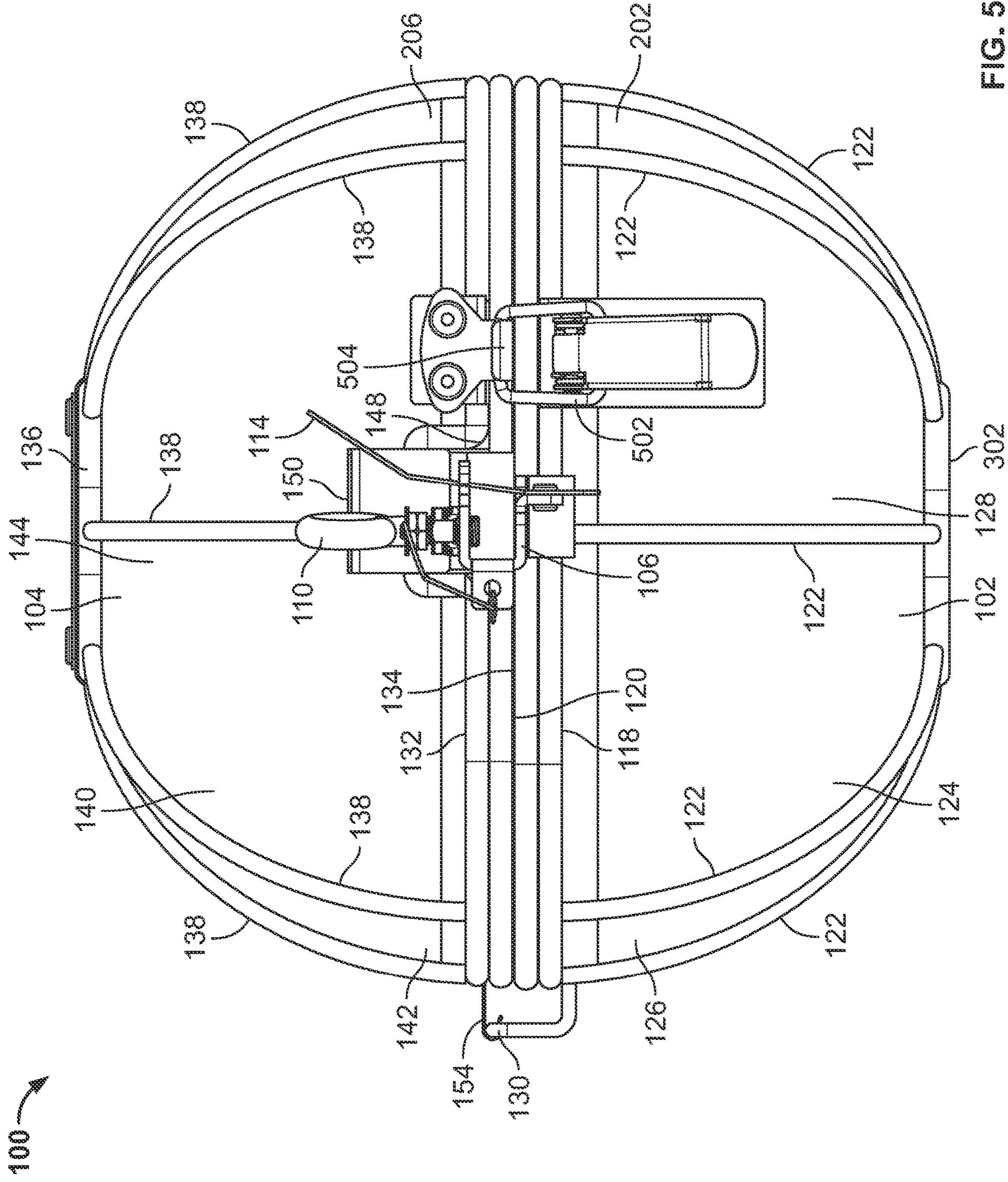
FIG. 5 is a right side view of the rotisserie basket of FIGS. 1-4.
Figure 6:
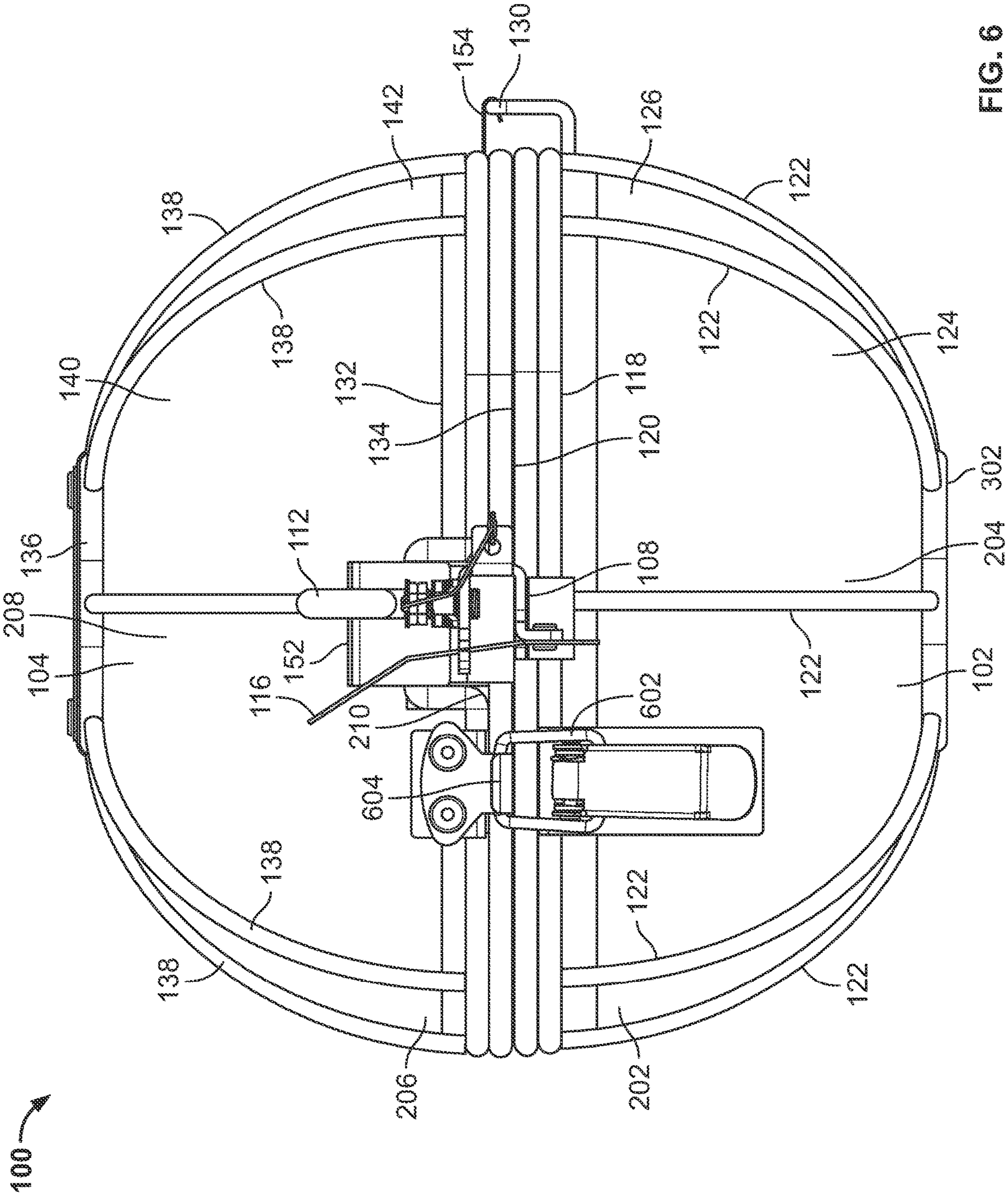
FIG. 6 is a left side view of the rotisserie basket of FIGS. 1-5.
Figure 7:
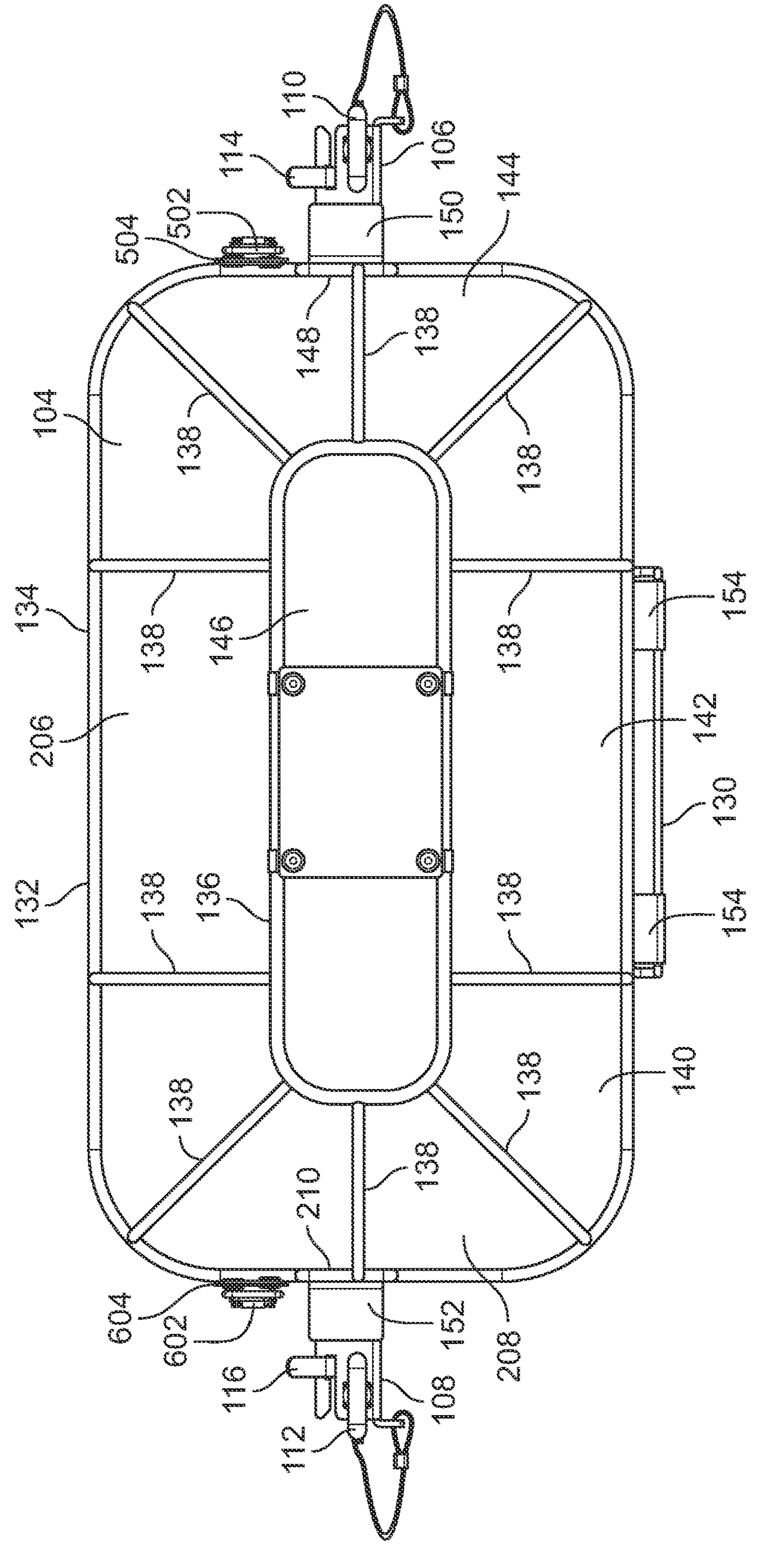
FIG. 7 is a top view of the rotisserie basket of FIGS. 1-6.
Figure 8:
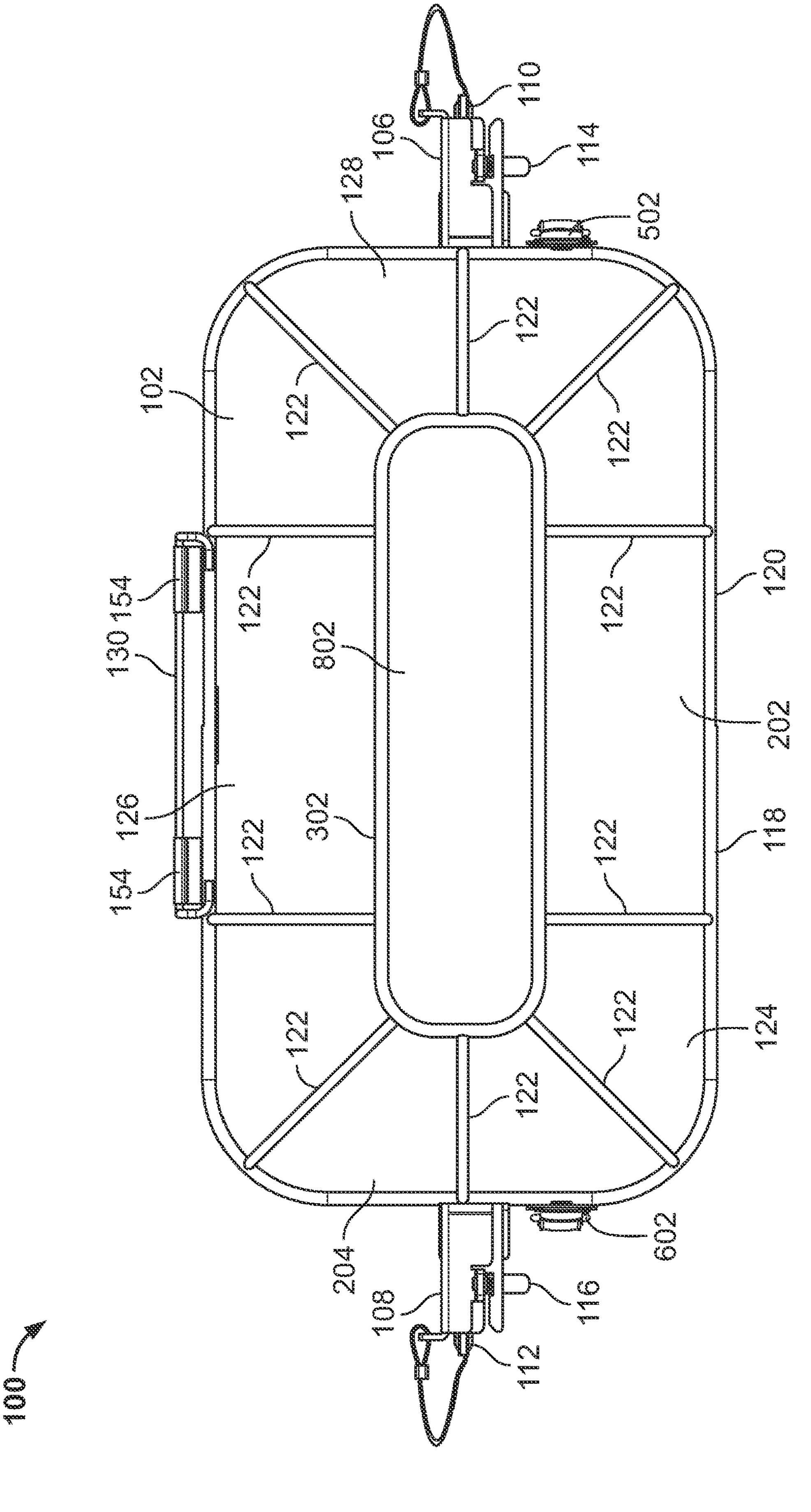
FIG. 8 is a bottom view of the rotisserie basket of FIGS. 1-7.

FIG. 1 is a first perspective view of an example rotisserie basket 100 constructed in accordance with teachings of this disclosure. FIG. 2 is a second perspective view of the rotisserie basket 100 of FIG. 1. FIG. 3 is a front view of the rotisserie basket 100 of FIGS. 1 and 2. FIG. 4 is a rear view of the rotisserie basket 100 of FIGS. 1-3. FIG. 5 is a right side view of the rotisserie basket 100 of FIGS. 1-4. FIG. 6 is a left side view of the rotisserie basket 100 of FIGS. 1-5. FIG. 7 is a top view of the rotisserie basket 100 of FIGS. 1-6. FIG. 8 is a bottom view of the rotisserie basket 100 of FIGS. 1-7. In the illustrated example of FIGS. 1-8, the rotisserie basket 100 includes an example base 102, and example lid 104, an example first mounting bracket 106 (e.g., a right mounting bracket), an example second mounting bracket 108 (e.g., a left mounting bracket), an example first fastener 110 (e.g., a right fastener), an example second fastener 112 (e.g., a left fastener), an example first clip 114 (e.g., a right clip), and an example second clip 116 (e.g., a left clip). The second mounting bracket 108 is laterally (e.g., axially) spaced apart from the first mounting bracket 106. The first fastener 110 and the first clip 114 are respectively associated with the first mounting bracket 106, and the second fastener 112 and the second clip 116 are respectively associated with the second mounting bracket 108. In the illustrated example of FIGS. 1-8, the first mounting bracket 106 and the second mounting bracket 108 are coupled to the base 102 of the rotisserie basket 100. In other examples, the first mounting bracket 106 and/or the second mounting bracket 108 can alternatively be coupled to the lid 104 of the rotisserie basket 100.

Figure 9:
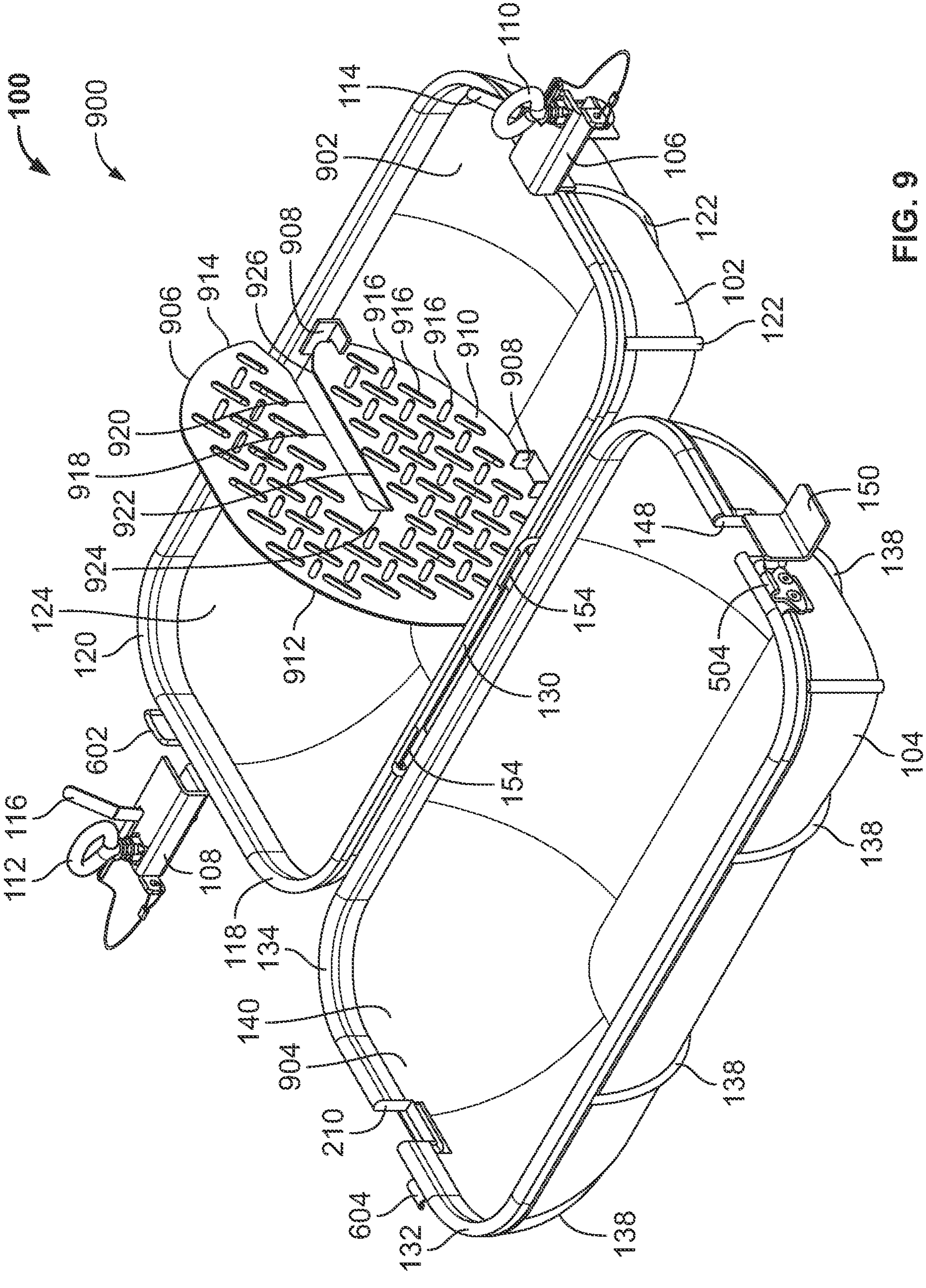
FIG. 9 is a perspective view of the rotisserie basket of FIGS. 1-8, with the lid of the rotisserie basket shown in an example open position.

In the illustrated example of FIGS. 1-8, the base 102 and the lid 104 of the rotisserie basket 100 collectively provide a clamshell structure, with the lid 104 of the rotisserie basket 100 being hinged to the base 102 of the rotisserie basket 100 such that the lid 104 is movable relative to the base 102 between a closed position (e.g., as shown in FIGS. 1-8) and an open position (e.g., as shown in FIG. 9). An interior cavity of the base 102 and an interior cavity of the lid 104 collectively provide a cooking chamber located within the rotisserie basket 100, with the cooking chamber being formed when the lid 104 is placed in the closed position relative to the base 102. The hinge that removably couples the lid 104 of the rotisserie basket 100 to the base 102 of the rotisserie basket 100 can be disassembled such that the lid 104 can be completely separated from the base 102. The separability of the base 102 and the lid 104 advantageously enables the rotisserie basket 100 to be broken down and/or disassembled into component structural parts (e.g., the base 102 and the lid 104) for cleaning. In this regard, the rotisserie basket 100 is configured such that the base 102 and the lid 104, when disassembled from one another, can easily fit within a standard-sized residential dishwasher appliance.

The base 102 of the rotisserie basket 100 of FIGS. 1-8 includes an example frame 118 having an example upper rim 120, an example lower rim 302 located opposite the upper rim 120, and a plurality of example support rods 122 extending between the upper rim 120 and the lower rim 302. In the illustrated example of FIGS. 1-8, the frame 118 of the base 102 has a generally hemicylindrical shape defined by the upper rim 120, the lower rim 302, and the support rods 122. In other examples, the frame 118 of the base 102 can alternatively have a shape that differs from the generally hemicylindrical shape shown in FIGS. 1-8. In the illustrated example of FIGS. 1-8, the upper rim 120, the lower rim 302, and the support rods 122 of the frame 118 of the base 102 are respectively formed by one or more rod(s) having a circular cross-sectional profile. In other examples, the upper rim 120, the lower rim 302, and/or the support rods 122 of the frame 118 of the base 102 can alternatively be formed by one or more rod(s) having a non-circular cross-sectional profile (e.g., having a rectangular cross-sectional profile).

The base 102 of the rotisserie basket 100 of FIGS. 1-8 further includes an example wire mesh 124 coupled to the frame 118 such that the wire mesh 124 is located on and/or extends along an interior of the frame 118, with the wire mesh 124 being supported by the upper rim 120, the lower rim 302, and the support rods 122 of the frame 118. In the illustrated example of FIGS. 1-8, the wire mesh 124 is integrally formed with (e.g., mechanically inseparable from) the frame 118 of the base 102. In other examples, wire mesh 124 can alternatively be removably coupled to the frame 118 of the base 102 via one or more fastener(s). In this regard, the wire mesh 124 of the base 102 has a generally hemicylindrical shape that matches and/or complements the generally hemicylindrical shape of the frame 118 of the base 102. In other examples, the wire mesh 124 of the base 102 can alternatively have a shape that differs from the generally hemicylindrical shape shown in FIGS. 1-8, and/or that differs from the shape of the frame 118 of the base 102 as shown in FIGS. 1-8.

The wire mesh 124 of the base 102 of FIGS. 1-8 includes an example front surface 126, an example rear surface 202, an example right side surface 128, an example left side surface 204, and an example bottom surface 802. The rear surface 202 of the wire mesh 124 is located opposite the front surface 126 of the wire mesh 124. The right side surface 128 of the wire mesh 124 extends between the front surface 126 and the rear surface 202 of the wire mesh 124. The left side surface 204 of the wire mesh 124 is located opposite the right side surface 128 of the wire mesh 124, with the left side surface 204 extending between the front surface 126 and the rear surface 202 of the wire mesh 124. The bottom surface 802 of the wire mesh 124 extends between the front surface 126 and the rear surface 202 of the wire mesh 124, and also extends between the right side surface 128 and the left side surface 204 of the wire mesh 124. In the illustrated example of FIGS. 1-8, the front surface 126, the rear surface 202, the right side surface 128, and the left side surface 204 of the wire mesh 124 are respectively formed as curved (e.g., non-linear) surfaces. In other examples, one or more of the front surface 126, the rear surface 202, the right side surface 128, and/or the left side surface 204 of the wire mesh 124 can alternatively be formed as a planar (e.g., linear) surface.

As shown in FIGS. 1-8, the upper rim 120 of the frame 118 of the base 102 circumscribes the wire mesh 124 of the base 102. In this regard, a first portion of the upper rim 120 of the frame 118 of the base 102 extends along the front surface 126 of the wire mesh 124 of the base 102. A second portion of the upper rim 120 of the frame 118 of the base 102 extends along the rear surface 202 of the wire mesh 124 of the base 102. A third portion of the upper rim 120 of the frame 118 of the base 102 extends along the right side surface 128 of the wire mesh 124 of the base 102. A fourth portion of the upper rim 120 of the frame 118 of the base 102 extends along the left side surface 204 of the wire mesh 124 of the base 102. The upper rim 120 of the frame 118 of the base 102 defines an opening that enables one or more food item(s) (e.g., vegetables, french fries, chicken wings, shrimp, etc.) to be added into and/or removed from an interior cavity of the base 102 of the rotisserie basket 100 when the lid 104 of the rotisserie basket 100 is in an open position (e.g., as shown in FIG. 9).

The lower rim 302 of the frame 118 of the base 102 provides a planar surface that functions as a stabilization foot for the frame 118, the wire mesh 124, and/or, more generally, the base 102 of the rotisserie basket 100. In this regard, the planar surface defined by the lower rim 302 of the frame 118 of the base 102 advantageously enables the base 102 to be positioned on an underlying flat support surface (e.g., a countertop, a tabletop, etc.) in a stabilized manner without the base 102 rolling (e.g., in a forward direction and/or a backward direction) relative to the underlying flat support surface. The resultant stability provided by the planar surface defined by the lower rim 302 of the frame 118 of the base 102 enhances the ease with which an end user of the rotisserie basket 100 can add food items to and/or remove food items from the base 102 of the rotisserie basket 100. Such stability also prevents the base 102 and/or, more generally, the rotisserie basket 100 from unintentionally rolling and/or otherwise shifting position relative to an underlying flat support surface on which the bottom surface 802 of base 102 and/or, more generally, the rotisserie basket 100 may be placed.

The base 102 of the rotisserie basket 100 of FIGS. 1-8 further includes an example hinge rod 130. In the illustrated example of FIGS. 1-8, the hinge rod 130 is coupled to and located forward of the portion of the upper rim 120 of the frame 118 of the base 102 that extends along the front surface 126 of the wire mesh 124 of the base 102. The hinge rod 130 is spaced apart from the upper rim 120 of the frame 118 of the base 102, with the hinge rod 130 being oriented parallel relative to the portion of the upper rim 120 of the frame 118 of the base 102 that extends along the front surface 126 of the wire mesh 124 of the base 102. The hinge rod 130 functions as a mount by which one or more hinge flange(s) of the lid 104 of the rotisserie basket 100 can be removably hinged to the base 102 of the rotisserie basket 100, as further described below. In the illustrated example of FIGS. 1-8, the base 102 includes a single hinge rod 130. In other examples, the base 102 can alternatively include a plurality of hinge rods 130, with respective ones of the hinge rods 130 being spaced apart from one another along the portion of the upper rim 120 of the frame 118 of the base 102 that extends along the front surface 126 of the wire mesh 124 of the base 102. In the illustrated example of FIGS. 1-8, the hinge rod 130 extends outwardly (e.g., forwardly) from the portion of the upper rim 120 of the frame 118 of the base 102 that extends along the front surface 126 of the wire mesh 124 of the base 102. In other examples, the hinge rod 130 can instead extend upwardly or downwardly from the portion of the upper rim 120 of the frame 118 of the base 102 that extends along the front surface 126 of the wire mesh 124 of the base 102.

The base 102 of the rotisserie basket 100 of FIGS. 1-8 further includes a first latch 502. The first latch 502 of the base 102 is configured to selectively couple to a first catch of the lid 104 of the rotisserie basket 100. In this regard, the first latch 502 of the base 102 can be coupled to the first catch of the lid 104 to maintain the lid 104 in a closed position relative to the base 102. Conversely, the first latch 502 of the base 102 can be uncoupled from the first catch of the lid 104 to enable the lid 104 to be moved from a closed position relative to the base 102 into an open position relative to the base 102. In the illustrated example of FIGS. 1-8, the first latch 502 is coupled to the portion of the upper rim 120 of the frame 118 of the base 102 that extends along the right side surface 128 of the wire mesh 124 of the base 102. In other examples, the first latch 502 can alternatively be coupled directly to the right side surface 128 of the wire mesh 124 of the base 102. In still other examples, the first latch 502 can alternatively be coupled to the portion of the upper rim 120 of the frame 118 of the base 102 that extends along the rear surface 202 of the wire mesh 124 of the base 102, or coupled directly to the rear surface 202 of the wire mesh 124 of the base 102.

The base 102 of the rotisserie basket 100 of FIGS. 1-8 further includes a second latch 602. The second latch 602 of the base 102 is configured to selectively couple to a second catch of the lid 104 of the rotisserie basket 100. In this regard, the second latch 602 of the base 102 can be coupled to the second catch of the lid 104 to maintain the lid 104 in a closed position relative to the base 102. Conversely, the second latch 602 of the base 102 can be uncoupled from the second catch of the lid 104 to enable the lid 104 to be moved from a closed position relative to the base 102 into an open position relative to the base 102. In the illustrated example of FIGS. 1-8, the second latch 602 is coupled to the portion of the upper rim 120 of the frame 118 of the base 102 that extends along the left side surface 204 of the wire mesh 124 of the base 102. In other examples, the second latch 602 can alternatively be coupled directly to the left side surface 204 of the wire mesh 124 of the base 102. In still other examples, the second latch 602 can alternatively be coupled to the portion of the upper rim 120 of the frame 118 of the base 102 that extends along the rear surface 202 of the wire mesh 124 of the base 102, or coupled directly to the rear surface 202 of the wire mesh 124 of the base 102.

The lid 104 of the rotisserie basket 100 of FIGS. 1-8 includes an example frame 132 having an example lower rim 134, an example upper rim 136 located opposite the lower rim 134, and a plurality of example support rods 138 extending between the lower rim 134 and the upper rim 136. In the illustrated example of FIGS. 1-8, the frame 132 of the lid 104 has a generally hemicylindrical shape defined by the lower rim 134, the upper rim 136, and the support rods 138. In other examples, the frame 132 of the lid 104 can alternatively have a shape that differs from the generally hemicylindrical shape shown in FIGS. 1-8. In the illustrated example of FIGS. 1-8, the lower rim 134, the upper rim 136, and the support rods 138 of the frame 132 of the lid 104 are respectively formed by one or more rod(s) having a circular cross-sectional profile. In other examples, the lower rim 134, the upper rim 136, and/or the support rods 138 of the frame 132 of the lid 104 can alternatively be formed by one or more rod(s) having a non-circular cross-sectional profile (e.g., having a rectangular cross-sectional profile).

The lid 104 of the rotisserie basket 100 of FIGS. 1-8 further includes an example wire mesh 140 coupled to the frame 132 such that the wire mesh 140 is located on and/or extends along an interior of the frame 132, with the wire mesh 140 being supported by the lower rim 134, the upper rim 136, and the support rods 138 of the frame 132. In the illustrated example of FIGS. 1-8, the wire mesh 140 is integrally formed with (e.g., mechanically inseparable from) the frame 132 of the lid 104. In other examples, wire mesh 140 can alternatively be removably coupled to the frame 132 of the lid 104 via one or more fastener(s). In this regard, the wire mesh 140 of the lid 104 has a generally hemicylindrical shape that matches and/or complements the generally hemicylindrical shape of the frame 132 of the lid 104. In other examples, the wire mesh 140 of the lid 104 can alternatively have a shape that differs from the generally hemicylindrical shape shown in FIGS. 1-8, and/or that differs from the shape of the frame 132 of the lid 104 as shown in FIGS. 1-8.

The wire mesh 140 of the lid 104 of FIGS. 1-8 includes an example front surface 142, an example rear surface 206, an example right side surface 144, an example left side surface 208, and an example top surface 146. The rear surface 206 of the wire mesh 140 is located opposite the front surface 142 of the wire mesh 140. The right side surface 144 of the wire mesh 140 extends between the front surface 142 and the rear surface 206 of the wire mesh 140. The left side surface 208 of the wire mesh 140 is located opposite the right side surface 144 of the wire mesh 140, with the left side surface 208 extending between the front surface 142 and the rear surface 206 of the wire mesh 140. The top surface 146 of the wire mesh 140 extends between the front surface 142 and the rear surface 206 of the wire mesh 140, and also extends between the right side surface 144 and the left side surface 208 of the wire mesh 140. In the illustrated example of FIGS. 1-8, the front surface 142, the rear surface 206, the right side surface 144, and the left side surface 208 of the wire mesh 140 are respectively formed as curved (e.g., non-linear) surfaces. In other examples, one or more of the front surface 142, the rear surface 206, the right side surface 144, and/or the left side surface 208 of the wire mesh 140 can alternatively be formed as a planar (e.g., linear) surface.

As shown in FIGS. 1-8, the lower rim 134 of the frame 132 of the lid 104 circumscribes the wire mesh 140 of the lid 104. In this regard, a first portion of the lower rim 134 of the frame 132 of the lid 104 extends along the front surface 142 of the wire mesh 140 of the lid 104. A second portion of the lower rim 134 of the frame 132 of the lid 104 extends along the rear surface 206 of the wire mesh 140 of the lid 104. A third portion of the lower rim 134 of the frame 132 of the lid 104 extends along the right side surface 144 of the wire mesh 140 of the lid 104. A fourth portion of the lower rim 134 of the frame 132 of the lid 104 extends along the left side surface 208 of the wire mesh 140 of the lid 104. The lower rim 134 of the frame 132 of the lid 104 defines an opening that enables one or more food item(s) (e.g., vegetables, french fries, chicken wings, shrimp, etc.) to be added into and/or removed from an interior cavity of the lid 104 of the rotisserie basket 100 when the lid 104 of the rotisserie basket 100 is in an open position (e.g., as shown in FIG. 9).

The lower rim 134 of the frame 132 of the lid 104 of FIGS. 1-8 includes an example first notch 148 that extends laterally (e.g., in a right-to-left direction) through the frame 132 of the lid 104 into an interior cavity of the lid 104, thereby providing a lateral (e.g., axial) passageway through the frame 132 of the lid 104. In the illustrated example of FIGS. 1-8, the first notch 148 is located along the portion of the lower rim 134 of the frame 132 of the lid 104 that extends along the right side surface 144 of the wire mesh 140 of the lid 104, with the first notch 148 being laterally (e.g., axially) aligned with a mounting channel of the first mounting bracket 106 of the rotisserie basket 100, as further described below. The first notch 148 is configured to receive and/or accommodate a rotisserie spit when the lid 104 of the rotisserie basket 100 is in a closed position relative to the base 102 of the rotisserie basket 100 (e.g., as shown in FIGS. 1-8). In this regard, the first notch 148 of the lower rim 134 of the frame 132 of the lid 104 is configured as a downwardly-facing and/or downwardly-opening notch that is configured to receive a rotisserie spit as the lid 104 of the rotisserie basket 100 moves from an open position (e.g., as shown in FIG. 9) into a closed position (e.g., as shown in FIGS. 1-8) while the rotisserie spit is located within the first mounting bracket 106 of the rotisserie basket 100, as further described below.

The lower rim 134 of the frame 132 of the lid 104 of FIGS. 1-8 further includes an example second notch 210 that extends laterally (e.g., in a right-to-left direction) through the frame 132 of the lid 104 into an interior cavity of the lid 104, thereby providing a lateral (e.g., axial) passageway through the frame 132 of the lid 104. In the illustrated example of FIGS. 1-8, the second notch 210 is located along the portion of the lower rim 134 of the frame 132 of the lid 104 that extends along the left side surface 208 of the wire mesh 140 of the lid 104, with the second notch 210 being laterally (e.g., axially) aligned with a mounting channel of the second mounting bracket 108 of the rotisserie basket 100, as further described below. The second notch 210 is configured to receive and/or accommodate a rotisserie spit when the lid 104 of the rotisserie basket 100 is in a closed position relative to the base 102 of the rotisserie basket 100 (e.g., as shown in FIGS. 1-8). In this regard, the second notch 210 of the lower rim 134 of the frame 132 of the lid 104 is configured as a downwardly-facing and/or downwardly-opening notch that is configured to receive a rotisserie spit as the lid 104 of the rotisserie basket 100 moves from an open position (e.g., as shown in FIG. 9) into a closed position (e.g., as shown in FIGS. 1-8) while the rotisserie spit is located within the second mounting bracket 108 of the rotisserie basket 100, as further described below.

The lid 104 of the rotisserie basket 100 of FIGS. 1-8 further includes an example first positioning flange 150 configured to be gripped and/or otherwise engaged by a user of the rotisserie basket 100 in connection with the user moving the lid 104 of the rotisserie basket 100 relative to the base 102 of the rotisserie basket 100 between a closed position (e.g., as shown in FIGS. 1-8) and an open position (e.g., as shown in FIG. 9), and/or in connection with the user moving the entire rotisserie basket 100 from one location to another. In the illustrated example of FIGS. 1-8, the first positioning flange 150 is coupled to the portion of the lower rim 134 of the frame 132 of the lid 104 that extends along the right side surface 144 of the wire mesh 140 of the lid 104. In other examples, the first positioning flange 150 can alternatively be coupled directly to the right side surface 144 of the wire mesh 140 of the lid 104. In still other examples, the first positioning flange 150 can alternatively be coupled to the portion of the lower rim 134 of the frame 132 of the lid 104 that extends along the rear surface 206 of the wire mesh 140 of the lid 104, or coupled directly to the rear surface 206 of the wire mesh 140 of the lid 104. In the illustrated example of FIGS. 1-8, the first positioning flange 150 extends outwardly (e.g., rightward) from the lower rim 134 of the frame 132 of the lid 104, with the first positioning flange 150 being located above (e.g., over) the first notch 148 of the lower rim 134 of the frame 132 of the lid 104, and above (e.g., over) the first mounting bracket 106 of the rotisserie basket 100. Thus, as shown in FIGS. 1-8, the first positioning flange 150, the first notch 148, and the first mounting bracket 106 of the rotisserie basket 100 are aligned with one another along a common vertical plane. In other examples, the first positioning flange 150 can alternatively be vertically offset from the first notch 148 and/or vertically offset from the first mounting bracket 106 of the rotisserie basket 100.

The lid 104 of the rotisserie basket 100 of FIGS. 1-8 further includes an example second positioning flange 152 configured to be gripped and/or otherwise engaged by a user of the rotisserie basket 100 in connection with the user moving the lid 104 of the rotisserie basket 100 relative to the base 102 of the rotisserie basket 100 between a closed position (e.g., as shown in FIGS. 1-8) and an open position (e.g., as shown in FIG. 9), and/or in connection with the user moving the entire rotisserie basket 100 from one location to another. In the illustrated example of FIGS. 1-8, the second positioning flange 152 is coupled to the portion of the lower rim 134 of the frame 132 of the lid 104 that extends along the left side surface 208 of the wire mesh 140 of the lid 104. In other examples, the second positioning flange 152 can alternatively be coupled directly to the left side surface 208 of the wire mesh 140 of the lid 104. In still other examples, the second positioning flange 152 can alternatively be coupled to the portion of the lower rim 134 of the frame 132 of the lid 104 that extends along the rear surface 206 of the wire mesh 140 of the lid 104, or coupled directly to the rear surface 206 of the wire mesh 140 of the lid 104. In the illustrated example of FIGS. 1-8, the second positioning flange 152 extends outwardly (e.g., leftward) from the lower rim 134 of the frame 132 of the lid 104, with the second positioning flange 152 being located above (e.g., over) the second notch 210 of the lower rim 134 of the frame 132 of the lid 104, and above (e.g., over) the second mounting bracket 108 of the rotisserie basket 100. Thus, as shown in FIGS. 1-8, the second positioning flange 152, the second notch 210, and the second mounting bracket 108 of the rotisserie basket 100 are aligned with one another along a common vertical plane. In other examples, the second positioning flange 152 can alternatively be vertically offset from the second notch 210 and/or vertically offset from the second mounting bracket 108 of the rotisserie basket 100.

The upper rim 136 of the frame 132 of the lid 104 provides a planar surface that functions as a stabilization foot for the frame 132, the wire mesh 140, and/or, more generally, the lid 104 of the rotisserie basket 100 when the lid 104 of the rotisserie basket 100 is in an open position (e.g., as shown in FIG. 9). In this regard, the planar surface defined by the upper rim 136 of the frame 132 of the lid 104 advantageously enables the lid 104 to be positioned in an inverted manner (e.g., with the top surface 146 oriented downwardly) on an underlying flat support surface (e.g., a countertop, a tabletop, etc.) in a stabilized manner without the lid 104 rolling (e.g., in a forward direction and/or a backward direction) relative to the underlying flat support surface. The resultant stability provided by the planar surface defined by the upper rim 136 of the frame 132 of the lid 104 enhances the ease with which an end user of the rotisserie basket 100 can add food items to and/or remove food items from the base 102 and/or the lid 104 of the rotisserie basket 100. Such stability also prevents the lid 104 and/or, more generally, the rotisserie basket 100 from unintentionally rolling and/or otherwise shifting position relative to an underlying flat support surface on which the top surface 146 of the lid 104 and/or, more generally, the rotisserie basket 100 may be placed.

The lid 104 of the rotisserie basket 100 of FIGS. 1-8 further includes a plurality of example hinge flanges 154. The hinge flanges 154 are respectively configured to removably couple to and/or to be removably hinged to the hinge rod 130 of the base 102 of the rotisserie basket 100. In the illustrated example of FIGS. 1-8, the hinge flanges 154 are coupled to the portion of the lower rim 134 of the frame 132 of the lid 104 that extends along the front surface 142 of the wire mesh 140 of the lid 104, with respective ones of the hinge flanges 154 being spaced apart from one another along the portion of the lower rim 134 of the frame 132 of the lid 104 that extends along the front surface 142 of the wire mesh 140 of the lid 104. The hinge flanges 154 extend outwardly (e.g., forwardly) from the lower rim 134 of the frame 132 of the lid 104, with each one of the hinge flanges 154 having a hook portion that is oriented parallel relative to the portion of the lower rim 134 of the frame 132 of the lid 104 that extends along the front surface 142 of the wire mesh 140 of the lid 104, and/or parallel to the hinge rod 130 of the base 102. The hook portion of each one of the hinge flanges 154 is removably couplable to the hinge rod 130, thereby forming a hinge which can be easily disassembled and reassembled by an end user of the rotisserie basket 100. In the illustrated example of FIGS. 1-8, the lid 104 includes two hinge flanges 154. In other examples, the lid 104 can alternatively include a different number of hinge flanges 154, including a single hinge flange 154. Furthermore, although the hinge flanges 154 of FIGS. 1-8 are shown extending outwardly (e.g., forwardly) from the portion of the lower rim 134 of the frame 132 of the lid 104 that extends along the front surface 142 of the wire mesh 140 of the lid 104, the hinge flanges 154 can in other examples extend upwardly or downwardly from portion of the lower rim 134 of the frame 132 of the lid 104 that extends along the front surface 142 of the wire mesh 140 of the lid 104.

The lid 104 of the rotisserie basket 100 of FIGS. 1-8 further includes an example first catch 504. The first catch 504 of the lid 104 functions as a mount by which the first latch 502 of the base 102 of the rotisserie basket 100 can be removably coupled to the lid 104 of the rotisserie basket 100. In the illustrated example of FIGS. 1-8, the first catch 504 is coupled to the portion of the lower rim 134 of the frame 132 of the lid 104 that extends along the right side surface 144 of the wire mesh 140 of the lid 104. In other examples, the first catch 504 can alternatively be coupled directly to the right side surface 144 of the wire mesh 140 of the lid 104. In still other examples, the first catch 504 can alternatively be coupled to the portion of the lower rim 134 of the frame 132 of the lid 104 that extends along the rear surface 206 of the wire mesh 140 of the lid 104, or coupled directly to the rear surface 206 of the wire mesh 140 of the lid 104.

The lid 104 of the rotisserie basket 100 of FIGS. 1-8 further includes an example second catch 604 located opposite the first catch 504. The second catch 604 of the lid 104 functions as a mount by which the second latch 602 of the base 102 of the rotisserie basket 100 can be removably coupled to the lid 104 of the rotisserie basket 100. In the illustrated example of FIGS. 1-8, the second catch 604 is coupled to the portion of the lower rim 134 of the frame 132 of the lid 104 that extends along the left side surface 208 of the wire mesh 140 of the lid 104. In other examples, the second catch 604 can alternatively be coupled directly to the left side surface 208 of the wire mesh 140 of the lid 104. In still other examples, the second catch 604 can alternatively be coupled to the portion of the lower rim 134 of the frame 132 of the lid 104 that extends along the rear surface 206 of the wire mesh 140 of the lid 104, or coupled directly to the rear surface 206 of the wire mesh 140 of the lid 104.

FIG. 9 is a perspective view of the rotisserie basket 100 of FIGS. 1-8, with the lid 104 of the rotisserie basket 100 shown in an example open position 900 relative to the base 102 of the rotisserie basket 100. As shown in FIG. 9, the base 102 of the rotisserie basket 100 includes an example interior cavity 902 formed by the frame 118 and/or the wire mesh 124 of the base 102. The lid 104 of the rotisserie basket 100 similarly includes an example interior cavity 904 formed by the frame 132 and/or the wire mesh 140 of the lid 104. The interior cavity 902 of the base 102 and the interior cavity 904 of the lid 104 collectively provide a cooking chamber located within the rotisserie basket 100, with the cooking chamber being formed when the lid 104 is placed in the closed position relative to the base 102, as shown in FIGS. 1-8.

As further shown in FIG. 9, the rotisserie basket 100 includes an example divider 906 that is positioned and/or supported within the rotisserie basket 100 (e.g., within the interior cavity 902 of the base 102 and/or the interior cavity 904 of the lid 104) by a plurality of example divider supports 908. The divider 906 is configured to divide and/or separate the cooking chamber of the rotisserie basket 100 into two lateral portions (e.g., a right portion and a left portion) to facilitate the separation of food items within the cooking chamber of the rotisserie basket 100. In this regard, the divider 906 has a cross-sectional profile that substantially occupies the cross-sectional profile of the rotisserie basket 100 such that food items located on one side of the divider 906 are not readily transferable to the other side of the divider 906 when the lid 104 of the rotisserie basket 100 is in a closed position relative to the base 102 of the rotisserie basket 100. In the illustrated example of FIG. 9, the rotisserie basket 100 includes a single divider 906 that is positioned at a centralized located within the cooking chamber of the rotisserie basket 100. In other examples, the single divider 906 shown in FIG. 9 can alternatively be positioned at a non-centralized location (e.g., to the right of center, or to the left of center) within the cooking chamber of the rotisserie basket 100. In still other examples, the rotisserie basket 100 can alternatively include a plurality of dividers 906 that are laterally spaced apart from one another within the cooking chamber of the rotisserie basket 100, thereby dividing the cooking chamber of the rotisserie basket into three or more lateral portions (e.g., a right portion, a center portion, and a left portion).

In the illustrated example of FIG. 9, each one of the divider supports 908 is configured to receive the divider 906 such that the divider 906 is thereafter held in place within the cooking chamber of the rotisserie basket 100. In the illustrated example of FIG. 9, each one of the divider supports 908 is coupled to and extends radially inwardly from the interior cavity 902 and/or the wire mesh 124 of the base 102. In other examples, the rotisserie basket 100 can additionally or alternatively include one or more divider support(s) 908 coupled to and extending radially inwardly from the interior cavity 904 and/or the wire mesh 140 of the lid 104.

The divider 906 of FIG. 9 includes an example first side 910 (e.g., a right side), an example second side 912 (e.g., a left side) located opposite the first side 910, and an example peripheral edge 914 located between the first side 910 and the second side 912. The first side 910 and the second side 912 of the divider 906 are formed by and/or as planar surfaces. The peripheral edge 914 of the divider 906 defines an outer profile of the divider which, as described above, is configured to substantially occupy the cross-sectional profile of the cooking chamber of the rotisserie basket 100, as formed by the interior cavity 902 of the base 102 and the interior cavity 904 of the lid 104. The divider 906 of FIG. 9 further includes a plurality of example openings 916 that respectively extend laterally (e.g., in a right-to-left direction) from the first side 910 of the divider 906 through to the second side 912 of the divider 906. The openings 916 of the divider 906 are configured to enable air to flow and or pass from a portion of the cooking chamber of the rotisserie basket 100 located on the first side 910 of the divider 906, through the divider 906, to a portion of the cooking chamber of the rotisserie basket 100 located on the second side 912 of the divider 906, and vice-versa.

The divider 906 of FIG. 9 further includes an example divider channel 918 that extends laterally (e.g., in a right-to-left direction) from the first side 910 of the divider 906 through to the second side 912 of the divider 906, thereby providing a lateral (e.g., axial) passageway through the divider 906. The divider channel 918 of the divider 906 includes an example upper surface 920, an example lower surface 922 located opposite the upper surface 920, an example front surface 924 extending between the upper surface 920 and the lower surface 922, and an example rear opening 926 located opposite the front surface 924 and extending between the upper surface 920 and the lower surface 922. In the illustrated example of FIG. 9, the upper surface 920, the lower surface 922, and the front surface 924 of the divider channel 918 are respectively formed as planar (e.g., linear) surfaces. In other examples, one or more of the upper surface 920, the lower surface 922, and/or the front surface 924 of the divider channel 918 can alternatively be formed as a curved (e.g., non-linear) surface. In the illustrated example of FIG. 9, the divider channel 918 has a C-shaped profile. In the other examples, the divider channel 918 can alternatively have a profile that differs from the C-shaped profile shown in FIG. 9.

The upper surface 920, the lower surface 922, the front surface 924, and the rear opening 926 of the divider channel 918 are collectively configured to receive and/or accommodate a rotisserie spit. In this regard, the divider channel 918 of the divider 906 is configured as a rearwardly-facing and/or rearwardly-opening channel that extends radially inward from the peripheral edge 914 of the divider 906 toward and/or to a central portion of the divider 906, with the divider channel 918 being advantageously configured to receive a rotisserie spit via the rear opening 926 of the divider channel 918. The divider 906 can accordingly be loaded onto and/or unloaded from a rotisserie spit in a transverse direction (e.g., relative to a longitudinal axis of the rotisserie spit) via the rear opening 926 of the divider channel 918, as further described below.

Figure 10:
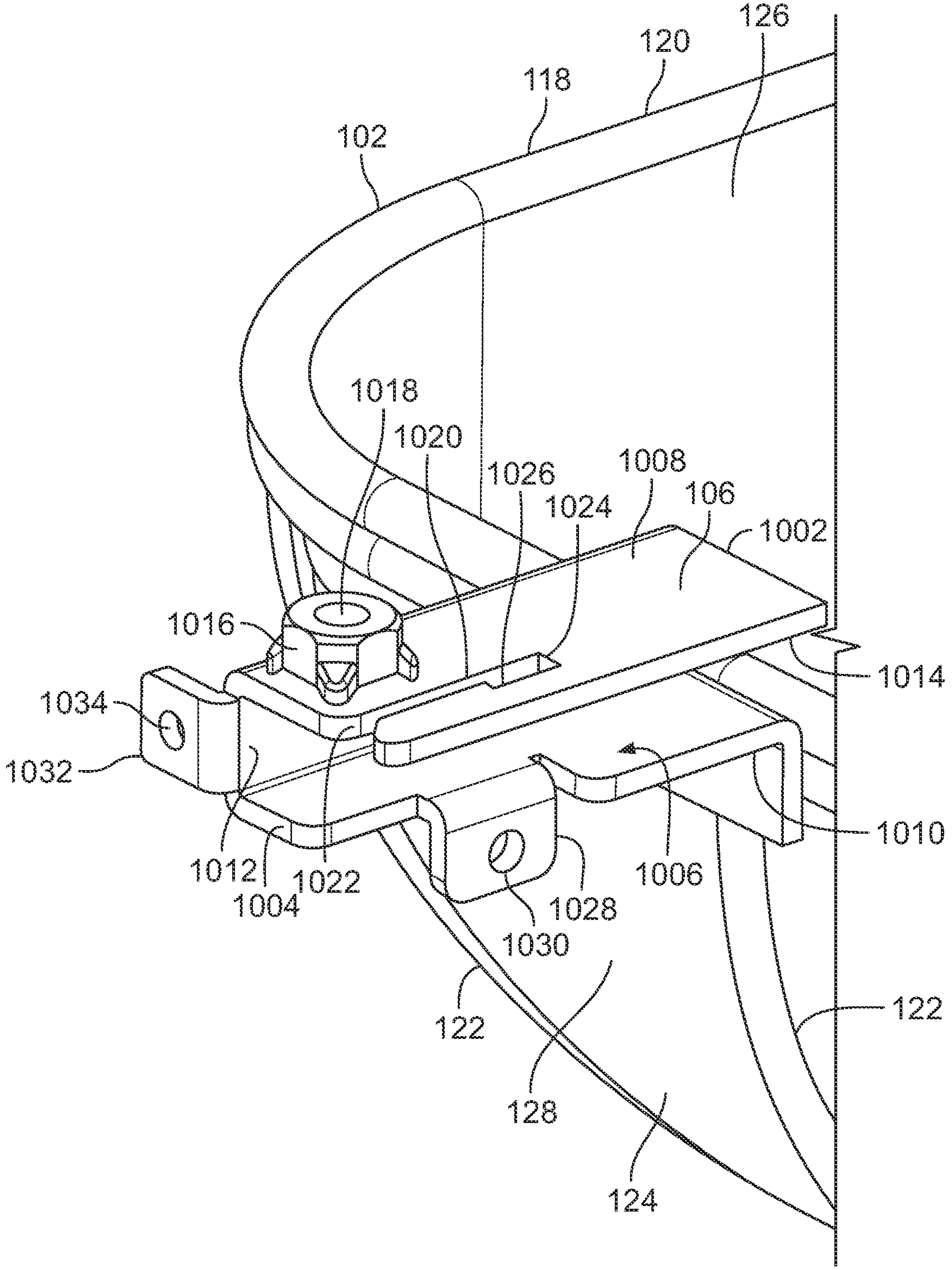
FIG. 10 is a first partial perspective view of the base of FIGS. 1-9.
Figure 11:
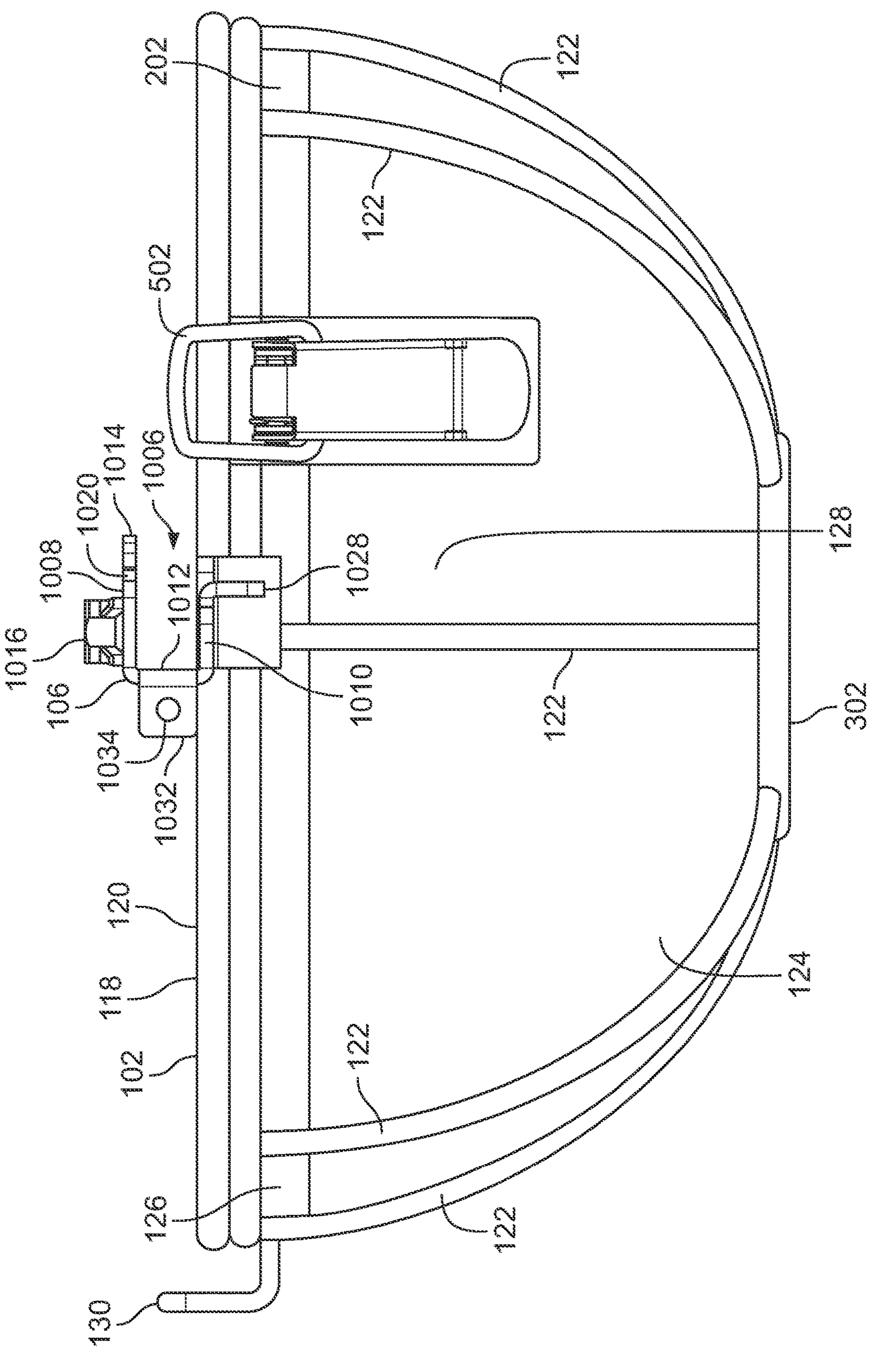
FIG. 11 is a right side view of the base of FIGS. 1-10.
Figure 12:
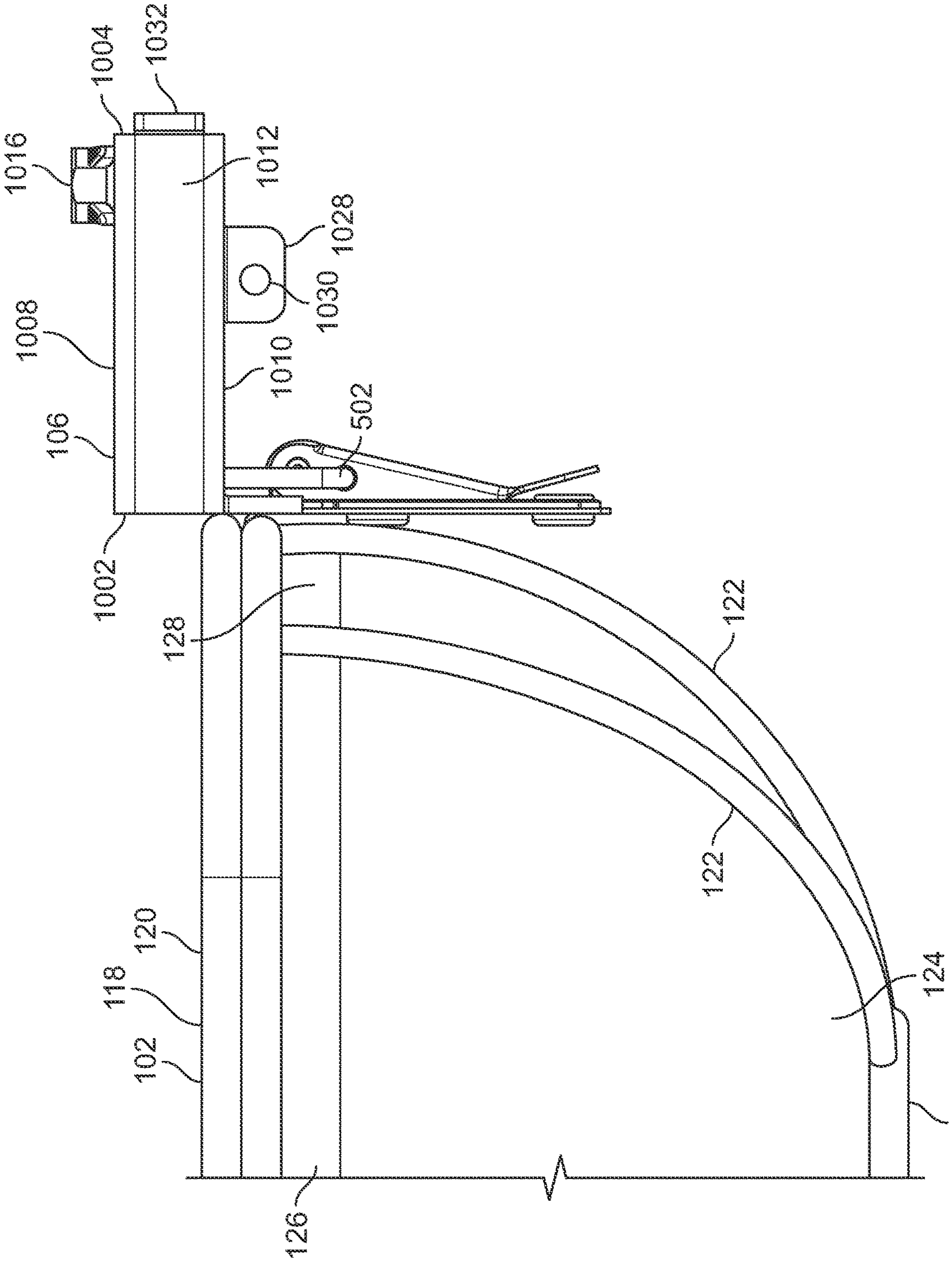
FIG. 12 is a first partial front view of the base of FIGS. 1-11.
Figure 13:
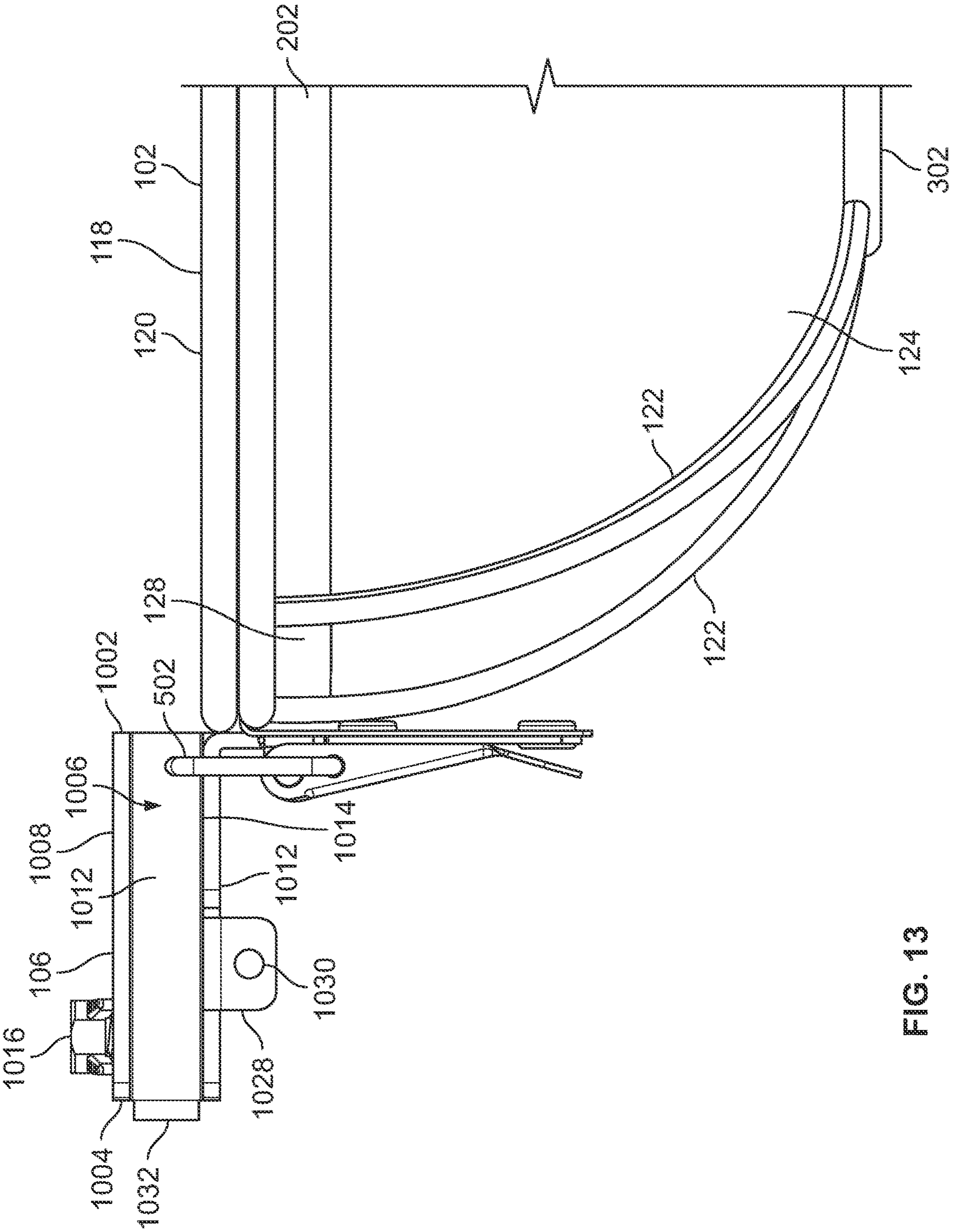
FIG. 13 is a first partial rear view of the base of FIGS. 1-12.
Figure 14:
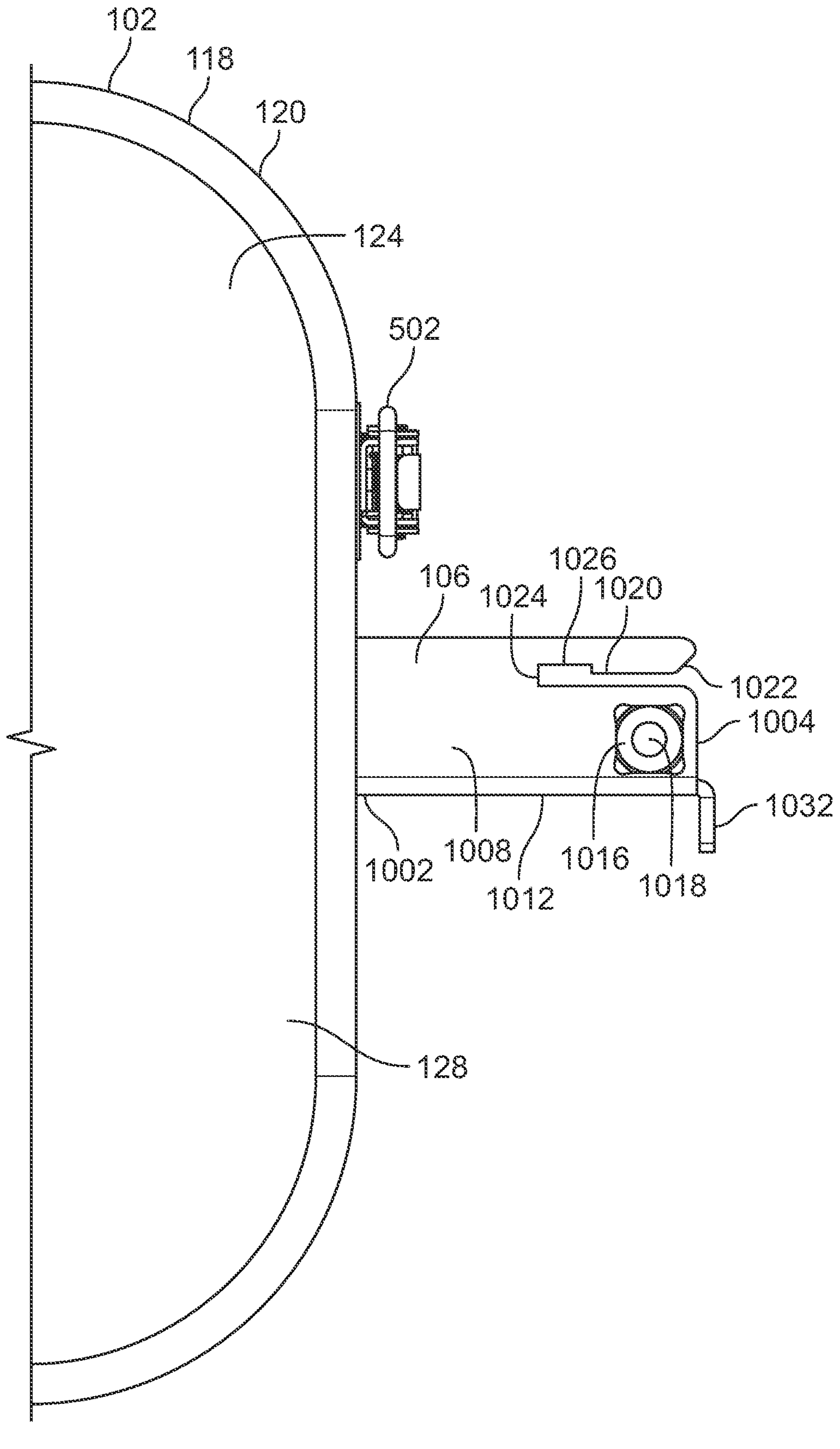
FIG. 14 is a first partial top view of the base of FIGS. 1-13.
Figure 15:
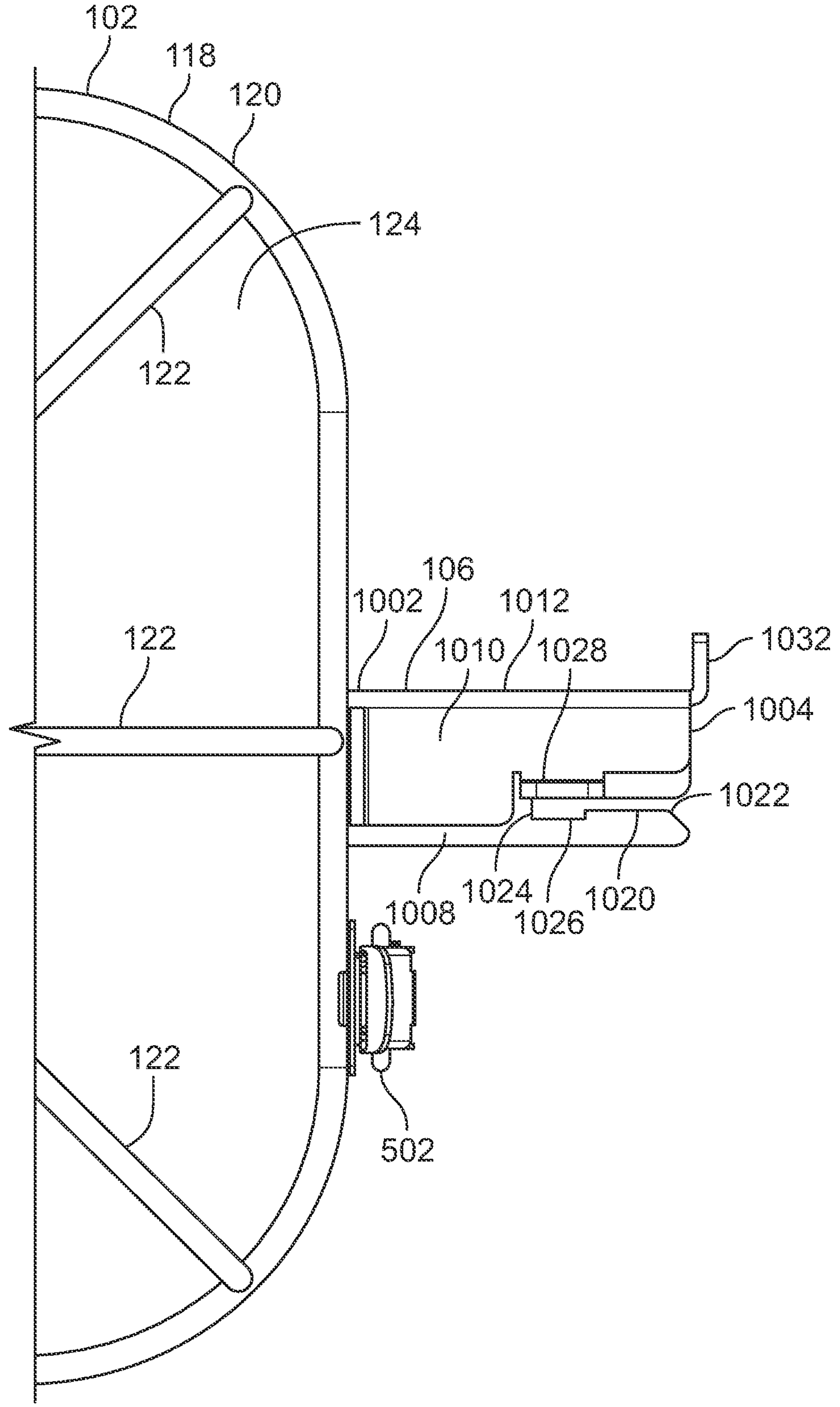
FIG. 15 is a first partial bottom view of the base of FIGS. 1-14.
Figure 16:
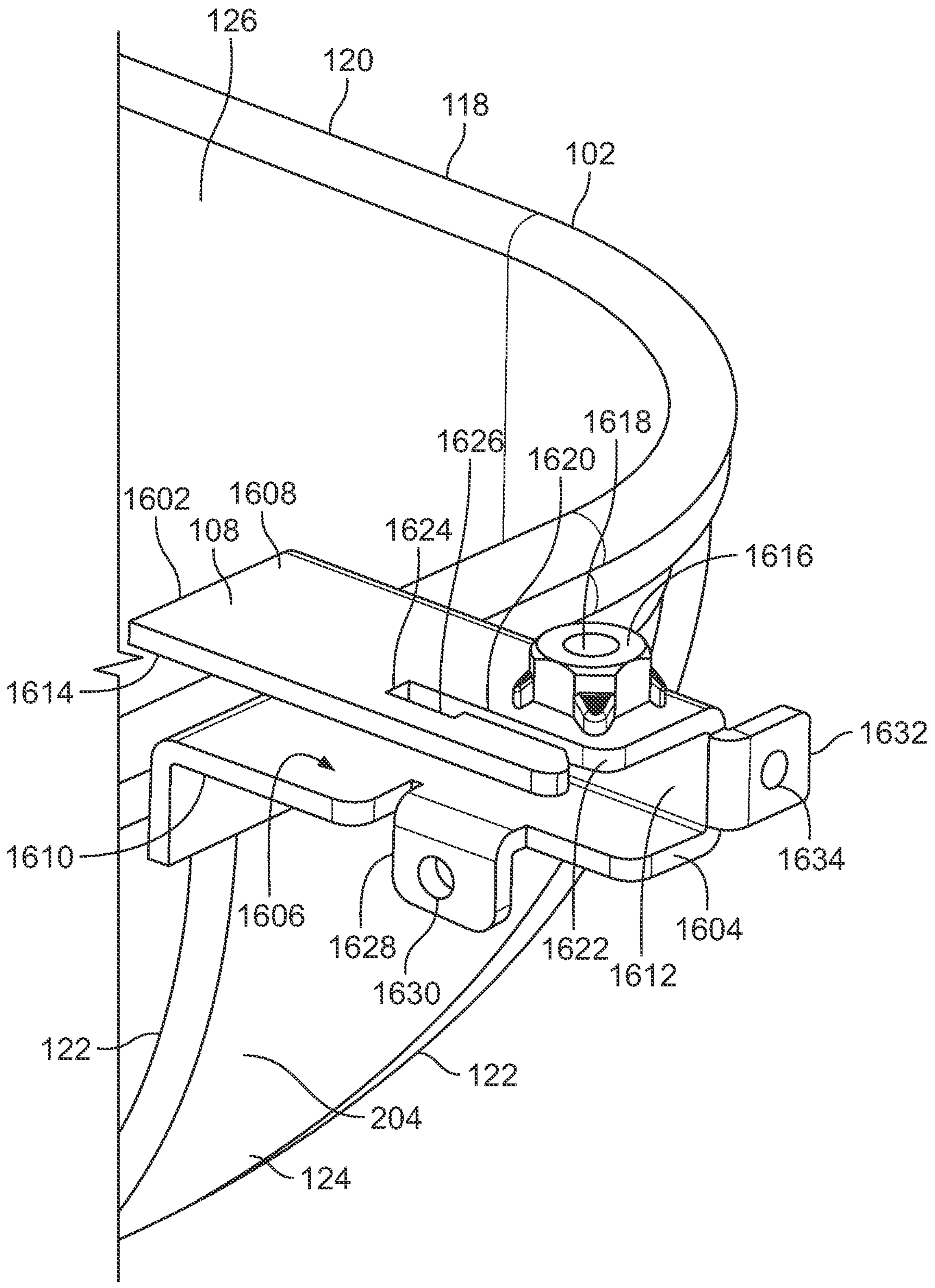
FIG. 16 is a second partial perspective view of the base of FIGS. 1-15.

Additional views of the base 102 and its associated first mounting bracket 106 of the rotisserie basket 100 of FIGS. 1-9 are shown in FIGS. 10-15. In this regard, FIG. 10 is a first partial perspective view of the base 102 of FIGS. 1-9. FIG. 11 is a right side view of the base 102 of FIGS. 1-10. FIG. 12 is a first partial front view of the base 102 of FIGS. 1-11. FIG. 13 is a first partial rear view of the base 102 of FIGS. 1-12. FIG. 14 is a first partial top view of the base 102 of FIGS. 1-13. FIG. 15 is a first partial bottom view of the base 102 of FIGS. 1-14. In the illustrated views of FIGS. 9-15, the first fastener 110 and the first clip 114 associated with the first mounting bracket 106 of the base 102 have been omitted for clarity.

As shown in FIGS. 1-15, the first mounting bracket 106 of the rotisserie basket 100 extends laterally away from the portion of the upper rim 120 of the base 102 of the rotisserie basket 100 that extends along the right side surface 128 of the base 102. In the illustrated example of FIGS. 1-15, the first mounting bracket 106 is oriented and/or positioned orthogonally relative to the portion of the upper rim 120 of the base 102 that extends along the right side surface 128 of the base 102. In other examples, the first mounting bracket 106 can alternatively be oriented and/or positioned non-orthogonally relative to the portion of the upper rim 120 of the base 102 that extends along the right side surface 128 of the base 102. In the illustrated example of FIGS. 1-15, the first mounting bracket 106 is integrally formed with (e.g., mechanically inseparable from) the base 102. In other examples, the first mounting bracket 106 can alternatively be removably coupled to the base 102 via one or more fastener(s).

The first mounting bracket 106 of FIGS. 1-15 includes an example first end 1002 positioned adjacent (e.g., in contact with) the portion of the upper rim 120 of the base 102 that extends along the right side surface 128 of the base 102, and an example second end 1004 (e.g., a free end) located opposite the first end 1002. The first mounting bracket 106 defines an example mounting channel 1006 that extends laterally (e.g., in a right-to-left direction) from the second end 1004 of the first mounting bracket 106 through to the first end 1002 of the first mounting bracket 106, thereby providing a lateral (e.g., axial) passageway through the first mounting bracket 106. As shown in FIGS. 10-15, the mounting channel 1006 of the first mounting bracket 106 includes an example upper wall 1008, an example lower wall 1010 located opposite the upper wall 1008, an example front wall 1012 extending between the upper wall 1008 and the lower wall 1010, and an example rear opening 1014 located opposite the front wall 1012 and extending between the upper wall 1008 and the lower wall 1010.

In the illustrated example of FIGS. 1-15, the upper wall 1008, the lower wall 1010, the front wall 1012, and the rear opening 1014 of the mounting channel 1006 respectively extend from the first end 1002 of the first mounting bracket 106 to the second end 1004 of the first mounting bracket 106. In other examples, the upper wall 1008, the lower wall 1010, and/or the front wall 1012 can alternatively extend only partially between the first end 1002 of the first mounting bracket 106 and the second end 1004 of the first mounting bracket 106. In the illustrated example of FIGS. 1-15, the upper wall 1008, the lower wall 1010, and the front wall 1012 of the mounting channel 1006 are respectively formed as planar (e.g., linear) walls. In other examples, one or more of the upper wall 1008, the lower wall 1010, and/or the front wall 1012 of the mounting channel 1006 can alternatively be formed as a curved (e.g., non-linear) wall. In the illustrated example of FIGS. 1-15, the mounting channel 1006 has a C-shaped profile. In the other examples, the mounting channel 1006 can alternatively have a profile that differs from the C-shaped profile shown in FIGS. 1-15.

The upper wall 1008, the lower wall 1010, the front wall 1012, and the rear opening 1014 of the mounting channel 1006 are collectively configured to receive and/or accommodate a rotisserie spit. In this regard, the mounting channel 1006 of the first mounting bracket 106 is configured as a rearwardly-facing and/or rearwardly-opening channel that is laterally (e.g., axially) aligned with the divider channel 918 of the divider 906, with the mounting channel 1006 being advantageously configured to receive a rotisserie spit via the rear opening 1014 of the mounting channel 1006 (e.g., in conjunction with the divider channel 918 receiving the rotisserie spit via the rear opening 926 of the divider channel 918). The first mounting bracket 106 can accordingly be loaded onto and/or unloaded from a rotisserie spit in a transverse direction (e.g., relative to a longitudinal axis of the rotisserie spit) via the rear opening 1014 of the mounting channel 1006, as further described below.

The first mounting bracket 106 of FIGS. 1-15 further includes an example nut 1016 fixedly coupled (e.g., welded) to a topside of the upper wall 1008 of the first mounting bracket 106. In the illustrated example of FIGS. 1-15, the nut 1016 of the first mounting bracket 106 includes an example threaded opening 1018 that is vertically aligned with (e.g., coaxially positioned relative to) an opening (e.g., a through hole) formed in and extending through the upper wall 1008 of the first mounting bracket 106. The nut 1016 is configured to threadedly receive and/or accommodate a threaded portion of a shaft of the first fastener 110 associated with the first mounting bracket 106, as further described below.

The first mounting bracket 106 of FIGS. 1-15 further includes an example slot 1020 formed in and extending through the upper wall 1008 of the first mounting bracket 106. In the illustrated example of FIGS. 1-15, the slot 1020 includes an example first end 1022 (e.g., an open end) and an example second end 1024 (e.g., a closed end) located opposite the first end 1022. The first end 1022 of the slot 1020 is configured to receive an engagement portion of the first clip 114 associated with the first mounting bracket 106, as further described below. In this regard, the first clip 114 is slidable and/or rotatable into and out of the first end 1022 of the slot 1020, and is further slidable and/or rotatable within the slot 1020 between the first end 1022 and the second end 1024 of the slot 1020. In the illustrated example of FIGS. 1-15, the second end 1024 of the slot 1020 includes an example expansion notch 1026 that is configured to receive the engagement portion of the first clip 114 as the first clip 114 slides and/or rotates from the first end 1022 to the second end 1024 of the slot 1020. The expansion notch 1026 is further configured to function as a mechanical stop that restricts the engagement portion of the first clip 114 from inadvertently sliding and/or rotating from the second end 1024 of the slot 1020 back to the first end 1022 of the slot 1020 absent physical manipulation of the first clip 114 by a user. In other examples, the expansion notch 1026 can instead be omitted from the slot 1020.

The first mounting bracket 106 of FIGS. 1-15 further includes an example clip flange 1028 that extends downwardly from the lower wall 1010 of the first mounting bracket 106. In the illustrated example of FIGS. 1-15, the clip flange 1028 is integrally formed with (e.g., mechanically inseparable from) the first mounting bracket 106. In other examples, the clip flange 1028 can alternatively be removably coupled to the first mounting bracket 106 via one or more fastener(s). The clip flange 1028 includes an example opening 1030 that facilitates the attachment of the first clip 114 to the first mounting bracket 106 and/or, more generally, to the base 102, as further described below.

The first mounting bracket 106 of FIGS. 1-15 further includes an example cable flange 1032 that extends forwardly from the front wall 1012 of the first mounting bracket 106. In the illustrated example of FIGS. 1-15, the cable flange 1032 is integrally formed with (e.g., mechanically inseparable from) the first mounting bracket 106. In other examples, the cable flange 1032 can alternatively be removably coupled to the first mounting bracket 106 via one or more fastener(s). The cable flange 1032 includes an example opening 1034 that facilitates the attachment of a first end of a metal cable to the cable flange 1032. A second end of the metal cable located opposite the first end of the metal cable can be attached to a portion (e.g., a shaft or a looped portion) of the first fastener 110, as shown in FIGS. 1-8. Attachment of the first fastener 110 to the cable flange 1032 via the metal cable advantageously tethers the first fastener 110 to the first mounting bracket 106 so as to prevent the first fastener 110 from becoming completely separated from the first mounting bracket 106 and/or, more generally, from the base 102 when the first fastener 110 is not threadedly coupled to the nut 1016 of the first mounting bracket 106.

Additional views of the base 102 and its associated second mounting bracket 108 of the rotisserie basket 100 of FIGS. 1-15 are shown in FIGS. 16-21. In this regard, FIG.

Figure 17:
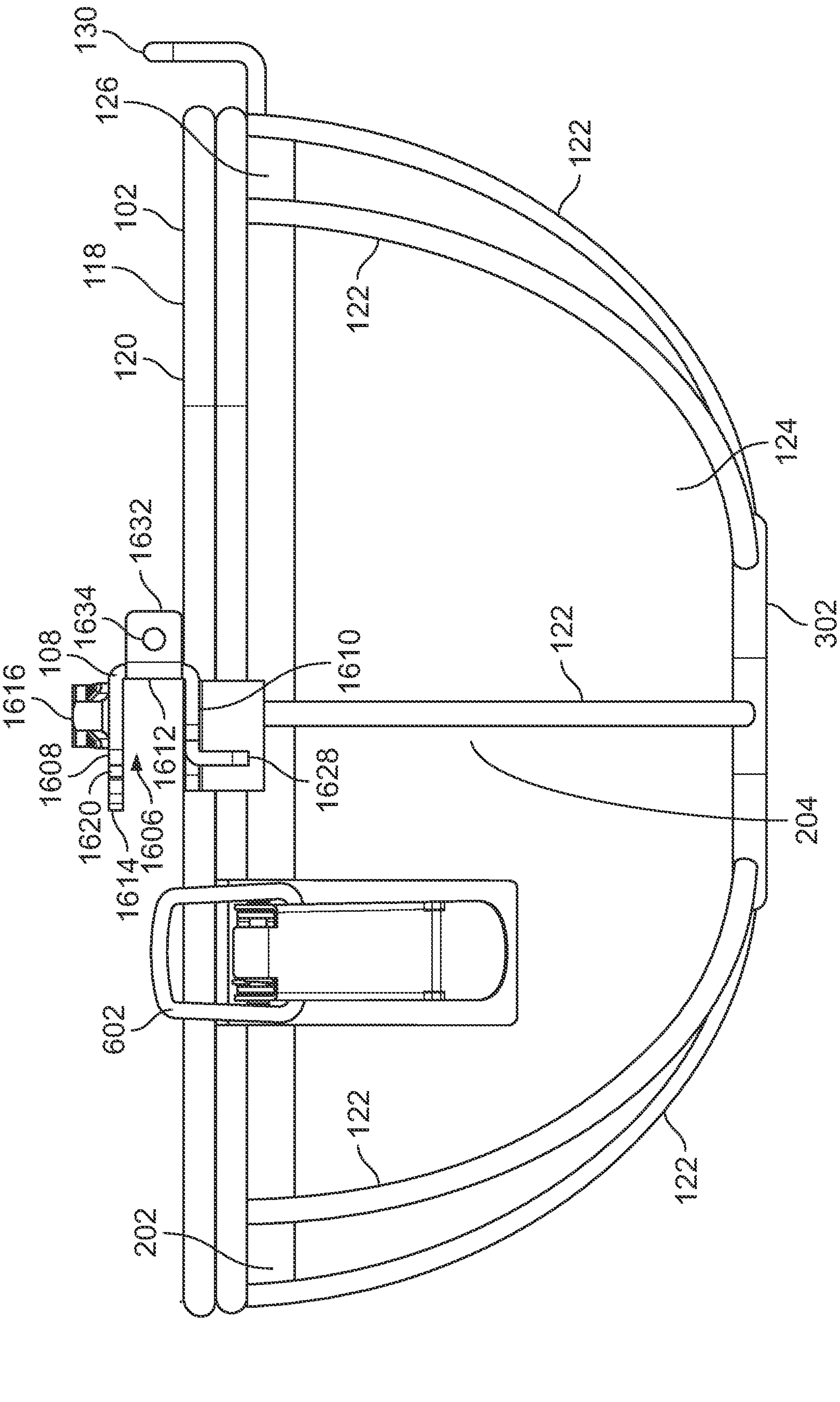
FIG. 17 is a left side view of the base of FIGS. 1-16.
Figure 18:
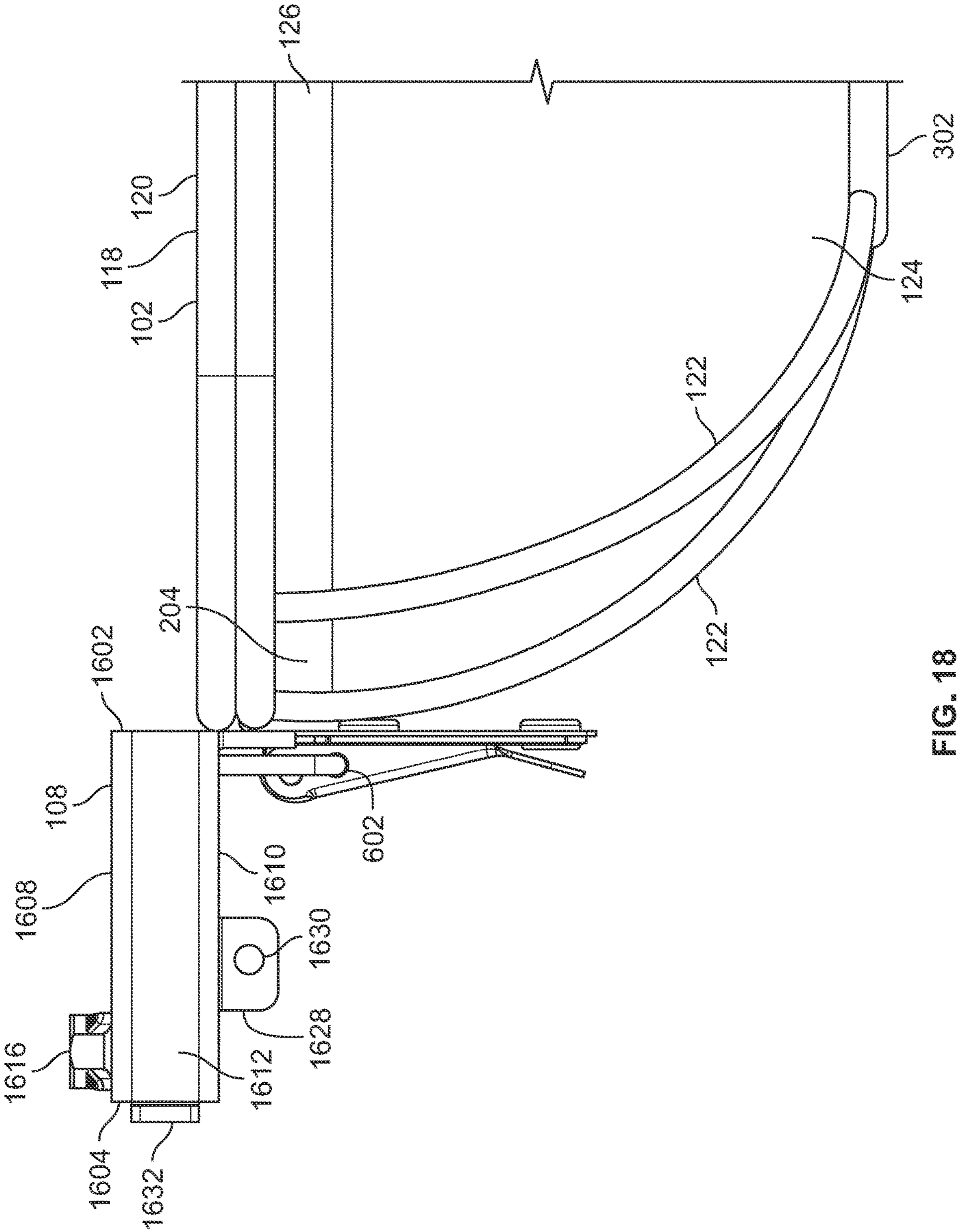
FIG. 18 is a second partial front view of the base of FIGS. 1-17.
Figure 19:
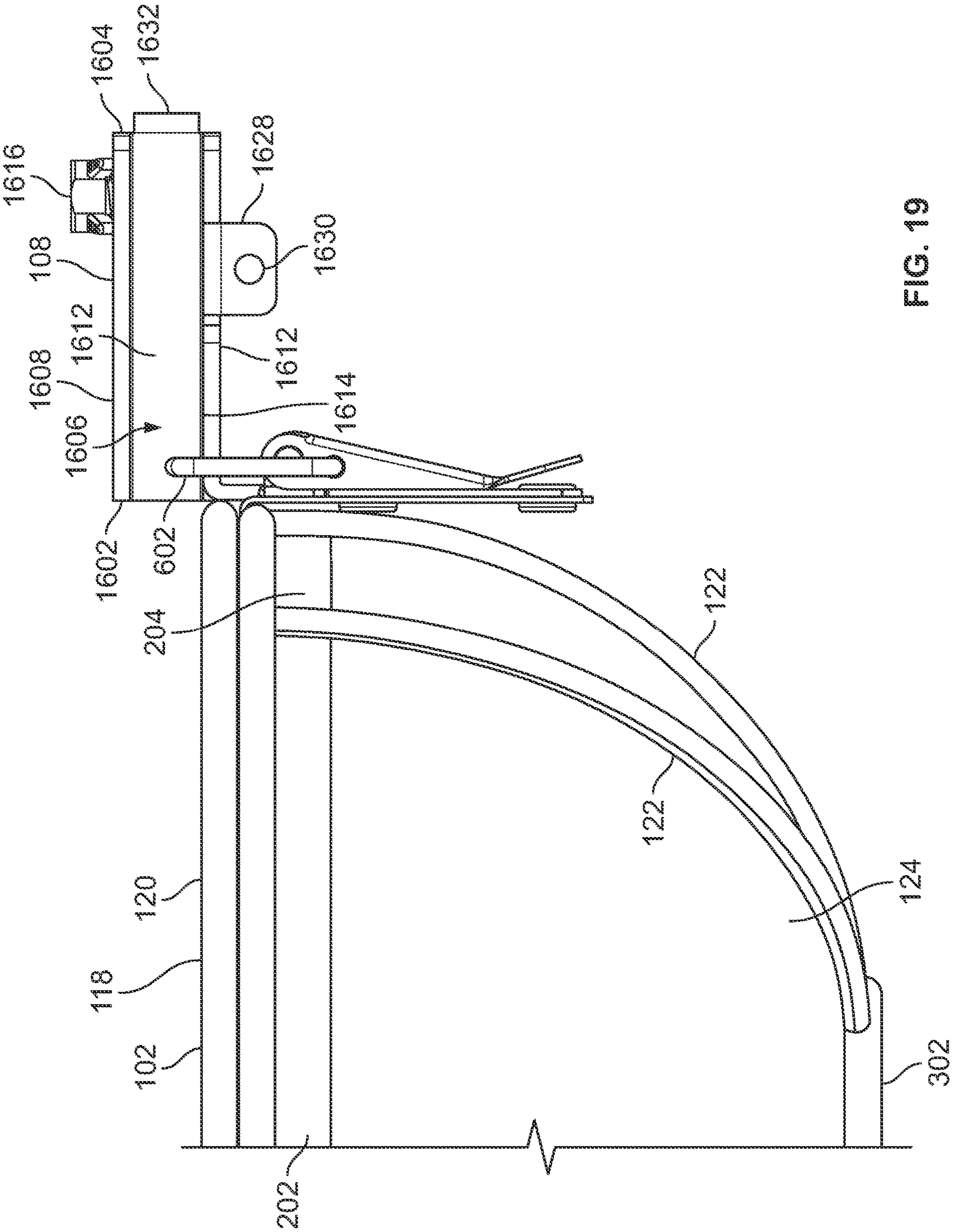
FIG. 19 is a second partial rear view of the base of FIGS. 1-18.
Figure 20:
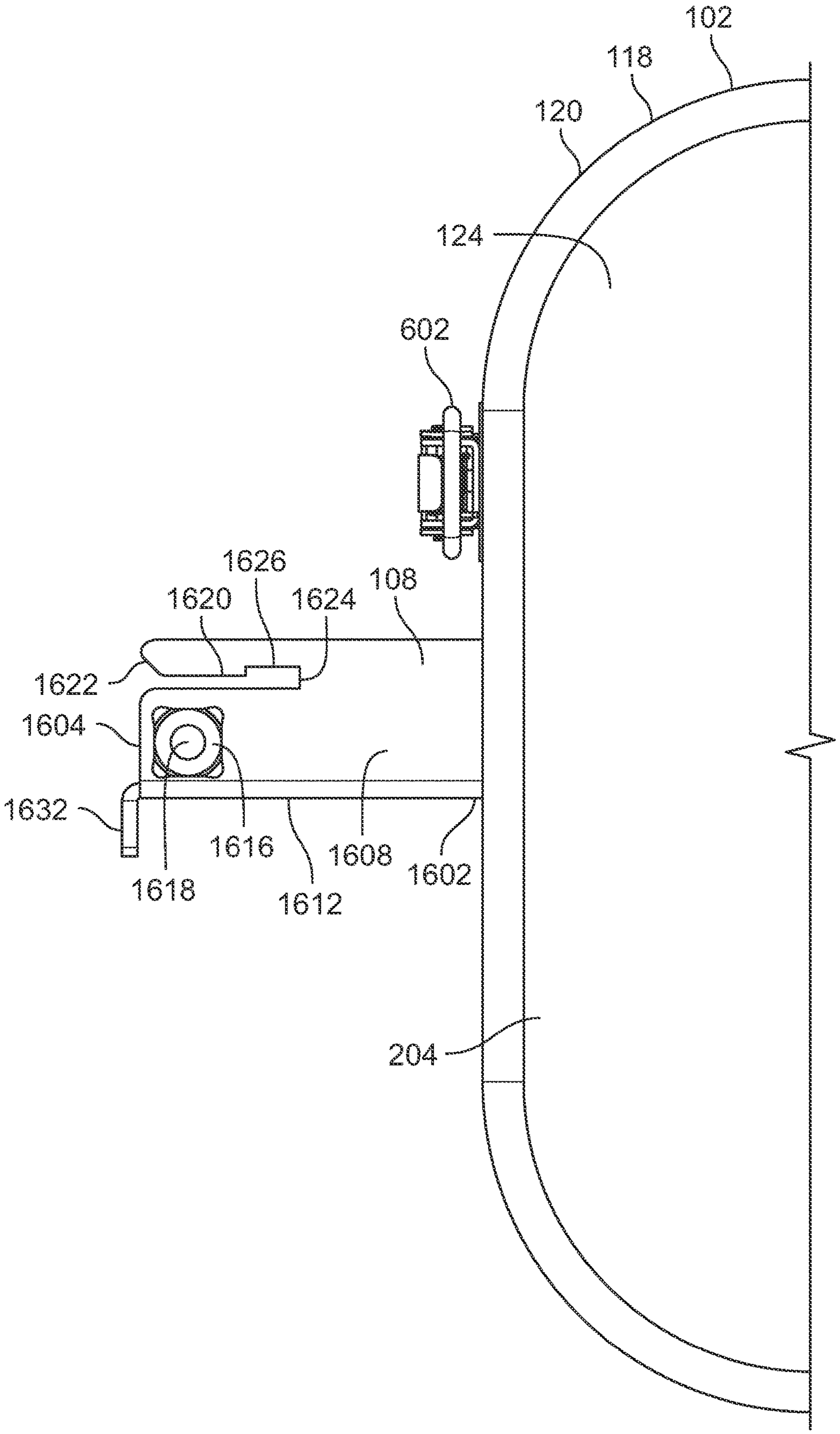
FIG. 20 is a second partial top view of the base of FIGS. 1-19.
Figure 21:
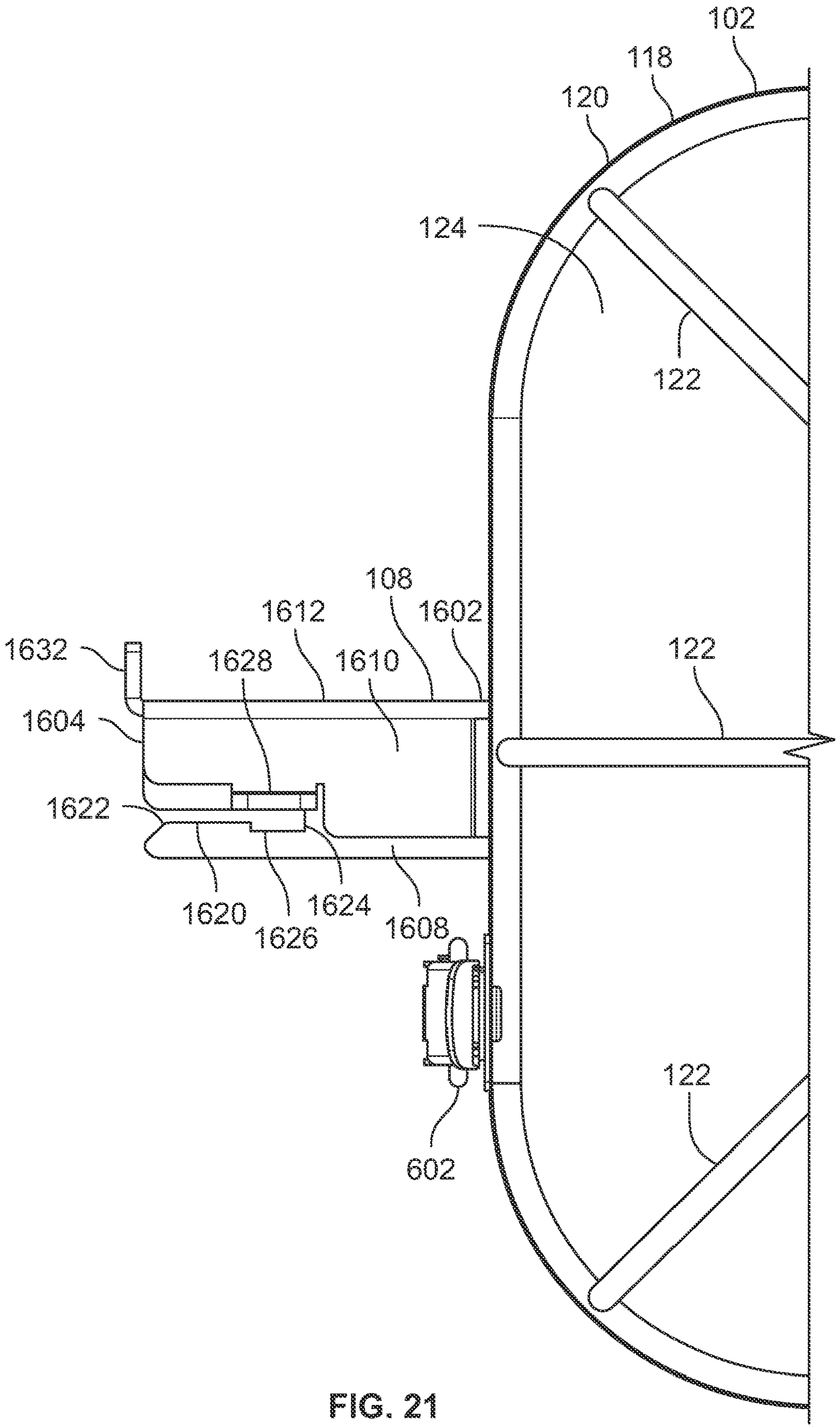
FIG. 21 is a second partial bottom view of the base of FIGS. 1-20.

16 is a second partial perspective view of the base 102 of FIGS. 1-15. FIG. 17 is a left side view of the base 102 of FIGS. 1-16. FIG. 18 is a second partial front view of the base 102 of FIGS. 1-17. FIG. 19 is a second partial rear view of the base 102 of FIGS. 1-18. FIG. 20 is a second partial top view of the base 102 of FIGS. 1-19. FIG. 21 is a second partial bottom view of the base 102 of FIGS. 1-20. In the illustrated views of FIGS. 16-21, the second fastener 112 and the second clip 116 associated with the second mounting bracket 108 of the base 102 have been omitted for clarity.

As shown in FIGS. 1-9 and 16-21, the second mounting bracket 108 of the rotisserie basket 100 extends laterally away from the portion of the upper rim 120 of the base 102 of the rotisserie basket 100 that extends along the left side surface 204 of the base 102. In the illustrated example of FIGS. 1-9 and 16-21, the second mounting bracket 108 is oriented and/or positioned orthogonally relative to the portion of the upper rim 120 of the base 102 that extends along the left side surface 204 of the base 102. In other examples, the second mounting bracket 108 can alternatively be oriented and/or positioned non-orthogonally relative to the portion of the upper rim 120 of the base 102 that extends along the left side surface 204 of the base 102. In the illustrated example of FIGS. 1-9 and 16-21, the second mounting bracket 108 is integrally formed with (e.g., mechanically inseparable from) the base 102. In other examples, the second mounting bracket 108 can alternatively be removably coupled to the base 102 via one or more fastener(s).

The second mounting bracket 108 of FIGS. 1-9 and 16-21 includes an example first end 1602 positioned adjacent (e.g., in contact with) the portion of the upper rim 120 of the base 102 that extends along the left side surface 204 of the base 102, and an example second end 1604 (e.g., a free end) located opposite the first end 1602. The second mounting bracket 108 defines an example mounting channel 1606 that extends laterally (e.g., in a left-to-right direction) from the second end 1604 of the second mounting bracket 108 through to the first end 1602 of the second mounting bracket 108, thereby providing a lateral (e.g., axial) passageway through the second mounting bracket 108. As shown in FIGS. 16-21, the mounting channel 1606 of the second mounting bracket 108 includes an example upper wall 1608, an example lower wall 1610 located opposite the upper wall 1608, an example front wall 1612 extending between the upper wall 1608 and the lower wall 1610, and an example rear opening 1614 located opposite the front wall 1612 and extending between the upper wall 1608 and the lower wall 1610.

In the illustrated example of FIGS. 1-9 and 16-21, the upper wall 1608, the lower wall 1610, the front wall 1612, and the rear opening 1614 of the mounting channel 1606 respectively extend from the first end 1602 of the second mounting bracket 108 to the second end 1604 of the second mounting bracket 108. In other examples, the upper wall 1608, the lower wall 1610, and/or the front wall 1612 can alternatively extend only partially between the first end 1602 of the second mounting bracket 108 and the second end 1604 of the second mounting bracket 108. In the illustrated example of FIGS. 1-9 and 16-21, the upper wall 1608, the lower wall 1610, and the front wall 1612 of the mounting channel 1606 are respectively formed as planar (e.g., linear) walls. In other examples, one or more of the upper wall 1608, the lower wall 1610, and/or the front wall 1612 of the mounting channel 1606 can alternatively be formed as a curved (e.g., non-linear) wall. In the illustrated example of FIGS. 1-9 and 16-21, the mounting channel 1606 has a C-shaped profile. In the other examples, the mounting channel 1606 can alternatively have a profile that differs from the C-shaped profile shown in FIGS. 1-9 and 16-21.

The upper wall 1608, the lower wall 1610, the front wall 1612, and the rear opening 1614 of the mounting channel 1606 are collectively configured to receive and/or accommodate a rotisserie spit. In this regard, the mounting channel 1606 of the second mounting bracket 108 is configured as a rearwardly-facing and/or rearwardly-opening channel that is laterally (e.g., axially) aligned with the divider channel 918 of the divider 906 and/or the mounting channel 1006 of the first mounting bracket 106, with the mounting channel 1606 being advantageously configured to receive a rotisserie spit via the rear opening 1614 of the mounting channel 1606 (e.g., in conjunction with the divider channel 918 receiving the rotisserie spit via the rear opening 926 of the divider channel 918, and/or in conjunction with the mounting channel 1006 receiving the rotisserie spit via the rear opening 1014 of the mounting channel 1006). The second mounting bracket 108 can accordingly be loaded onto and/or unloaded from a rotisserie spit in a transverse direction (e.g., relative to a longitudinal axis of the rotisserie spit) via the rear opening 1614 of the mounting channel 1606, as further described below.

The second mounting bracket 108 of FIGS. 1-9 and 16-21 further includes an example nut 1616 fixedly coupled (e.g., welded) to a topside of the upper wall 1608 of the second mounting bracket 108. In the illustrated example of FIGS. 1-9 and 16-21, the nut 1616 of the second mounting bracket 108 includes an example threaded opening 1618 that is vertically aligned with (e.g., coaxially positioned relative to) an opening (e.g., a through hole) formed in and extending through the upper wall 1608 of the second mounting bracket 108. The nut 1616 is configured to threadedly receive and/or accommodate a threaded portion of a shaft of the second fastener 112 associated with the second mounting bracket 108, as further described below.

The second mounting bracket 108 of FIGS. 1-9 and 16-21 further includes an example slot 1620 formed in and extending through the upper wall 1608 of the second mounting bracket 108. In the illustrated example of FIGS. 1-9 and 16-21, the slot 1620 includes an example first end 1622 (e.g., an open end) and an example second end 1624 (e.g., a closed end) located opposite the first end 1622. The first end 1622 of the slot 1620 is configured to receive an engagement portion of the second clip 116 associated with the second mounting bracket 108, as further described below. In this regard, the second clip 116 is slidable and/or rotatable into and out of the first end 1622 of the slot 1620, and is further slidable and/or rotatable within the slot 1620 between the first end 1622 and the second end 1624 of the slot 1620. In the illustrated example of FIGS. 1-9 and 16-21, the second end 1624 of the slot 1620 includes an example expansion notch 1626 that is configured to receive the engagement portion of the second clip 116 as the second clip 116 slides and/or rotates from the first end 1622 to the second end 1624 of the slot 1620. The expansion notch 1626 is further configured to function as a mechanical stop that restricts the engagement portion of the second clip 116 from inadvertently sliding and/or rotating from the second end 1624 of the slot 1620 back to the first end 1622 of the slot 1620 absent physical manipulation of the second clip 116 by a user. In other examples, the expansion notch 1626 can instead be omitted from the slot 1620.

The second mounting bracket 108 of FIGS. 1-9 and 16-21 further includes an example clip flange 1628 that extends downwardly from the lower wall 1610 of the second mounting bracket 108. In the illustrated example of FIGS. 1-9 and 16-21, the clip flange 1628 is integrally formed with (e.g., mechanically inseparable from) the second mounting bracket 108. In other examples, the clip flange 1628 can alternatively be removably coupled to the second mounting bracket 108 via one or more fastener(s). The clip flange 1628 includes an example opening 1630 that facilitates the attachment of the second clip 116 to the second mounting bracket 108 and/or, more generally, to the base 102, as further described below.

The second mounting bracket 108 of FIGS. 1-9 and 16-21 further includes an example cable flange 1632 that extends forwardly from the front wall 1612 of the second mounting bracket 108. In the illustrated example of FIGS. 1-9 and 16-21, the cable flange 1632 is integrally formed with (e.g., mechanically inseparable from) the second mounting bracket 108. In other examples, the cable flange 1632 can alternatively be removably coupled to the second mounting bracket 108 via one or more fastener(s). The cable flange 1632 includes an example opening 1634 that facilitates the attachment of a first end of a metal cable to the cable flange 1632. A second end of the metal cable located opposite the first end of the metal cable can be attached to a portion (e.g., a shaft or a looped portion) of the second fastener 112, as shown in FIGS. 1-8. Attachment of the second fastener 112 to the cable flange 1632 via the metal cable advantageously tethers the second fastener 112 to the second mounting bracket 108 so as to prevent the second fastener 112 from becoming completely separated from the second mounting bracket 108 and/or, more generally, from the base 102 when the second fastener 112 is not threadedly coupled to the nut 1616 of the second mounting bracket 108.

Figure 22:
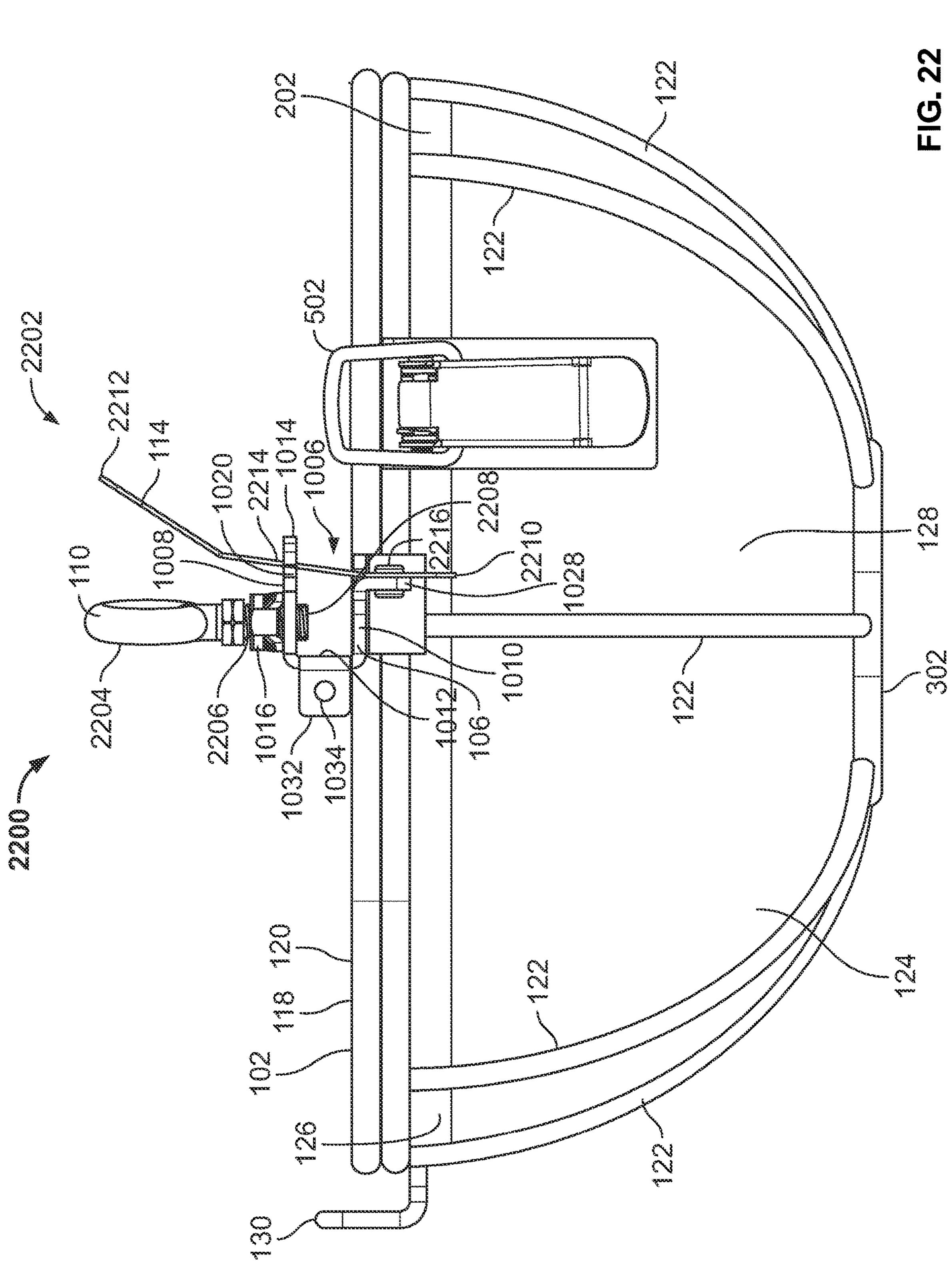
FIG. 22 is a right side view of the base of FIGS. 1-21, with the first fastener of FIGS. 1-9 shown in an example locked position, and with the first clip of FIGS. 1-9 shown in an example closed position.
Figure 23:
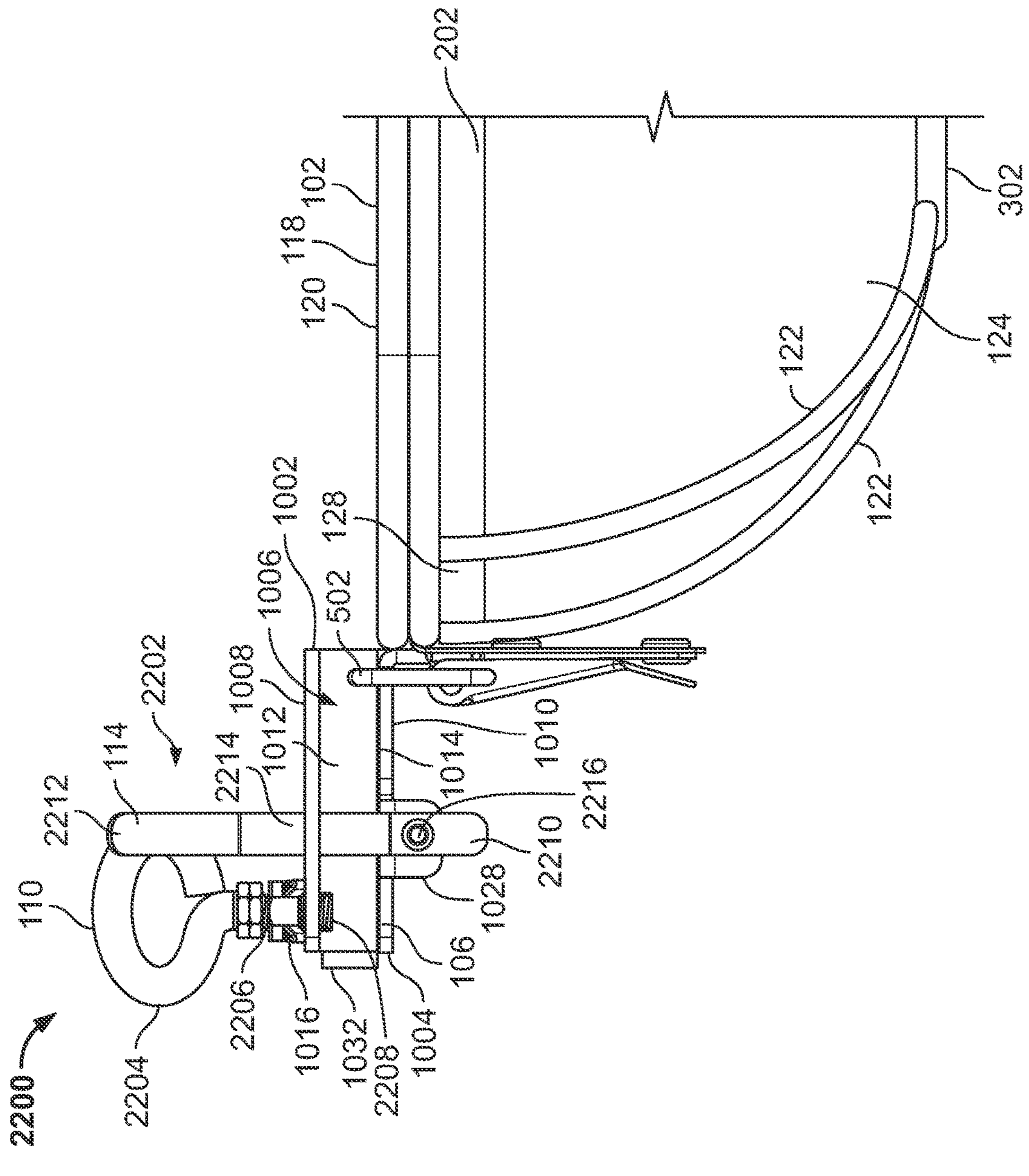
FIG. 23 is a partial rear view of the base of FIGS. 1-22, with the first fastener of FIGS. 1-9 and 22 shown in the locked position of FIG. 22, and with the first clip of FIGS. 1-9 and 22 shown in the closed position of FIG. 22.
Figure 24:
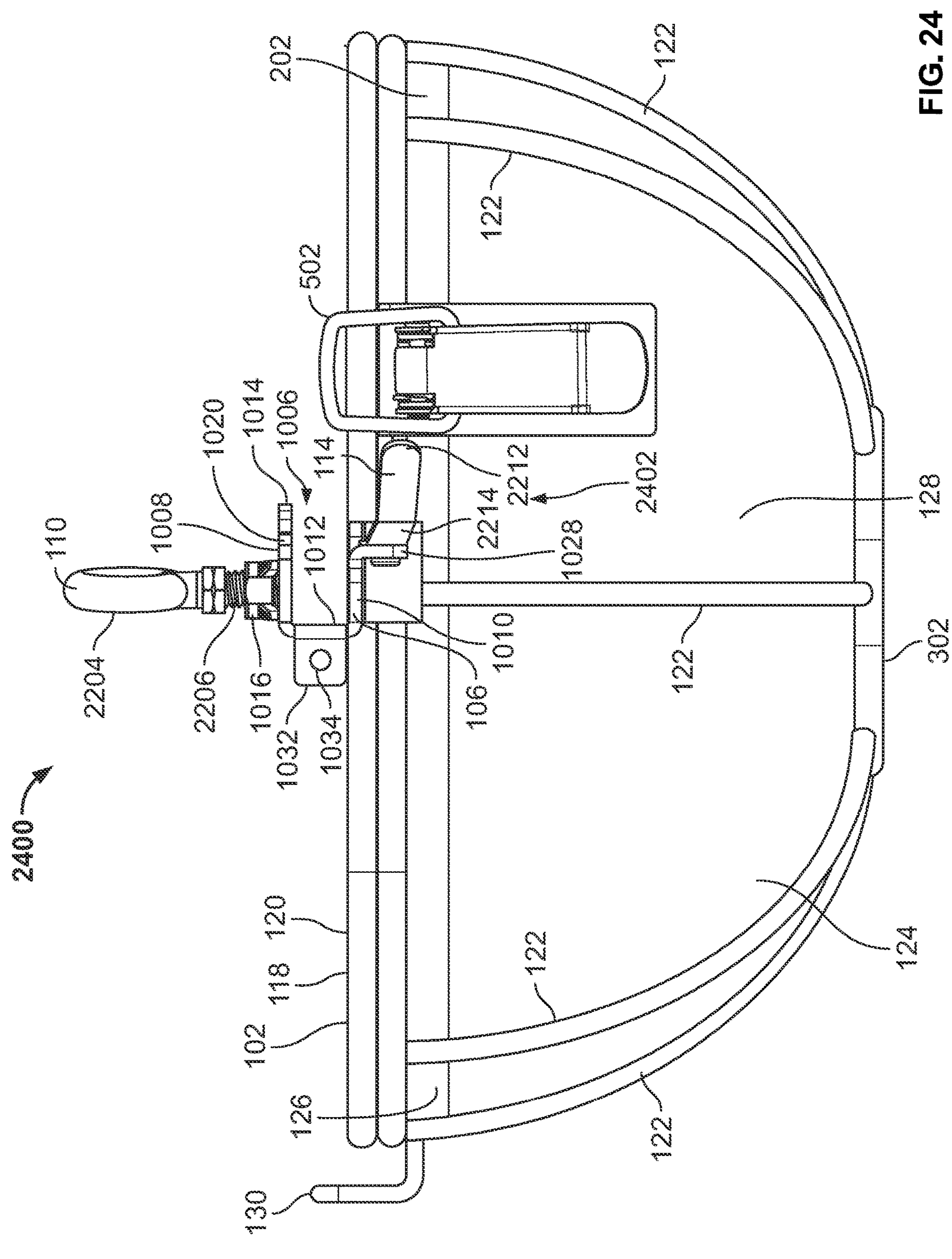
FIG. 24 is a right side view of the base of FIGS. 1-23, with the first fastener of FIGS. 1-9, 22, and 23 shown in an example unlocked position, and with the first clip of FIGS. 1-9, 22, and 23 shown in an example open position.
Figure 25:
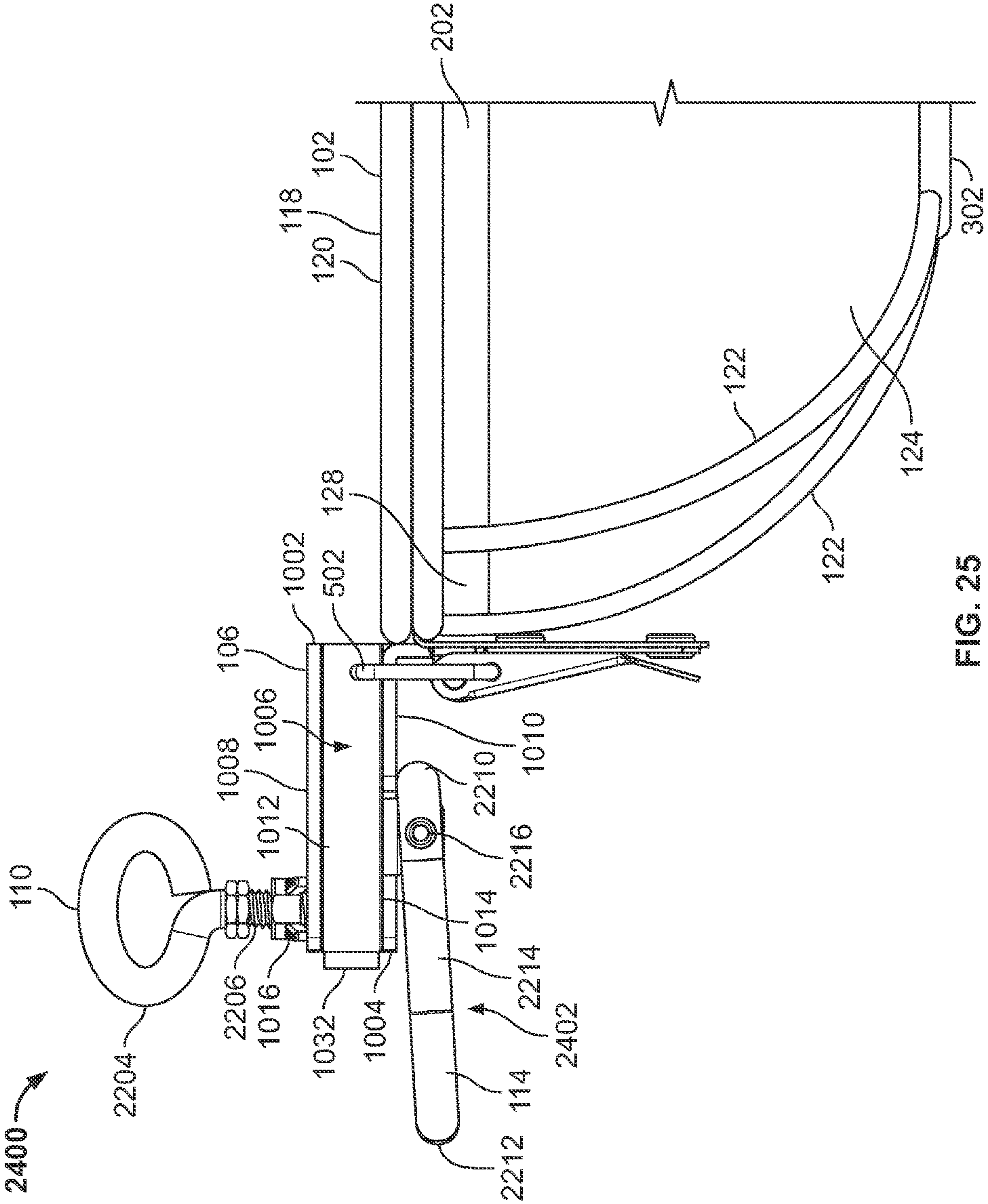
FIG. 25 is a partial rear view of the base of FIGS. 1-24, with the first fastener of FIGS. 1-9 and 22-24 shown in the unlocked position of FIG. 24, and with the first clip of FIGS. 1-9 and 22-24 shown in the open position of FIG. 24.

FIG. 22 is a right side view of the base 102 of FIGS. 1-21, with the first fastener 110 of FIGS. 1-9 shown in an example locked position 2200, and with the first clip 114 of FIGS. 1-9 shown in an example closed position 2202. FIG. 23 is a partial rear view of the base 102 of FIGS. 1-22, with the first fastener 110 of FIGS. 1-9 and 22 shown in the locked position 2200 of FIG. 22, and with the first clip 114 of FIGS. 1-9 and 22 shown in the closed position 2202 of FIG. 22. FIG. 24 is a right side view of the base 102 of FIGS. 1-23, with the first fastener 110 of FIGS. 1-9, 22, and 23 shown in an example unlocked position 2400, and with the first clip 114 of FIGS. 1-9, 22, and 23 shown in an example open position 2402. FIG. 25 is a partial rear view of the base 102 of FIGS. 1-24, with the first fastener 110 of FIGS. 1-9 and 22-24 shown in the unlocked position 2400 of FIG. 24, and with the first clip 114 of FIGS. 1-9 and 22-24 shown in the open position 2402 of FIG. 24.

In the illustrated example of FIGS. 1-9 and 22-25, the first fastener 110 is constructed as an eyebolt having an example looped portion 2204 and an example shaft 2206 extending from the looped portion 2204. The shaft 2206 of the first fastener 110 includes an example free end 2208 located opposite the looped portion 2204 of the first fastener 110. In the illustrated example of FIGS. 1-9 and 22-25, the shaft 2206 of the first fastener 110 is threaded along a substantial entirety of its length. In other examples, the shaft 2206 of the first fastener 110 can alternatively be threaded along only a portion of the length of the shaft 2206. Although the first fastener 110 of the base 102 of FIGS. 1-9 and 22-25 is constructed as an eyebolt, the first fastener 110 can alternatively be constructed as any type of known fastener having a threaded shaft (e.g., a bolt, a screw, etc.).

The shaft 2206 of the first fastener 110 of FIGS. 1-9 and 22-25 is configured to be threadedly received in the threaded opening 1018 of the nut 1016 of the first mounting bracket 106 such that the shaft 2206 and/or, more generally, the first fastener 110 is movable between the locked position 2200 shown in FIGS. 22 and 23 and the unlocked position 2400 shown in FIGS. 24 and 25. In this regard, the first fastener 110 can be threadedly coupled to the threaded opening 1018 of the nut 1016 of the first mounting bracket 106 by placing the free end 2208 of the shaft 2206 into the threaded opening 1018 of the nut 1016, and then rotating the first fastener 110 (e.g., in a clockwise direction) so as to engage the threaded portion of the shaft 2206 with the threaded opening 1018 of the nut 1016. As shown in FIGS. 22 and 23, the free end 2208 of the shaft 2206 of the first fastener 110 partially blocks, obstructs, and/or otherwise interferes with an upper aspect of a forward portion of the mounting channel 1006 of the first mounting bracket 106 when the first fastener 110 is positioned in the locked position 2200. Conversely, as shown in FIGS. 24 and 25, the free end 2208 of the shaft 2206 of the first fastener 110 does not block, obstruct, and/or otherwise interfere with any aspect of the forward portion of the mounting channel 1006 of the first mounting bracket 106 when the first fastener 110 is positioned in the unlocked position 2400.

In the illustrated example of FIGS. 22-25, the first fastener 110 is movable from the locked position 2200 to the unlocked position 2400 by rotating the first fastener 110 in a counter-clockwise direction, and is conversely movable from the unlocked position 2400 to the locked position 2200 by rotating the first fastener 110 in a clockwise direction. In other examples, the first fastener 110 can instead be movable from the locked position 2200 to the unlocked position 2400 by rotating the first fastener 110 in a clockwise direction, and can conversely be movable from the unlocked position 2400 to the locked position 2200 by rotating the first fastener 110 in a counter-clockwise direction.

As described in greater detail below, the first fastener 110 is to be removed from the locked position 2200 of FIGS. 22 and 23 prior to the first mounting bracket 106 being transversely loaded onto a rotisserie spit. In this regard, the first fastener 110 will typically be unthreaded from the locked position 2200 of FIGS. 22 and 23 to the unlocked position 2400 of FIGS. 24 and 25 such that the free end 2208 of the shaft 2206 of the first fastener 110 is not blocking any aspect of the forward portion of the mounting channel 1006 of the first mounting bracket 106 in preparation of the first mounting bracket 106 being transversely loaded onto the rotisserie spit. Subsequent to the first mounting bracket 106 being transversely loaded onto the rotisserie spit via the rear opening 1014 of the mounting channel 1006 of the first mounting bracket 106, the first fastener 110 can thereafter be moved from the unlocked position 2400 of FIGS. 24 and 25 to the locked position 2200 of FIGS. 22 and 23 to securely couple the first mounting bracket 106 and/or, more generally, the base 102 of the rotisserie basket 100 to the rotisserie spit.

When the first fastener 110 is placed in the locked position 2200, the free end 2208 of the shaft 2206 of the first fastener 110 extends into the mounting channel 1006 of the first mounting bracket 106 so as to engage a rotisserie spit located therein. The engagement between the free end 2208 of the shaft 2206 of the first fastener 110 and the rotisserie spit forces the rotisserie spit into pressurized and/or forceable contact with the lower wall 1010 of the mounting channel 1006, thereby securely coupling the first mounting bracket 106 and/or, more generally, the base 102 of the rotisserie basket 100 to the rotisserie spit. The first mounting bracket 106 and/or, more generally, the base 102 of the rotisserie basket 100 can conversely be transversely unloaded from the rotisserie spit in response to the first fastener 110 being unthreaded from the locked position 2200 of FIGS. 22 and 23 to the unlocked position 2400 of FIGS. 24 and 25 such that the free end 2208 of the shaft 2206 of the first fastener 110 is no longer contacting the rotisserie spit, and/or such that the free end 2208 of the shaft 2206 of the first fastener 110 is no longer blocking any aspect of the forward portion of the mounting channel 1006 of the first mounting bracket 106 that would interfere with the rotisserie spit being removed therefrom.

In the illustrated example of FIGS. 1-9 and 22-25, the first clip 114 is constructed as a thin, semi-flexible rod having an example first end 2210, an example second end 2212 located opposite the first end 2210, and an example engagement portion 2214 located between the first end 2210 and the second end 2212. A portion of the first clip 114 located proximate the first end 2210 is configured to be pivotably coupled to the clip flange 1028 of the first mounting bracket 106 of the base 102 such that the first clip 114 is rotatable relative to the first mounting bracket 106, and such that the engagement portion 2214 of the first clip 114 is receivable and/or movable within the slot 1020 of the first mounting bracket 106. For example, as shown in FIGS. 22-25, the first clip 114 is pivotably coupled to the clip flange 1028 of the first mounting bracket 106 of the base 102 via an example rivet 2216 located proximate the first end 2210 of the first clip 114, with the rivet 1716 extending through an opening formed in the first clip 114 and further extending through the opening 1030 formed in the clip flange 1028.

In the illustrated example of FIGS. 22-25, the engagement portion 2214 of the first clip 114 is movable between the closed position 2202 shown in FIGS. 22 and 23 and the open position 2402 shown in FIGS. 24 and 25. In this regard, the first clip 114 can be moved between the closed position 2202 and the open position 2402 by physically manipulating the second end 2212 of the first clip 114 so as to cause the engagement portion 2214 of the first clip 114 to rotate and/or pivot relative to the slot 1020 of the first mounting bracket 106. As shown in FIGS. 22 and 23, the engagement portion 2214 of the first clip 114 blocks, obstructs, and/or otherwise interferes with a rearward portion of the mounting channel 1006 of the first mounting bracket 106 when the first clip 114 is positioned in the closed position 2202. Conversely, as shown in FIGS. 24 and 25, the engagement portion 2214 of the first clip 114 does not block, obstruct, and/or otherwise interfere with any aspect of the rearward portion of the mounting channel 1006 of the first mounting bracket 106 when the first clip 114 is positioned in the open position 2402.

As described in greater detail below, the first clip 114 is to be removed from the closed position 2202 of FIGS. 22 and 23 prior to the first mounting bracket 106 being transversely loaded onto a rotisserie spit. In this regard, the first clip 114 will typically be rotated from the closed position 2202 of FIGS. 22 and 23 to the open position 2402 of FIGS. 24 and 25 such that the engagement portion 2214 of the first clip 114 is not blocking any aspect of the rearward portion of the mounting channel 1006 of the first mounting bracket 106 in preparation of the first mounting bracket 106 being transversely loaded onto the rotisserie spit. Subsequent to the first mounting bracket 106 being transversely loaded onto the rotisserie spit via the rear opening 1014 of the mounting channel 1006 of the first mounting bracket 106, the first clip 114 can thereafter be moved from the open position 2402 of FIGS. 24 and 25 to the closed position 2202 of FIGS. 22 and 23 to further couple the first mounting bracket 106 and/or, more generally, the base 102 of the rotisserie basket 100 to the rotisserie spit.

When the first clip 114 is placed in the closed position 2202, the engagement portion 2214 of the first clip 114 extends through and/or across a rearward portion of the mounting channel 1006 (e.g., between the upper wall 1008 and the lower wall 1010) so as to transversely capture a rotisserie spit located within a forward portion of the mounting channel 1006. The first clip 114 accordingly functions as a safety clip that prevents the first mounting bracket 106 and/or, more generally, the base 102 of the rotisserie basket 100 from inadvertently being transversely removed from the rotisserie spit. In this regard, the engagement portion 2214 of the first clip 114 is biased (e.g., rearwardly biased) into the expansion notch 1026 of the slot 1020 of the first mounting bracket 106 when the first clip 114 is placed in the closed position 2202, with the expansion notch 1026 thereafter functioning as a mechanical stop that restricts the engagement portion 2214 of the first clip 114 from inadvertently sliding and/or rotating from the second end 1024 of the slot 1020 (e.g., out of the expansion notch 1026) back to the first end 1022 of the slot 1020 absent physical manipulation of the first clip 114 by a user. Thus, the first mounting bracket 106 and/or, more generally, the base 102 of the rotisserie basket 100 can only be transversely unloaded from the rotisserie spit in response to the first clip 114 being slid and/or rotated from the closed position 2202 of FIGS. 22 and 23 to the open position 2402 of FIGS. 24 and 25, such that the engagement portion 2214 of the first clip 114 is moved out of the expansion notch 1026 of the slot 1020, and such that the engagement portion 2214 of the first clip 114 is no longer blocking any aspect of the rearward portion of the mounting channel 1006 of the first mounting bracket 106 that would interfere with the rotisserie spit being removed therefrom.

As described above, the first clip 114 serves as a mechanical failsafe against inadvertent transverse removal of the first mounting bracket 106 and/or, more generally, the base 102 of the rotisserie basket 100 from the rotisserie spit. In this regard, it is the first fastener 110, rather than the first clip 114, that securely couples the first mounting bracket 106 and/or, more generally, the base 102 of the rotisserie basket 100 to the rotisserie spit. Thus, in other examples, the first clip 114 (as well as the associated slot 1020 and the associated clip flange 1028) can be omitted from the first mounting bracket 106 and/or, more generally, the base 102 of the rotisserie basket 100 without negatively impacting the capability of securely coupling the first mounting bracket 106 and/or, more generally, the base 102 of the rotisserie basket 100 to the rotisserie spit.

Figure 26:
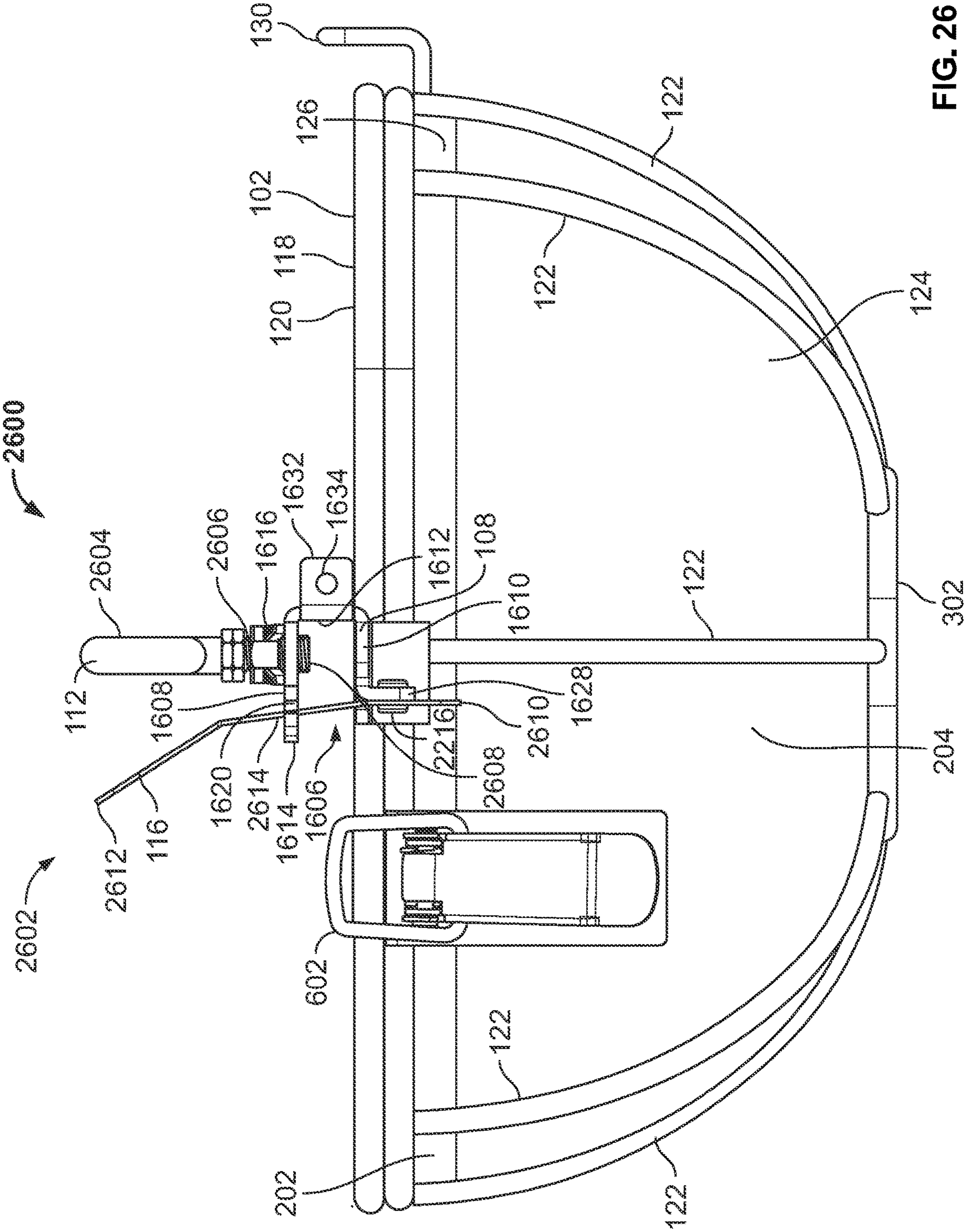
FIG. 26 is a left side view of the base of FIGS. 1-25, with the second fastener of FIGS. 1-9 shown in an example locked position, and with the second clip of FIGS. 1-9 shown in an example closed position.
Figure 27:
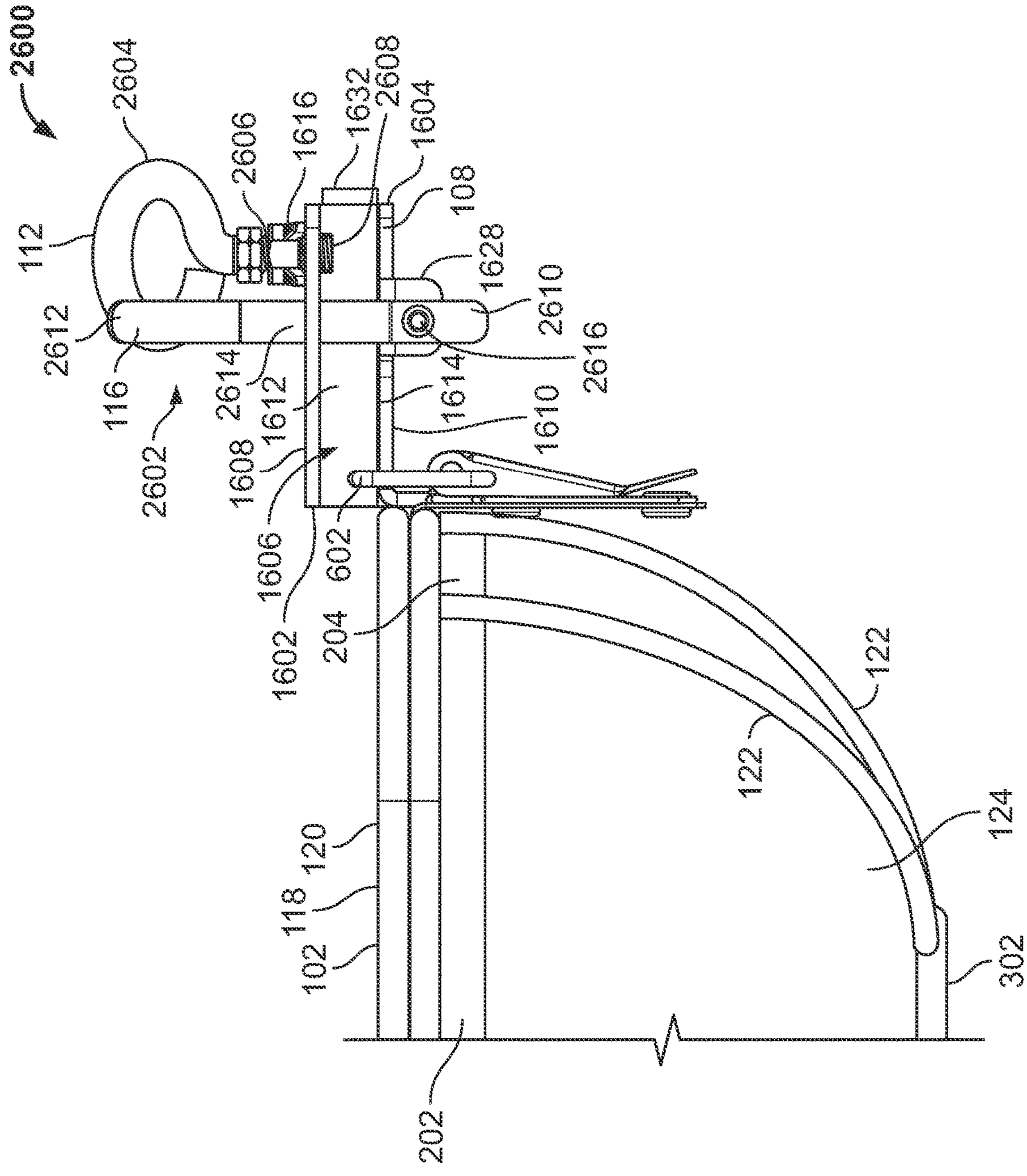
FIG. 27 is a partial rear view of the base of FIGS. 1-26, with the second fastener of FIGS. 1-9 and 26 shown in the locked position of FIG. 26, and with the second clip of FIGS. 1-9 and 26 shown in the closed position of FIG. 26.
Figure 28:
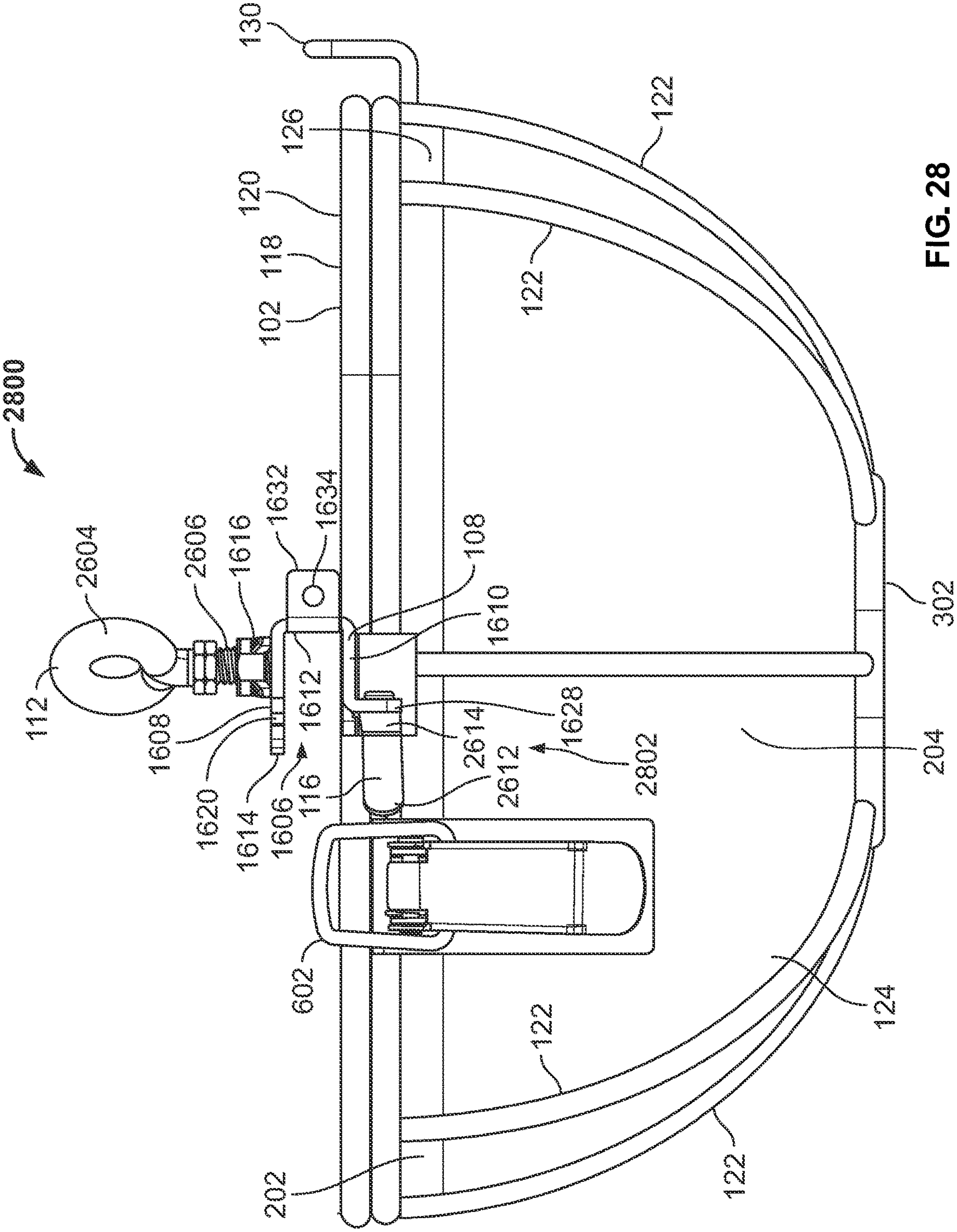
FIG. 28 is a left side view of the base of FIGS. 1-27, with the second fastener of FIGS. 1-9, 26, and 27 shown in an example unlocked position, and with the second clip of FIGS. 1-9, 26, and 27 shown in an example open position.
Figure 29:
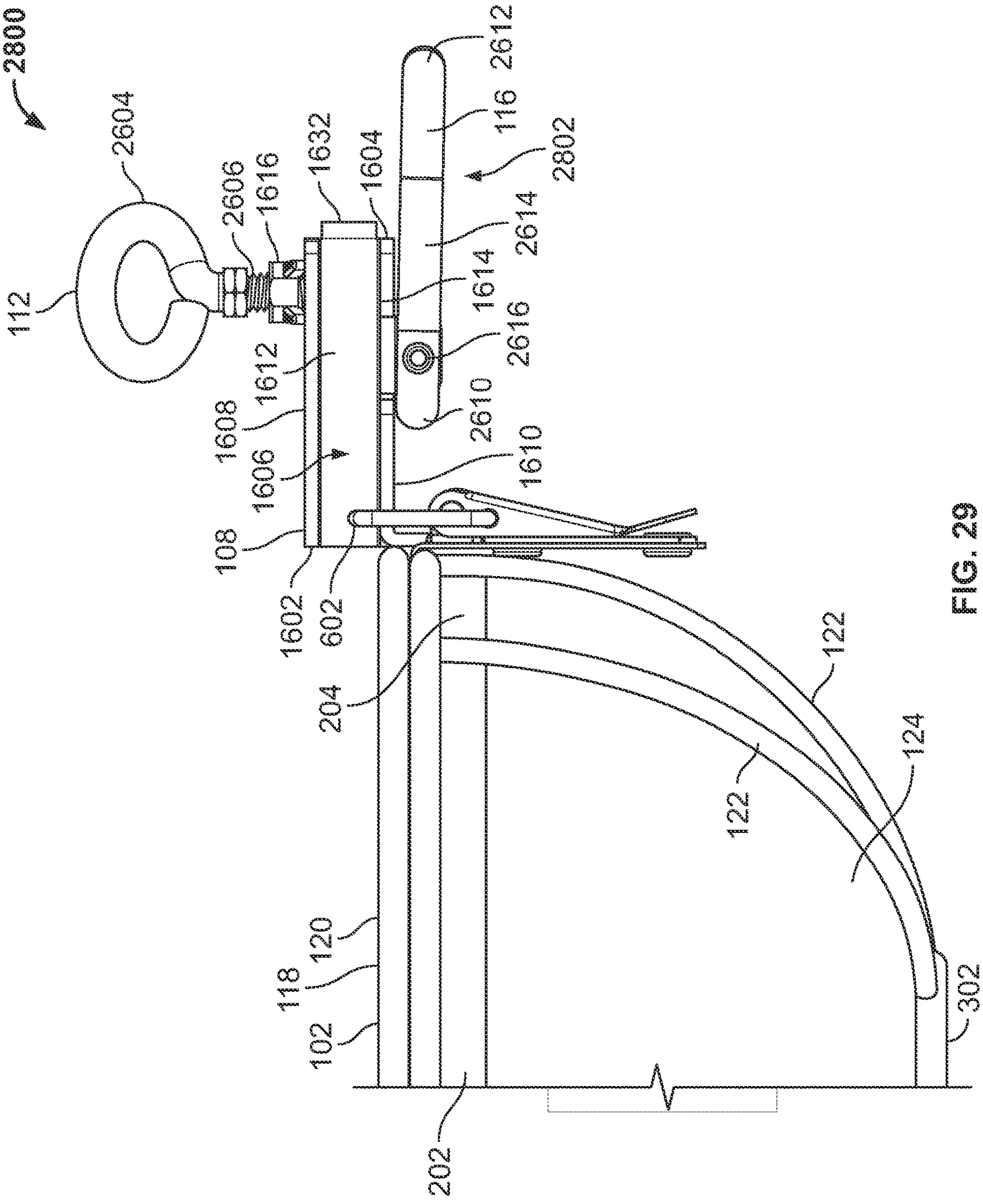
FIG. 29 is a partial rear view of the base of FIGS. 1-28, with the second fastener of FIGS. 1-9 and 26-28 shown in the unlocked position of FIG. 28, and with the second clip of FIGS. 1-9 and 26-28 shown in the open position of FIG. 28.

FIG. 26 is a left side view of the base 102 of FIGS. 1-25, with the second fastener 112 of FIGS. 1-9 shown in an example locked position 2600, and with the second clip 116 of FIGS. 1-9 shown in an example closed position 2602. FIG. 27 is a partial rear view of the base 102 of FIGS. 1-26, with the second fastener 112 of FIGS. 1-9 and 26 shown in the locked position 2600 of FIG. 26, and with the second clip 116 of FIGS. 1-9 and 26 shown in the closed position 2602 of FIG. 26. FIG. 28 is a left side view of the base 102 of FIGS. 1-27, with the second fastener 112 of FIGS. 1-9, 26, and 27 shown in an example unlocked position 2800, and with the second clip 116 of FIGS. 1-9, 26, and 27 shown in an example open position 2802. FIG. 29 is a partial rear view of the base 102 of FIGS. 1-28, with the second fastener 112 of FIGS. 1-9 and 26-28 shown in the unlocked position 2800 of FIG. 28, and with the second clip 116 of FIGS. 1-9 and 26-28 shown in the open position 2802 of FIG. 28.

In the illustrated example of FIGS. 1-9 and 26-29, the second fastener 112 is constructed as an eyebolt having an example looped portion 2604 and an example shaft 2606 extending from the looped portion 2604. The shaft 2606 of the second fastener 112 includes an example free end 2608 located opposite the looped portion 2604 of the second fastener 112. In the illustrated example of FIGS. 1-9 and 26-29, the shaft 2606 of the second fastener 112 is threaded along a substantial entirety of its length. In other examples, the shaft 2606 of the second fastener 112 can alternatively be threaded along only a portion of the length of the shaft 2606. Although the second fastener 112 of the base 102 of FIGS. 1-9 and 26-29 is constructed as an eyebolt, the second fastener 112 can alternatively be constructed as any type of known fastener having a threaded shaft (e.g., a bolt, a screw, etc.).

The shaft 2606 of the second fastener 112 of FIGS. 1-9 and 26-29 is configured to be threadedly received in the threaded opening 1618 of the nut 1616 of the second mounting bracket 108 such that the shaft 2606 and/or, more generally, the second fastener 112 is movable between the locked position 2600 shown in FIGS. 26 and 27 and the unlocked position 2800 shown in FIGS. 28 and 29. In this regard, the second fastener 112 can be threadedly coupled to the threaded opening 1618 of the nut 1616 of the second mounting bracket 108 by placing the free end 2608 of the shaft 2606 into the threaded opening 1618 of the nut 1616, and then rotating the second fastener 112 (e.g., in a clockwise direction) so as to engage the threaded portion of the shaft 2606 with the threaded opening 1618 of the nut 1616. As shown in FIGS. 26 and 27, the free end 2608 of the shaft 2606 of the second fastener 112 partially blocks, obstructs, and/or otherwise interferes with an upper aspect of a forward portion of the mounting channel 1606 of the second mounting bracket 108 when the second fastener 112 is positioned in the locked position 2600. Conversely, as shown in FIGS. 28 and 29, the free end 2608 of the shaft 2606 of the second fastener 112 does not block, obstruct, and/or otherwise interfere with any aspect of the forward portion of the mounting channel 1606 of the second mounting bracket 108 when the second fastener 112 is positioned in the unlocked position 2800.

In the illustrated example of FIGS. 26-29, the second fastener 112 is movable from the locked position 2600 to the unlocked position 2800 by rotating the second fastener 112 in a counter-clockwise direction, and is conversely movable from the unlocked position 2800 to the locked position 2600 by rotating the second fastener 112 in a clockwise direction. In other examples, the second fastener 112 can instead be movable from the locked position 2600 to the unlocked position 2800 by rotating the second fastener 112 in a clockwise direction, and can conversely be movable from the unlocked position 2800 to the locked position 2600 by rotating the second fastener 112 in a counter-clockwise direction.

As described in greater detail below, the second fastener 112 is to be removed from the locked position 2600 of FIGS. 26 and 27 prior to the second mounting bracket 108 being transversely loaded onto a rotisserie spit. In this regard, the second fastener 112 will typically be unthreaded from the locked position 2600 of FIGS. 26 and 27 to the unlocked position 2800 of FIGS. 28 and 29 such that the free end 2608 of the shaft 2606 of the second fastener 112 is not blocking any aspect of the forward portion of the mounting channel 1606 of the second mounting bracket 108 in preparation of the second mounting bracket 108 being transversely loaded onto the rotisserie spit. Subsequent to the second mounting bracket 108 being transversely loaded onto the rotisserie spit via the rear opening 1614 of the mounting channel 1606 of the second mounting bracket 108, the second fastener 112 can thereafter be moved from the unlocked position 2800 of FIGS. 28 and 29 to the locked position 2600 of FIGS. 26 and 27 to securely couple the second mounting bracket 108 and/or, more generally, the base 102 of the rotisserie basket 100 to the rotisserie spit.

When the second fastener 112 is placed in the locked position 2600, the free end 2608 of the shaft 2606 of the second fastener 112 extends into the mounting channel 1606 of the second mounting bracket 108 so as to engage a rotisserie spit located therein. The engagement between the free end 2608 of the shaft 2606 of the second fastener 112 and the rotisserie spit forces the rotisserie spit into pressurized and/or forceable contact with the lower wall 1610 of the mounting channel 1006, thereby securely coupling the second mounting bracket 108 and/or, more generally, the base 102 of the rotisserie basket 100 to the rotisserie spit. The second mounting bracket 108 and/or, more generally, the base 102 of the rotisserie basket 100 can conversely be transversely unloaded from the rotisserie spit in response to the second fastener 112 being unthreaded from the locked position 2600 of FIGS. 26 and 27 to the unlocked position 2800 of FIGS. 28 and 29 such that the free end 2608 of the shaft 2606 of the second fastener 112 is no longer contacting the rotisserie spit, and/or such that the free end 2608 of the shaft 2606 of the second fastener 112 is no longer blocking any aspect of the forward portion of the mounting channel 1606 of the second mounting bracket 108 that would interfere with the rotisserie spit being removed therefrom.

In the illustrated example of FIGS. 1-9 and 26-29, the second clip 116 is constructed as a thin, semi-flexible rod having an example first end 2610, an example second end 2612 located opposite the first end 2610, and an example engagement portion 2614 located between the first end 2610 and the second end 2612. A portion of the second clip 116 located proximate the first end 2610 is configured to be pivotably coupled to the clip flange 1628 of the second mounting bracket 108 of the base 102 such that the second clip 116 is rotatable relative to the second mounting bracket 108, and such that the engagement portion 2614 of the second clip 116 is receivable and/or movable within the slot 1620 of the second mounting bracket 108. For example, as shown in FIGS. 26-29, the second clip 116 is pivotably coupled to the clip flange 1628 of the second mounting bracket 108 of the base 102 via an example rivet 2616 located proximate the first end 2610 of the second clip 116, with the rivet 2616 extending through an opening formed in the second clip 116 and further extending through the opening 1630 formed in the clip flange 1628.

In the illustrated example of FIGS. 26-29, the engagement portion 2614 of the second clip 116 is movable between the closed position 2602 shown in FIGS. 26 and 27 and the open position 2802 shown in FIGS. 28 and 29. In this regard, the second clip 116 can be moved between the closed position 2602 and the open position 2802 by physically manipulating the second end 2612 of the second clip 116 so as to cause the engagement portion 2614 of the second clip 116 to rotate and/or pivot relative to the slot 1620 of the second mounting bracket 108. As shown in FIGS. 26 and 27, the engagement portion 2614 of the second clip 116 blocks, obstructs, and/or otherwise interferes with a rearward portion of the mounting channel 1606 of the second mounting bracket 108 when the second clip 116 is positioned in the closed position 2602. Conversely, as shown in FIGS. 28 and 29, the engagement portion 2614 of the second clip 116 does not block, obstruct, and/or otherwise interfere with any aspect of the rearward portion of the mounting channel 1606 of the second mounting bracket 108 when the second clip 116 is positioned in the open position 2802.

As described in greater detail below, the second clip 116 is to be removed from the closed position 2602 of FIGS. 26 and 27 prior to the second mounting bracket 108 being transversely loaded onto a rotisserie spit. In this regard, the second clip 116 will typically be rotated from the closed position 2602 of FIGS. 26 and 27 to the open position 2802 of FIGS. 28 and 29 such that the engagement portion 2614 of the second clip 116 is not blocking any aspect of the rearward portion of the mounting channel 1606 of the second mounting bracket 108 in preparation of the second mounting bracket 108 being transversely loaded onto the rotisserie spit. Subsequent to the second mounting bracket 108 being transversely loaded onto the rotisserie spit via the rear opening 1614 of the mounting channel 1606 of the second mounting bracket 108, the second clip 116 can thereafter be moved from the open position 2802 of FIGS. 28 and 29 to the closed position 2602 of FIGS. 26 and 27 to further couple the second mounting bracket 108 and/or, more generally, the base 102 of the rotisserie basket 100 to the rotisserie spit.

When the second clip 116 is placed in the closed position 2602, the engagement portion 2614 of the second clip 116 extends through and/or across a rearward portion of the mounting channel 1606 (e.g., between the upper wall 1608 and the lower wall 1610) so as to transversely capture a rotisserie spit located within a forward portion of the mounting channel 1606. The second clip 116 accordingly functions as a safety clip that prevents the second mounting bracket 108 and/or, more generally, the base 102 of the rotisserie basket 100 from inadvertently being transversely removed from the rotisserie spit. In this regard, the engagement portion 2614 of the second clip 116 is biased (e.g., rearwardly biased) into the expansion notch 1626 of the slot 1620 of the second mounting bracket 108 when the second clip 116 is placed in the closed position 2602, with the expansion notch 1626 thereafter functioning as a mechanical stop that restricts the engagement portion 2614 of the second clip 116 from inadvertently sliding and/or rotating from the second end 1624 of the slot 1620 (e.g., out of the expansion notch 1626) back to the first end 1622 of the slot 1620 absent physical manipulation of the second clip 116 by a user. Thus, the second mounting bracket 108 and/or, more generally, the base 102 of the rotisserie basket 100 can only be transversely unloaded from the rotisserie spit in response to the second clip 116 being slid and/or rotated from the closed position 2602 of FIGS. 26 and 27 to the open position 2802 of FIGS. 28 and 29, such that the engagement portion 2614 of the second clip 116 is moved out of the expansion notch 1626 of the slot 1620, and such that the engagement portion 2614 of the second clip 116 is no longer blocking any aspect of the rearward portion of the mounting channel 1606 of the second mounting bracket 108 that would interfere with the rotisserie spit being removed therefrom.

As described above, the second clip 116 serves as a mechanical failsafe against inadvertent transverse removal of the second mounting bracket 108 and/or, more generally, the base 102 of the rotisserie basket 100 from the rotisserie spit. In this regard, it is the second fastener 112, rather than the second clip 116, that securely couples the second mounting bracket 108 and/or, more generally, the base 102 of the rotisserie basket 100 to the rotisserie spit. Thus, in other examples, the second clip 116 (as well as the associated slot 1620 and the associated clip flange 1628) can be omitted from the second mounting bracket 108 and/or, more generally, the base 102 of the rotisserie basket 100 without negatively impacting the capability of securely coupling the second mounting bracket 108 and/or, more generally, the base 102 of the rotisserie basket 100 to the rotisserie spit.

Figure 30:
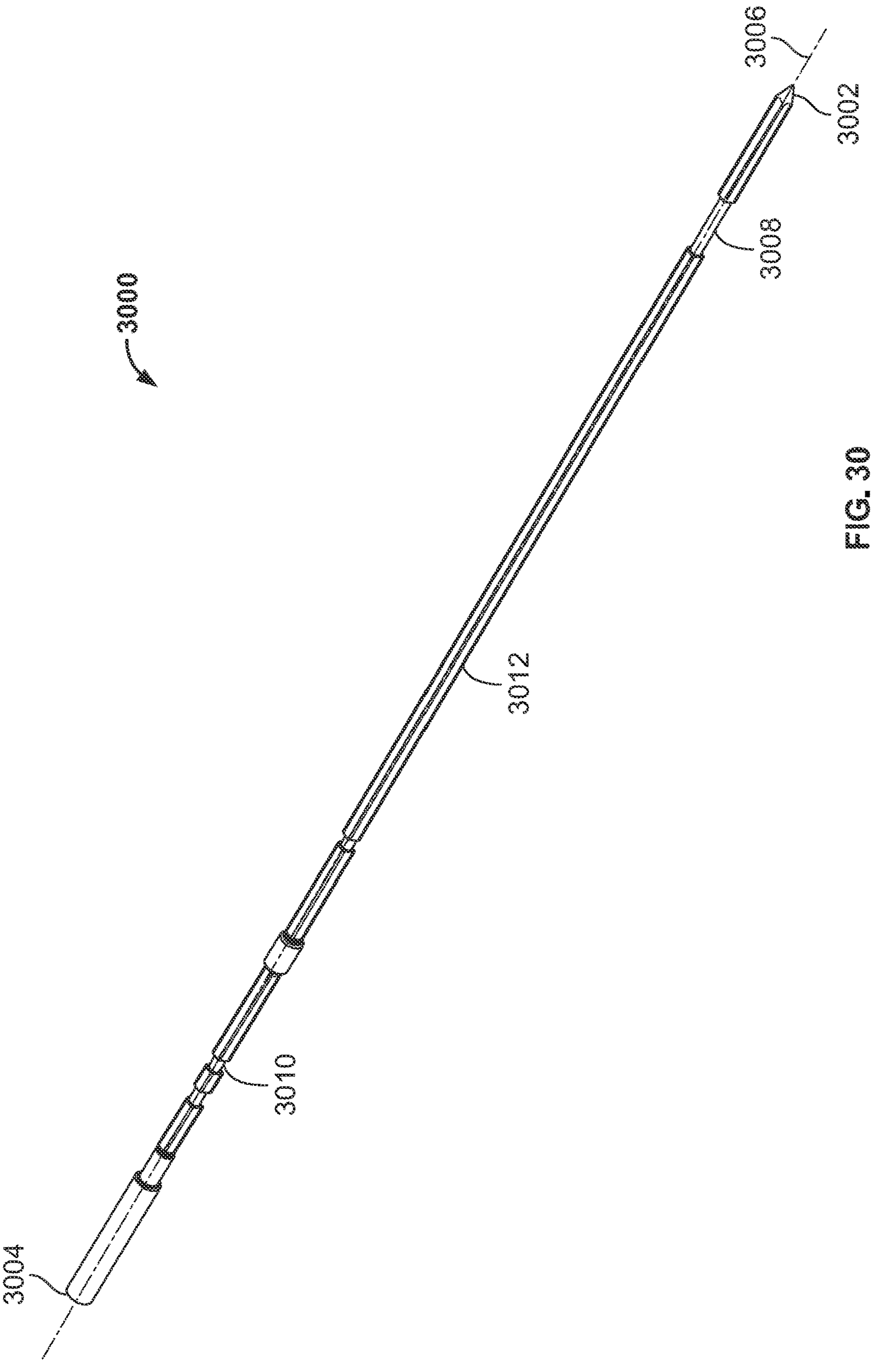
FIG. 30 is a perspective view of an example rotisserie spit.

FIG. 30 is a perspective view of an example rotisserie spit 3000. The rotisserie spit 3000 of FIG. 30 includes an example first end 3002, an example second end 3004 located opposite the first end 3002, and an example longitudinal axis 3006 extending between the first end 3002 and the second end 3004. The first end 3002 of the rotisserie spit 3000 is configured to be operatively coupled to a motor of a rotisserie cooking system, whereby the motor is configured to rotate the rotisserie spit 3000 about its longitudinal axis 3006 to facilitate rotisserie-style cooking.

The rotisserie spit 3000 of FIG. 30 is configured to extend across the width of a cookbox of a grill. In this regard, the rotisserie spit 3000 includes an example first axial segment 3008 located toward the first end 3002 of the rotisserie spit 3000, an example second axial segment 3010 located toward the second end 3004 of the rotisserie spit 3000, and an example third axial segment 3012 located between the first axial segment 3008 and the second axial segment 3010 of the rotisserie spit 3000. The first axial segment 3008 is configured to be positioned within and/or supported by a notched portion of a right sidewall of the cookbox of the grill. The second axial segment 3010 is configured to be positioned within and/or supported by a notched portion of a left sidewall of the cookbox of the grill. The third axial segment 3012 is configured to be positioned between the right sidewall and the left sidewall of the cookbox of the grill.

The first axial segment 3008 and the second axial segment 3010 of the rotisserie spit 3000 respectively have a circular cross-sectional profile that facilitates rotation of the rotisserie spit 3000 on and/or within the cookbox of the grill. The third axial segment 3012 of the rotisserie spit 3000 has a rectangular cross-sectional profile that facilitates (1) transversely loading the first mounting bracket 106, the second mounting bracket 108, and/or, more generally, the rotisserie basket 100 onto the third axial segment 3012 of the rotisserie spit 3000, and (2) securely coupling the first mounting bracket 106, the second mounting bracket 108, and/or, more generally, the rotisserie basket 100 to the third axial segment 3012 of the rotisserie spit 3000 such that the first mounting bracket 106, the second mounting bracket 108, and/or, more generally, the rotisserie basket 100 rotate(s) along with the rotation (e.g., the motor-driven rotation) of the rotisserie spit 3000.

Figure 31:
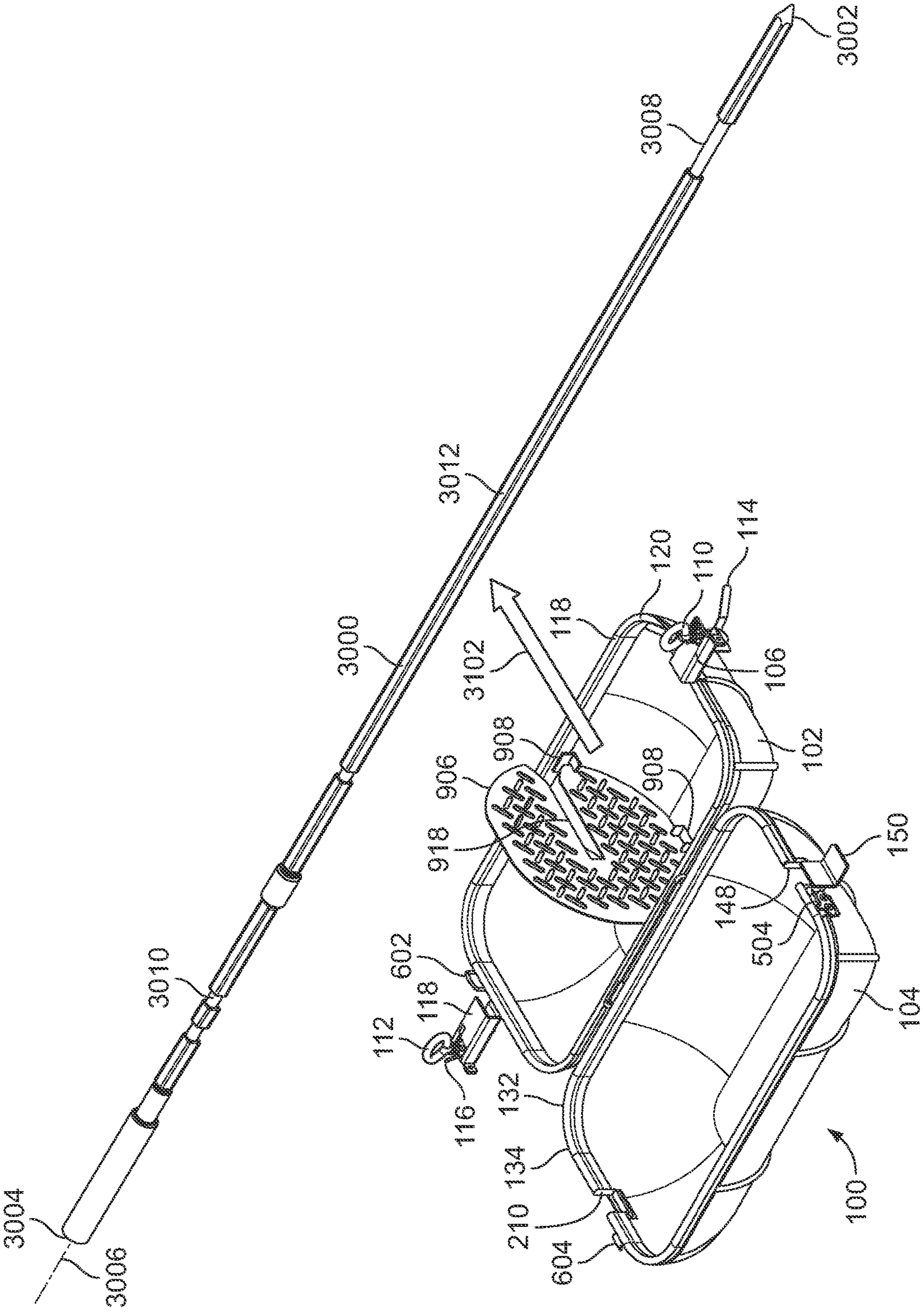
FIG. 31 is a perspective view of the rotisserie basket of FIGS. 1-9 positioned for transverse loading onto the rotisserie spit of FIG. 31.
Figure 32:
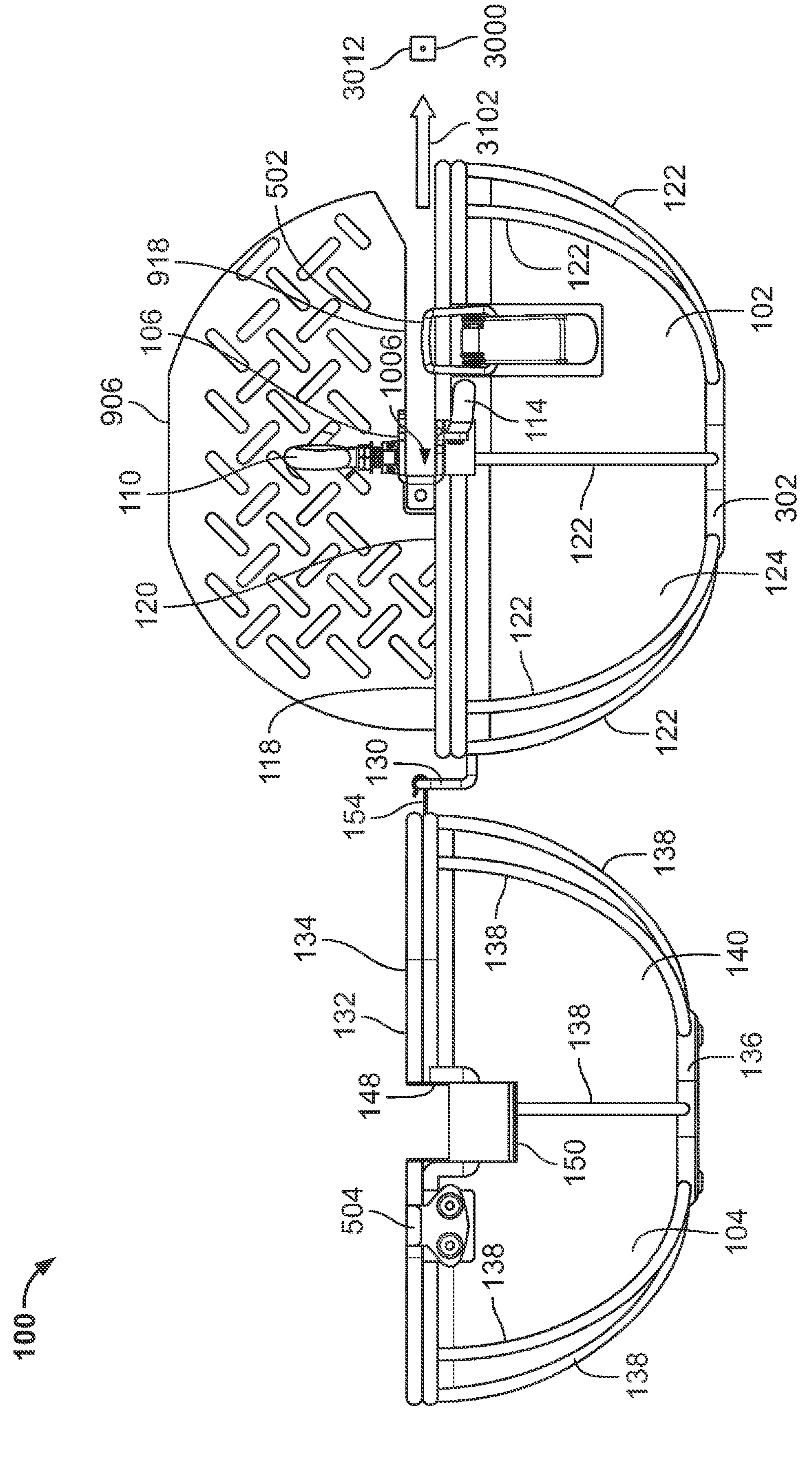
FIG. 32 is a right side view of the rotisserie basket of FIGS. 1-9 and 31 positioned for transverse loading onto the rotisserie spit of FIGS. 30 and 31.
Figure 33:
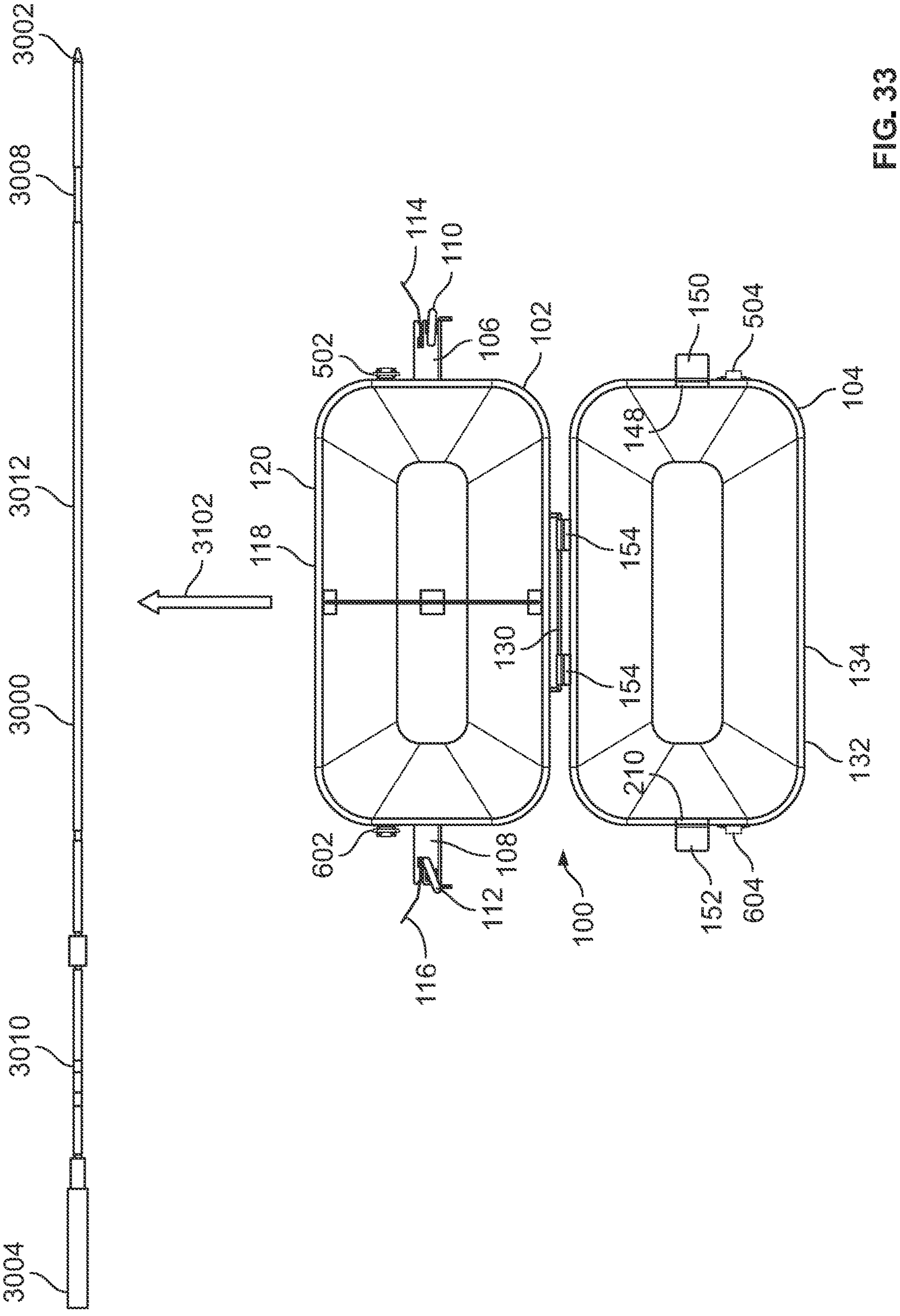
FIG. 33 is a top view of the rotisserie basket of FIGS. 1-9, 31 and 32 positioned for transverse loading onto the rotisserie spit of FIGS. 30-32.

FIG. 31 is a perspective view of the rotisserie basket 100 of FIGS. 1-9 positioned for transverse loading onto the rotisserie spit 3000 of FIG. 30. FIG. 32 is a right side view of the rotisserie basket 100 of FIGS. 1-9 and 31 positioned for transverse loading onto the rotisserie spit 3000 of FIGS. 30 and 31. FIG. 33 is a top view of the rotisserie basket 100 of FIGS. 1-9, 31, and 32 positioned for transverse loading onto the rotisserie spit 3000 of FIGS. 30-32. In the illustrated example of FIGS. 31-33, the lid 104 of the rotisserie basket 100 is positioned in the open position 900 of FIG. 9 relative to the base 102 of the rotisserie basket 100. The base 102 of the rotisserie basket 100 is located forward of the rotisserie spit 3000, with the rear opening 1014 of the mounting channel 1006 of the first mounting bracket 106, the rear opening 1614 of the mounting channel 1606 of the second mounting bracket 108, and the rear opening 926 of the divider channel 918 of the divider 906 being respectively oriented toward the rotisserie spit 3000. The mounting channel 1006 of the first mounting bracket 106, the mounting channel 1606 of the second mounting bracket 108, and the divider channel 918 of the divider 906 are laterally (e.g., axially) aligned with one another to advantageously enable concurrent transverse loading of the first mounting bracket 106, the second mounting bracket 108, and the divider 906 of the rotisserie basket 100 onto the rotisserie spit 3000.

As further shown in FIGS. 31-33, the first fastener 110 of the base 102 is positioned in an unlocked position (e.g., the unlocked position 2400 of FIGS. 24 and 25) and the first clip 114 of the base 102 is positioned in an open position (e.g., the open position 2402 of FIGS. 24 and 25) such that the first fastener 110 and the first clip 114 are not blocking any portion of the mounting channel 1006 of the first mounting bracket 106 of the base 102 in preparation of the first mounting bracket 106 being transversely loaded onto the rotisserie spit 3000. Similarly, the second fastener 112 of the base 102 is positioned in an unlocked position (e.g., the unlocked position 2800 of FIGS. 28 and 29) and the second clip 116 of the base 102 is positioned in an open position (e.g., the open position 2802 of FIGS. 28 and 29) such that the second fastener 112 and the second clip 116 are not blocking any portion of the mounting channel 1606 of the second mounting bracket 108 of the base 102 in preparation of the second mounting bracket 108 being transversely loaded onto the rotisserie spit 3000. With the first fastener 110, the second fastener 112, the first clip 114, and the second clip 116 of the base 102 being respectively positioned in the aforementioned manner, the base 102, the first mounting bracket 106, the second mounting bracket 108, and/or, more generally, the rotisserie basket 100 can be transversely loaded onto the rotisserie spit 3000 by moving the base 102, the first mounting bracket 106, the second mounting bracket 108, and/or, more generally, the rotisserie basket 100 away from the position shown in FIGS. 31-33 in and/or along an example transverse direction 3102 (e.g., a rearward direction) that is generally orthogonal relative to the longitudinal axis 3006 of the rotisserie spit 3000.

Figure 34:
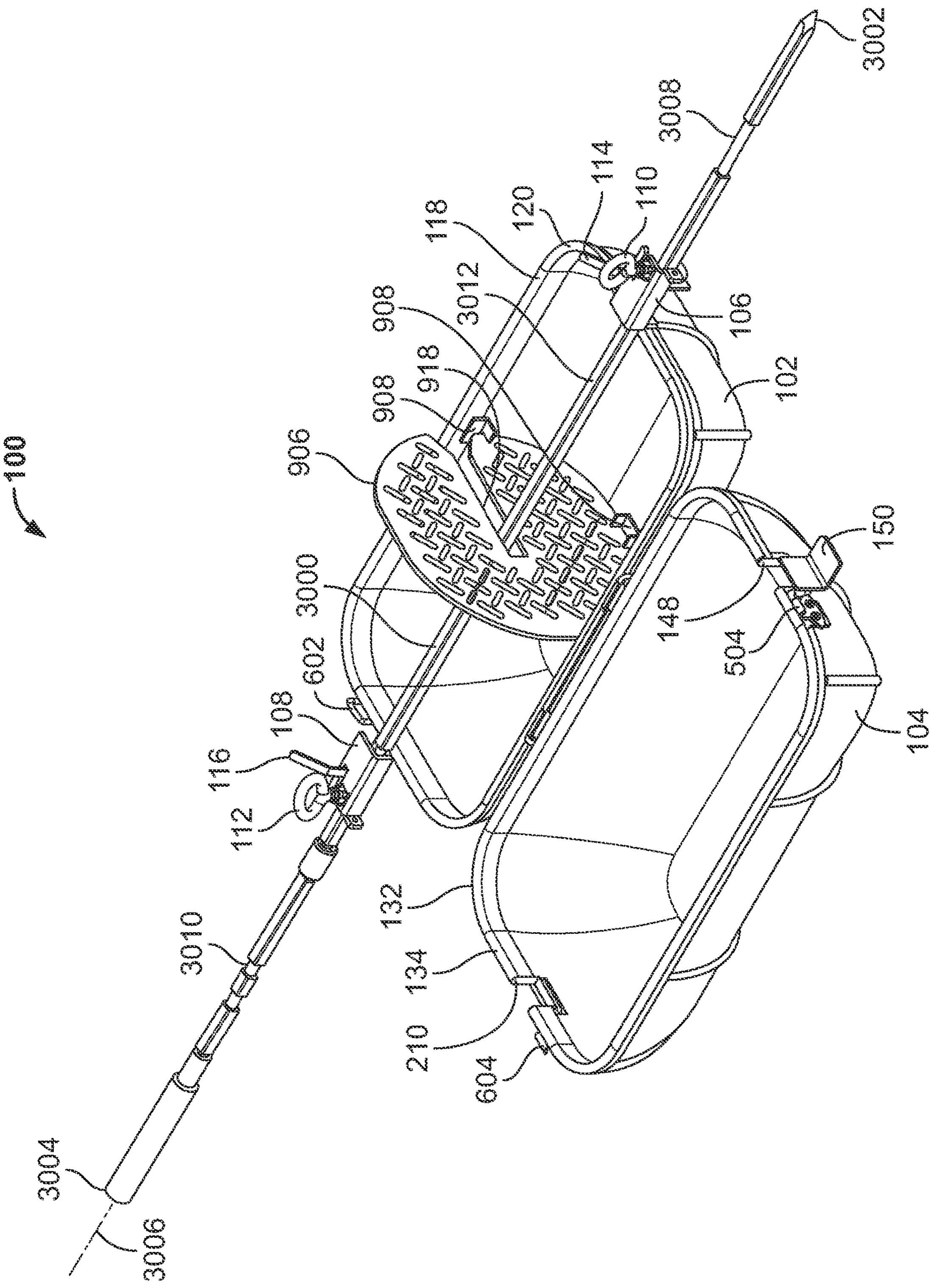
FIG. 34 is a perspective view of the rotisserie basket of FIGS. 1-9 and 31-33 transversely loaded onto the rotisserie spit of FIGS. 30-33, with the lid of the rotisserie basket shown in the open position of FIGS. 9 and 31-33.
Figure 35:
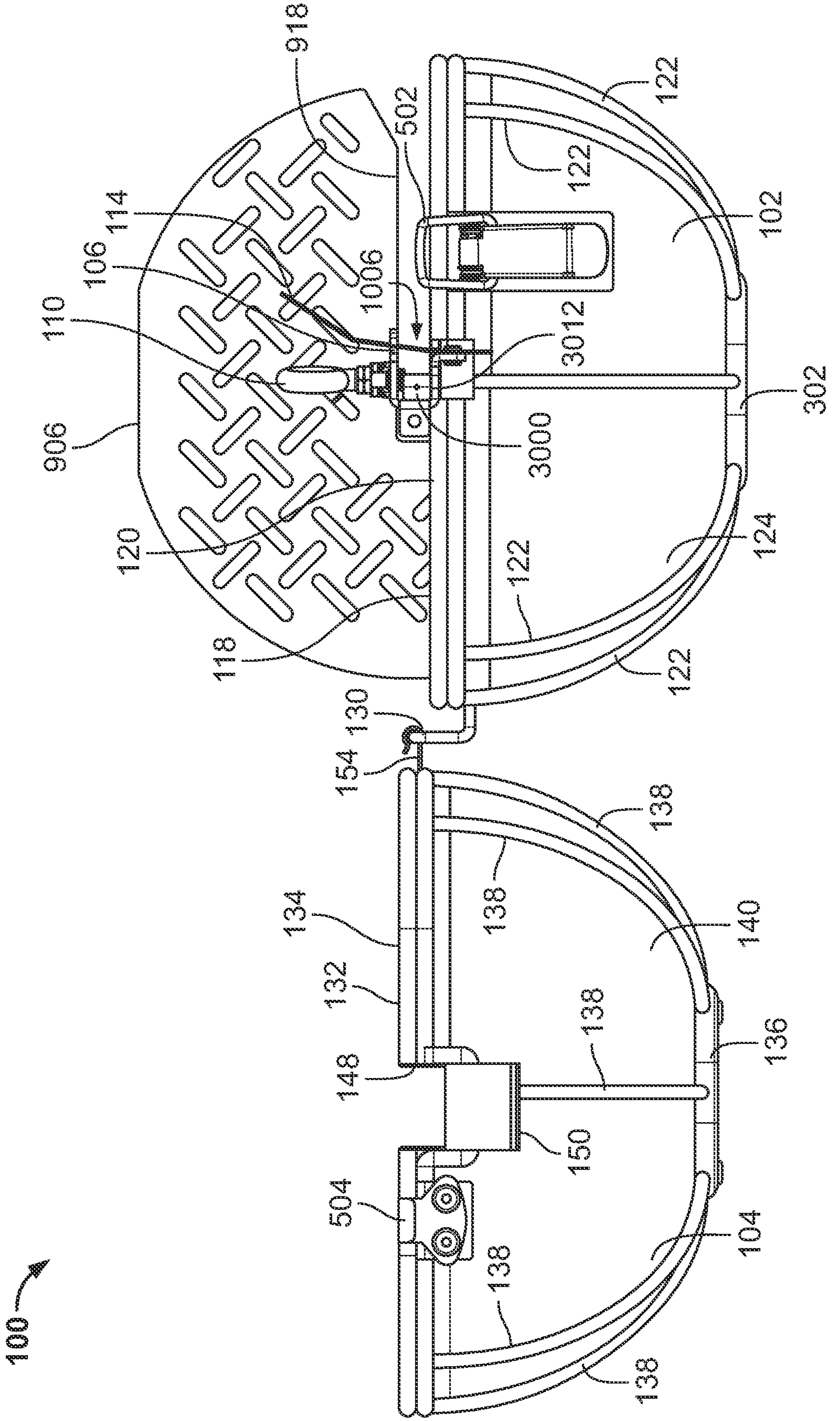
FIG. 35 is a right side view of the rotisserie basket of FIGS. 1-9 and 31-34 transversely loaded onto the rotisserie spit of FIGS. 30-34, with the lid of the rotisserie basket shown in the open position of FIGS. 9 and 31-34.
Figure 36:
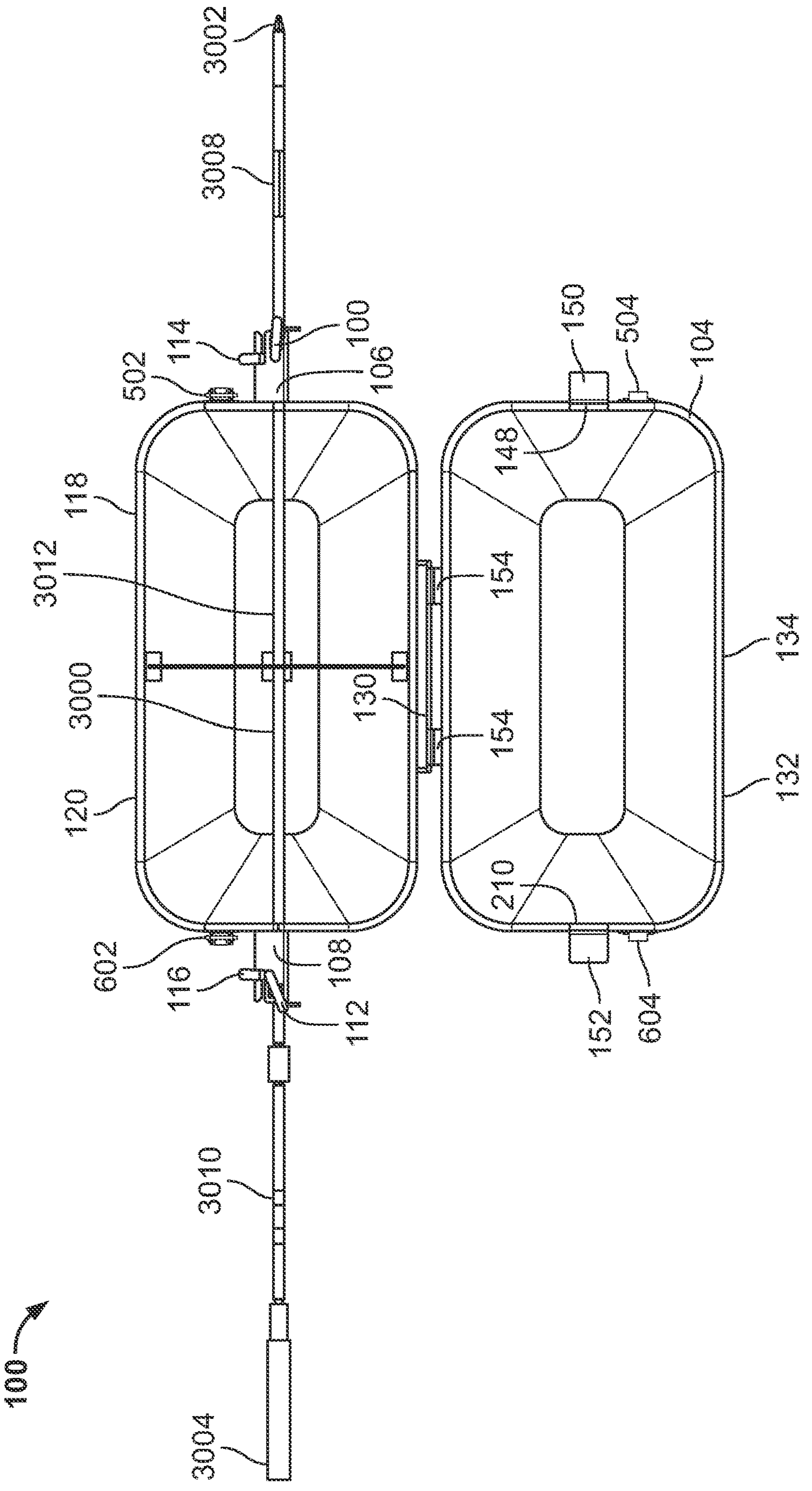
FIG. 36 is a top view of the rotisserie basket of FIGS. 1-9 and 31-35 transversely loaded onto the rotisserie spit of FIGS. 30-35, with the lid of the rotisserie basket shown in the open position of FIGS. 9 and 31-35.

FIG. 34 is a perspective view of the rotisserie basket 100 of FIGS. 1-9 and 31-33 transversely loaded onto the rotisserie spit 3000 of FIGS. 30-33, with the lid 104 of the rotisserie basket 100 shown in the open position of FIGS. 9 and 31-33. FIG. 35 is a right side view of the rotisserie basket 100 of FIGS. 1-9 and 31-34 transversely loaded onto the rotisserie spit 3000 of FIGS. 30-34, with the lid 104 of the rotisserie basket 100 shown in the open position of FIGS. 9 and 31-34. FIG. 36 is a top view of the rotisserie basket 100 of FIGS. 1-9 and 31-35 transversely loaded onto the rotisserie spit 3000 of FIGS. 30-35, with the lid 104 of the rotisserie basket 100 shown in the open position of FIGS. 9 and 31-35.

In the illustrated example of FIGS. 34-36, the first mounting bracket 106, the second mounting bracket 108, and/or, more generally, the base 102 of the rotisserie basket 100 has/have been transversely loaded onto the rotisserie spit 3000 by moving the first mounting bracket 106, the second mounting bracket 108, and/or, more generally, the base 102 of the rotisserie basket 100 away from the position shown in FIGS. 31-33 and onto the rotisserie spit 3000 in and/or along the transverse direction 3102 shown in FIGS. 31-33. Transversely loading the first mounting bracket 106, the second mounting bracket 108, and/or, more generally, the rotisserie basket 100 onto the rotisserie spit 3000 as shown in FIGS. 34-36 results in the rotisserie spit 3000 (e.g., the third axial segment 3012 of the rotisserie spit 3000) being located within and extending laterally (e.g., axially) through the mounting channel 1006 of the first mounting bracket 106, the mounting channel 1606 of the second mounting bracket 108, and the divider channel 918 of the divider 906 of the rotisserie basket 100.

In the illustrated example of FIGS. 34-36, the first fastener 110 has been moved from the unlocked position 2400 (e.g., as shown in FIGS. 24, 25, and 31-33) into the locked position 2200 (e.g., as shown in FIGS. 22 and 23), the first clip 114 has been moved from the open position 2402 (e.g., as shown in FIGS. 24, 25, and 31-33) into the closed position 2202 (e.g., as shown in FIGS. 22 and 23), the second fastener 112 has been moved from unlocked position 2800 (e.g., as shown in FIGS. 28, 29, and 31-33) into the locked position 2600 (e.g., as shown in FIGS. 26 and 27), and the second clip 116 has been moved from open position 2802 (e.g., as shown in FIGS. 28, 29, and 31-33) into the closed position 2602 (e.g., as shown in FIGS. 26 and 27). Positioning the first fastener 110 in the locked position 2200 securely couples the first mounting bracket 106 and/or, more generally, the base 102 of the rotisserie basket 100 to the rotisserie spit 3000 (e.g., to the third axial segment 3012 of the rotisserie spit 3000) such that the first mounting bracket 106 and/or, more generally, the base 102 rotate(s) along with the rotation (e.g., the motor-driven rotation) of the rotisserie spit 3000. Positioning the first clip 114 in the closed position 2202 provides a mechanical failsafe that prevents the first mounting bracket 106 and/or, more generally, the base 102 of the rotisserie basket 100 from inadvertently being transversely removed from the rotisserie spit 3000. Positioning the second fastener 112 in the locked position 2600 securely couples the second mounting bracket 108 and/or, more generally, the base 102 of the rotisserie basket 100 to the rotisserie spit 3000 (e.g., to the third axial segment 3012 of the rotisserie spit 3000) such that the second mounting bracket 108 and/or, more generally, the base 102 rotate(s) along with the rotation (e.g., the motor-driven rotation) of the rotisserie spit 3000. Positioning the second clip 116 in the closed position 2602 provides a mechanical failsafe that prevents the second mounting bracket 108 and/or, more generally, the base 102 of the rotisserie basket 100 from inadvertently being transversely removed from the rotisserie spit 3000.

Figure 37:
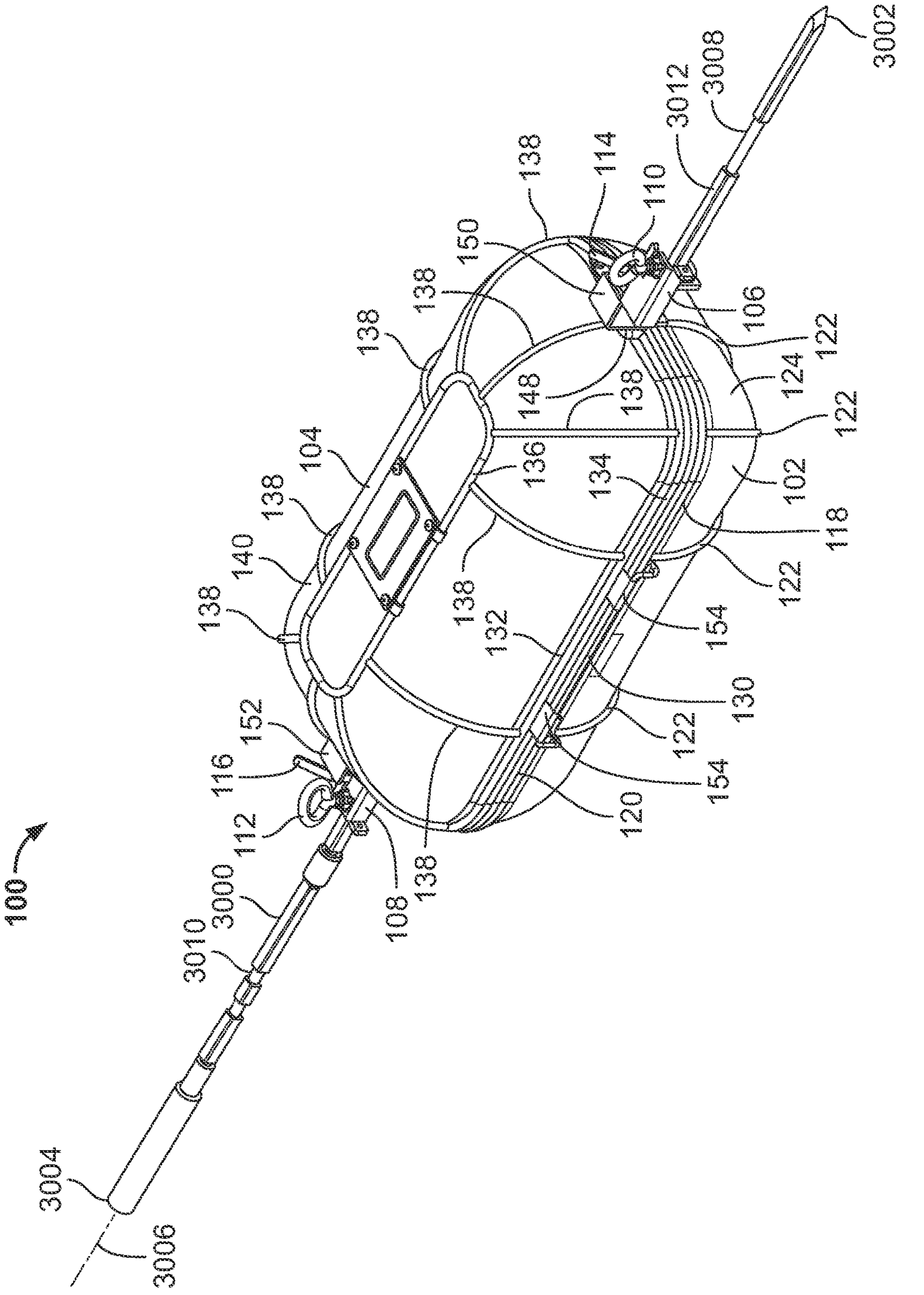
FIG. 37 is a perspective view of the rotisserie basket of FIGS. 1-9 and 31-36 transversely loaded onto the rotisserie spit of FIGS. 30-36, with the lid of the rotisserie basket shown in the closed position of FIGS. 1-8.
Figure 38:
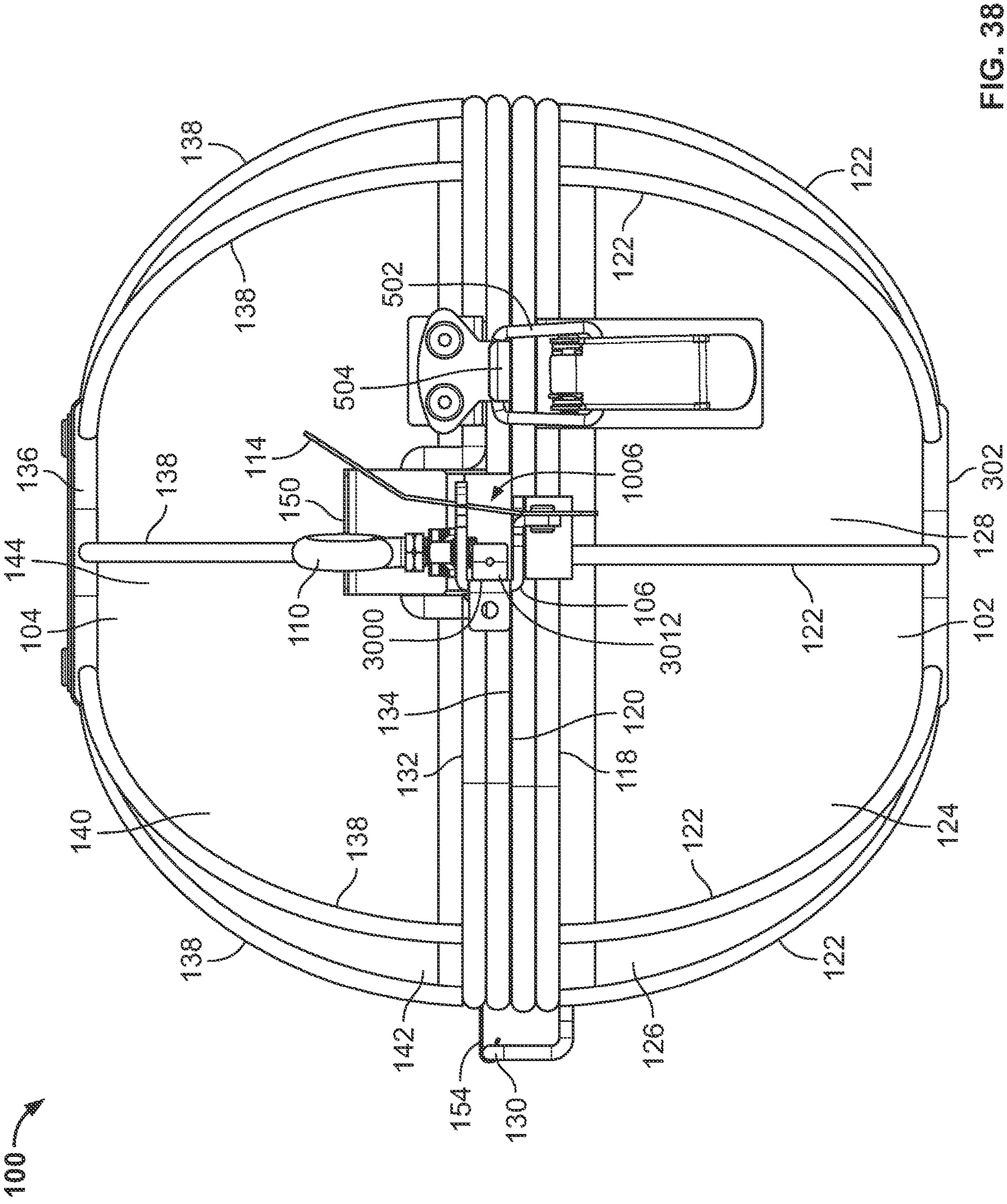
FIG. 38 is a right side view of the rotisserie basket of FIGS. 1-9 and 31-37 transversely loaded onto the rotisserie spit of FIGS. 30-37, with the lid of the rotisserie basket shown in the closed position of FIGS. 1-8 and 37.
Figure 39:
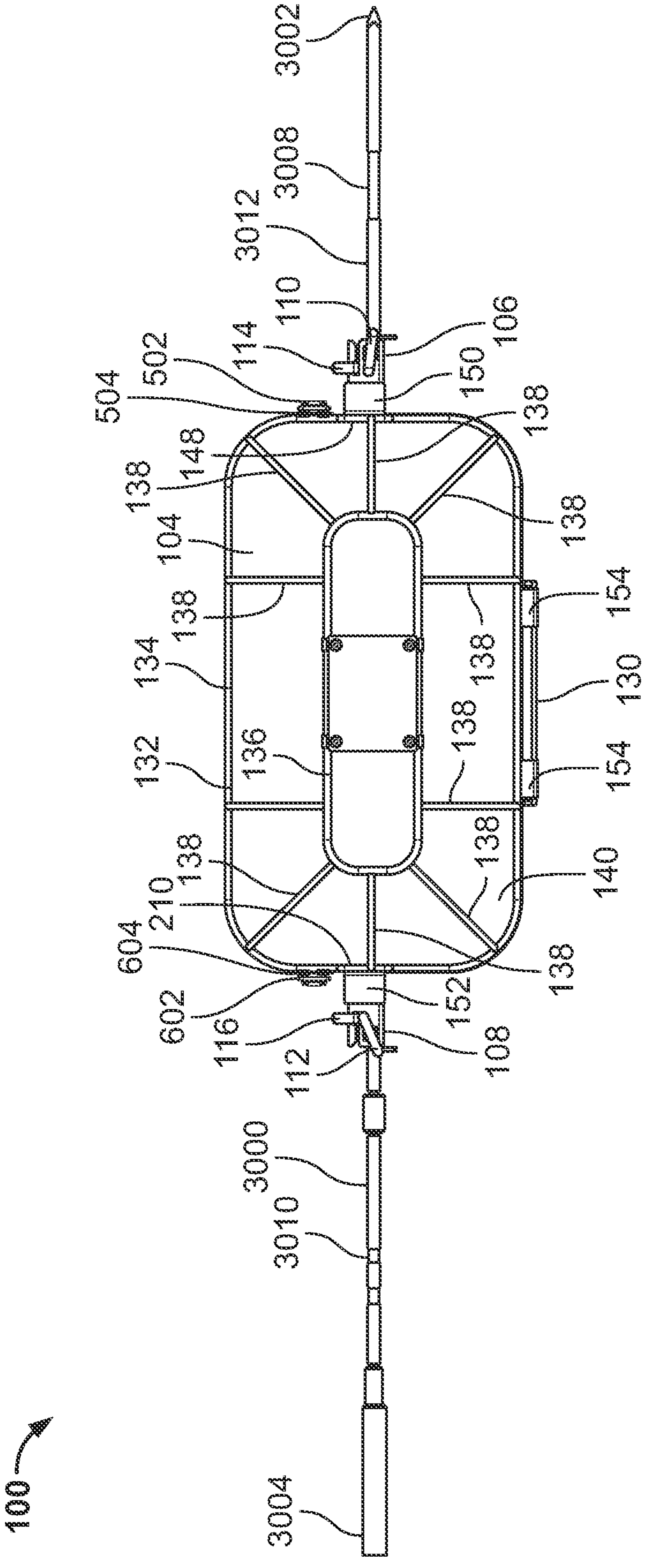
FIG. 39 is a top view of the rotisserie basket of FIGS. 1-9 and 31-38 transversely loaded onto the rotisserie spit of FIGS. 30-38, with the lid of the rotisserie basket shown in the closed position of FIGS. 1-8, 37, and 38.

FIG. 37 is a perspective view of the rotisserie basket 100 of FIGS. 1-9 and 31-36 transversely loaded onto the rotisserie spit 3000 of FIGS. 30-36, with the lid 104 of the rotisserie basket 100 shown in the closed position of FIGS. 1-8. FIG. 38 is a right side view of the rotisserie basket 100 of FIGS. 1-9 and 31-37 transversely loaded onto the rotisserie spit 3000 of FIGS. 30-37, with the lid 104 of the rotisserie basket 100 shown in the closed position of FIGS. 1-8 and 37. FIG. 39 is a top view of the rotisserie basket 100 of FIGS. 1-9 and 31-38 transversely loaded onto the rotisserie spit 3000 of FIGS. 30-38, with the lid 104 of the rotisserie basket 100 shown in the closed position of FIGS. 1-8, 37, and 38. In the illustrated example of FIGS. 37-39, the first fastener 110, the first clip 114, the second fastener 112, and the second clip 116 are respectively positioned in the same positions as shown and described above in connection with FIGS. 34-36. Thus, the first fastener 110 is positioned in the locked position 2200 (e.g., as shown in FIGS. 22, 23, and 34-36), the first clip 114 is positioned in the closed position 2202 (e.g., as shown in FIGS. 22, 23, and 34-36), the second fastener 112 is positioned in the locked position 2600 (e.g., as shown in FIGS. 26, 27, and 34-36), and the second clip 116 is positioned in the closed position 2602 (e.g., as shown in FIGS. 26, 27, and 34-36).

As further shown in FIGS. 37-39, the lid 104 of the rotisserie basket 100 has been moved relative to the base 102 of the rotisserie basket 100 from the open position of FIGS. 9 and 31-36 into the closed position of FIGS. 1-8. As a result of the lid 104 closure, the rotisserie spit 3000 (e.g., the third axial segment 3012 of the rotisserie spit 3000), in addition to being located within and extending laterally (e.g., axially) through the mounting channel 1006 of the first mounting bracket 106, the mounting channel 1606 of the second mounting bracket 108, and the divider channel 918 of the divider 906 of the rotisserie basket 100, is also located within and extends laterally (e.g., axially) through the first notch 148 and the second notch 210 of the frame 132 of the lid 104 of the rotisserie basket 100. In this regard, the first notch 148 and the second notch 210 of the frame 132 provide an additional or alternative mechanical failsafe (e.g., relative to the first clip 114 and the second clip 116) that prevents the rotisserie basket 100 from inadvertently being transversely removed from the rotisserie spit 3000 while the lid 104 remains closed. As further shown in FIGS. 37-39, the first latch 502 and the second latch 602 of the base 102 of the rotisserie basket 100 have respectively been coupled to corresponding ones of the first catch 504 and the second catch 604 of the lid 104 of the rotisserie basket 100, thereby securely coupling the lid 104 of the rotisserie basket 100 to the base 102 of the rotisserie basket 100.

Figure 40:
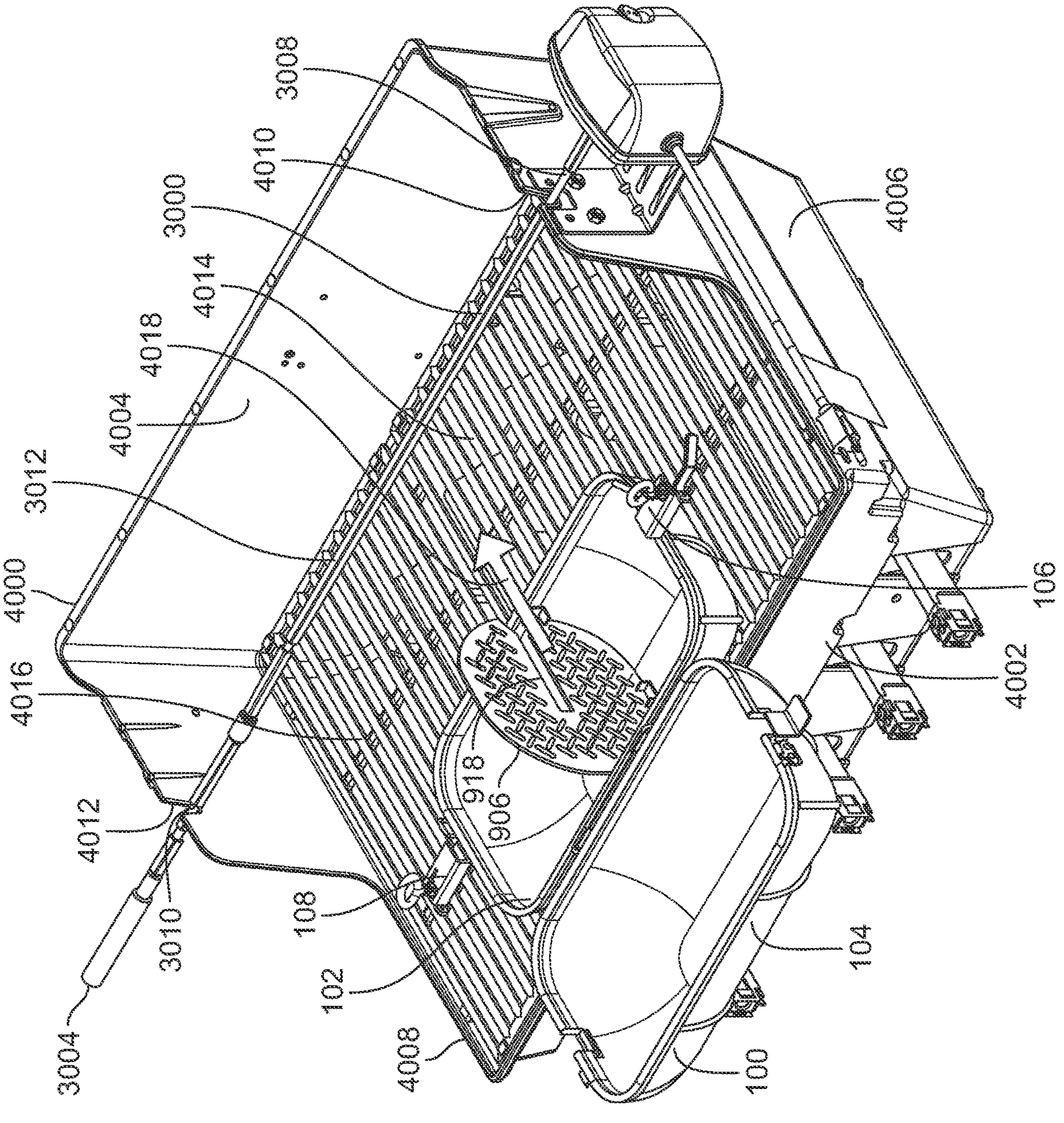
FIG. 40 is a perspective view of an example cookbox of a grill, showing the rotisserie basket of FIGS. 1-9 and 31-39 positioned for transverse loading onto the rotisserie spit of FIGS. 30-39.

FIG. 40 is a perspective view of an example cookbox 4000 of a grill, showing the rotisserie basket 100 of FIGS. 1-9 and 31-39 positioned for transverse loading onto the rotisserie spit 3000 of FIGS. 30-39. The cookbox 4000 of FIG. 40 includes an example front wall 4002, an example rear wall 4004 located opposite the front wall 4002, an example right sidewall 4006 extending between the front wall 4002 and the rear wall 4004, and an example left sidewall 4008 located opposite the right sidewall 4006 and extending between the front wall 4002 and the rear wall 4004. The right sidewall 4006 of the cookbox 4000 includes an example first notched portion 4010 configured to support the first axial segment 3008 of the rotisserie spit 3000. The left sidewall 4008 of the cookbox 4000 includes an example second notched portion 4012 that is laterally (e.g., axially) aligned with the first notched portion 4010 of the right sidewall 4006 of the cookbox 4000 and configured to support the second axial segment 3010 of the rotisserie spit 3000. The rotisserie spit 3000 is accordingly configured to extend laterally (e.g., axially) from the right sidewall 4006 of the cookbox 4000 to the left sidewall 4008 of the cookbox 4000, with the third axial segment 3012 of the rotisserie spit 3000 being located between the right sidewall 4006 of the cookbox 4000 and the left sidewall 4008 of the cookbox 4000.

In the illustrated example of FIG. 40, the cookbox 4000 carries, supports, contains, houses, and/or otherwise includes one or more burner tube(s) configured to generate and/or emit heat-producing gas flames. As shown in FIG. 40, the cookbox 4000 is configured to include four burner tubes. In other examples, the cookbox 4000 can instead include a different number (e.g., 2, 3, 5, etc.) of burner tubes. Furthermore, although FIG. 40 illustrates burner tubes of a cookbox of a gas grill, in other examples the cookbox 4000 can instead be configured to include a burn pot of a pellet grill, an electric heating element of an electric grill, a charcoal rack or bin of a charcoal grill, etc. It should accordingly be understood that the cookbox 4000 shown in FIG. 40 represents one particular cookbox configuration and/or grill type from among many cookbox configurations and/or grill types with which the rotisserie basket 100 disclosed herein can be used.

The cookbox 4000 of FIG. 40 also carries, supports, contains, houses, and/or otherwise includes one or more grease deflection bar(s) configured to have an inverted V-shaped profile. As one or more food item(s) is/are cooked within the cookbox 4000, grease produced by the cooking food item(s) falls downward onto the grease deflection bar(s). The inverted V-shaped profile of each grease deflection bar directs such grease to a further downward location within the cookbox 4000, while in some instances also shielding an underlying one of the aforementioned burner tubes of the cookbox 4000 from being exposed to such grease. The cookbox 4000 of FIG. 40 also carries, supports, contains, houses, and/or otherwise includes one or more cooking grate(s) configured to form and/or define a substantially flat, planar cooking surface for cooking one or more food item(s) placed thereon. For example, as shown in FIG. 40, the cookbox 4000 carries, supports, contains, houses, and/or otherwise includes an example first cooking grate 4014 and an example second cooking grate 4016, with the second cooking grate 4016 being positioned in a side-by-side arrangement relative to the first cooking grate 4014.

In the illustrated example of FIG. 40, the rotisserie spit 3000 and the rotisserie basket 100 are respectively positioned on and/or within the cookbox 4000 above and/or over the first cooking grate 4014 and the second cooking grate 4016. The first cooking grate 4014 and the second cooking grate 4016 are respectively positioned within the cookbox 4000 above and/or over the grease deflection bar(s). The grease deflection bar(s) is/are positioned within the cookbox 4000 above and/or over the burner tube(s). In other examples, the first cooking grate 4014 and/or the second cooking grate 4016 can be removed from the cookbox 4000 to provide additional clearance for the rotisserie spit 3000 and/or the rotisserie basket 100 within the cookbox 4000.

In the illustrated example of FIG. 40, the lid 104 of the rotisserie basket 100 is positioned in the open position 900 of FIGS. 9 and 31-36 relative to the base 102 of the rotisserie basket 100. The base 102 of the rotisserie basket 100 is located forward of the rotisserie spit 3000, with the rear opening 1014 of the mounting channel 1006 of the first mounting bracket 106, the rear opening 1614 of the mounting channel 1606 of the second mounting bracket 108, and the rear opening 926 of the divider channel 918 of the divider 906 being respectively oriented toward the rotisserie spit 3000. The mounting channel 1006 of the first mounting bracket 106, the mounting channel 1606 of the second mounting bracket 108, and the divider channel 918 of the divider 906 are laterally (e.g., axially) aligned with one another to advantageously enable concurrent transverse loading of the first mounting bracket 106, the second mounting bracket 108, and the divider 906 of the rotisserie basket 100 onto the rotisserie spit 3000.

In the illustrated example of FIG. 40, the first fastener 110 of the base 102 is positioned in an unlocked position (e.g., the unlocked position 2400 of FIGS. 24, 25, and 31-33) and the first clip 114 of the base 102 is positioned in an open position (e.g., the open position 2402 of FIGS. 24, 25, and 31-33) such that the first fastener 110 and the first clip 114 are not blocking any portion of the mounting channel 1006 of the first mounting bracket 106 of the base 102 in preparation of the first mounting bracket 106 and/or, more generally, the base 102 being transversely loaded onto the rotisserie spit 3000. Similarly, the second fastener 112 of the base 102 is positioned in an unlocked position (e.g., the unlocked position 2800 of FIGS. 28, 29, and 31-33) and the second clip 116 of the base 102 is positioned in an open position (e.g., the open position 2802 of FIGS. 28, 29, and 31-33) such that the second fastener 112 and the second clip 116 are not blocking any portion of the mounting channel 1606 of the second mounting bracket 108 of the base 102 in preparation of the second mounting bracket 108 and/or, more generally, the base 102 being transversely loaded onto the rotisserie spit 3000. With the first fastener 110, the second fastener 112, the first clip 114, and the second clip 116 of the base 102 being respectively positioned in the aforementioned manner, the base 102, the first mounting bracket 106, the second mounting bracket 108, and/or, more generally, the rotisserie basket 100 can be transversely loaded onto the rotisserie spit 3000 by moving the base 102, the first mounting bracket 106, the second mounting bracket 108, and/or, more generally, the rotisserie basket 100 in and/or along an example transverse direction 2718 (e.g., away from the front wall 2702 of the cookbox 4000 and toward the rear wall 4004 of the cookbox 4000) that is generally orthogonal relative to the longitudinal axis 3006 of the rotisserie spit 3400.

The transverse loading of the first mounting bracket 106, the second mounting bracket 108, and/or, more generally, the base 102 of the rotisserie basket 100 onto the rotisserie spit 3000 can advantageously be carried out and/or completed while the rotisserie spit 3000 remains positioned on the cookbox 4000 (e.g., while the first axial segment 3008 of the rotisserie spit 3000 remains positioned within the first notched portion 4010 of the right sidewall 4006 of the cookbox 4000, and while the second axial segment 3010 of the rotisserie spit 3000 remains positioned within the second notched portion 4012 of the left sidewall 4008 of the cookbox 4000).

Figure 41:
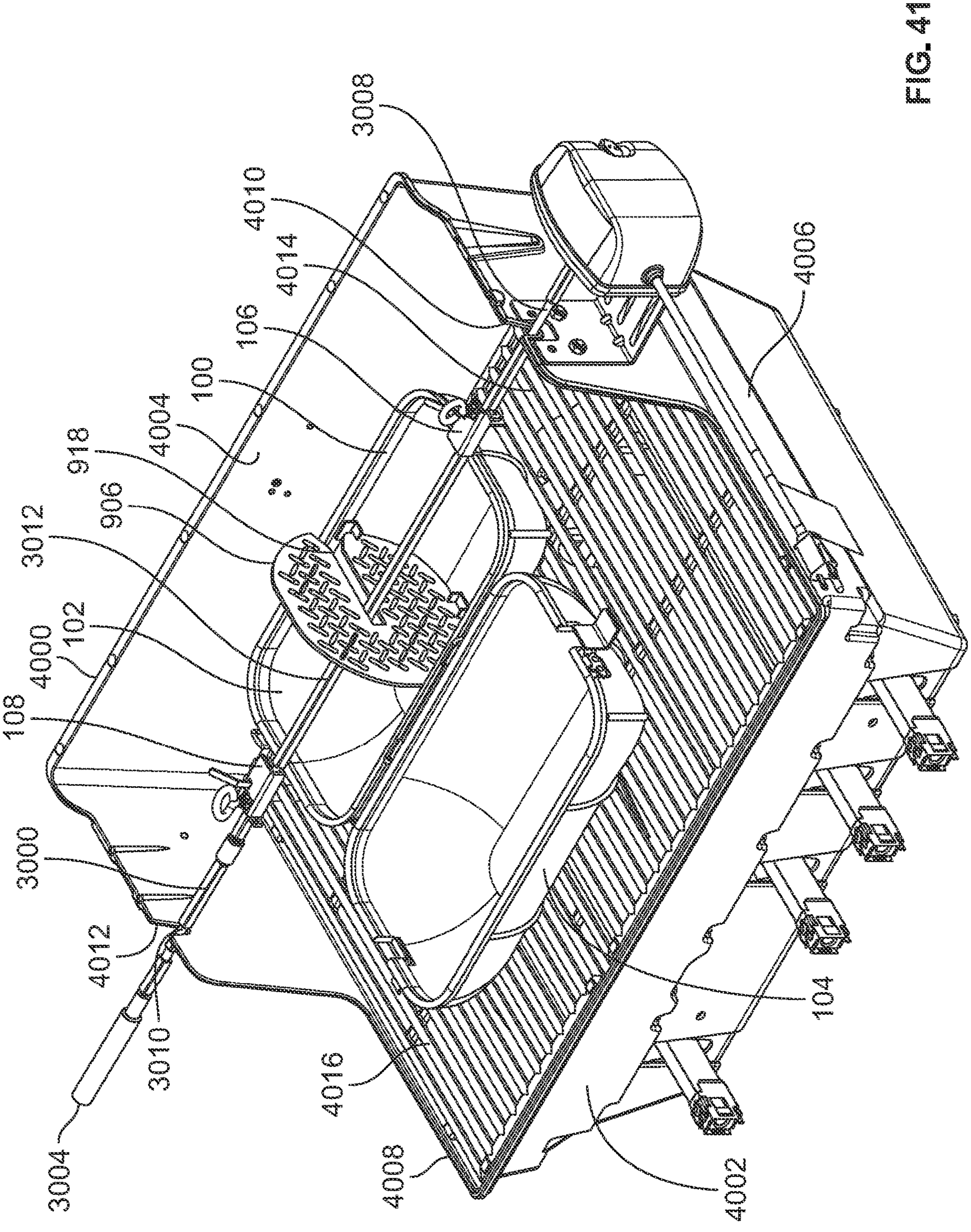
FIG. 41 is a perspective view of the cookbox of the grill of FIG. 40, showing the rotisserie basket of FIGS. 1-9 and 31-40 transversely loaded onto the rotisserie spit of FIGS. 30-40, with the lid of the rotisserie basket shown in the open position of FIGS. 9, 31-36, and 40.

FIG. 41 is a perspective view of the cookbox 4000 of the grill of FIG. 40, showing the rotisserie basket 100 of FIGS. 1-9 and 31-40 transversely loaded onto the rotisserie spit 3000 of FIGS. 30-40, with the lid 104 of the rotisserie basket 100 shown in the open position of FIGS. 9, 31-36, and 40. In the illustrated example of FIG. 41, the first mounting bracket 106, the second mounting bracket 108, and/or, more generally, the base 102 of the rotisserie basket 100 has/have been transversely loaded onto the rotisserie spit 3000 by moving the first mounting bracket 106, the second mounting bracket 108, and/or, more generally, the base 102 of the rotisserie basket 100 away from the position shown in FIG. 40 and onto the rotisserie spit 3000 in and/or along the transverse direction 4018 shown in FIG. 40. Transversely loading the first mounting bracket 106, the second mounting bracket 108, and/or, more generally, the base 102 of the rotisserie basket 100 onto the rotisserie spit 3000 as shown in FIG. 41 results in the rotisserie spit 3000 (e.g., the third axial segment 3012 of the rotisserie spit 3000) being located within and extending laterally (e.g., axially) through the mounting channel 1006 of the first mounting bracket 106, the mounting channel 1606 of the second mounting bracket 108, and the divider channel 918 of the divider 906 of the rotisserie basket 100.

In the illustrated example of FIG. 41, the first fastener 110 has been moved from the unlocked position 2400 (e.g., as shown in FIGS. 24, 25, 31-33, and 40) into the locked position 2200 (e.g., as shown in FIGS. 22, 23, and 34-39), the first clip 114 has been moved from the open position 2402 (e.g., as shown in FIGS. 24, 25, 31-33, and 40) into the closed position 2202 (e.g., as shown in FIGS. 22, 23, and 34-39), the second fastener 112 has been moved from unlocked position 2800 (e.g., as shown in FIGS. 28, 29, 31-33, and 40) into the locked position 2600 (e.g., as shown in FIGS. 26, 27, and 34-39), and the second clip 116 has been moved from open position 2802 (e.g., as shown in FIGS. 28, 29, 31-33, and 40) into the closed position 2602 (e.g., as shown in FIGS. 26, 27, and 34-39). Positioning the first fastener 110 in the locked position 2200 securely couples the first mounting bracket 106 and/or, more generally, the base 102 of the rotisserie basket 100 to the rotisserie spit 3000 (e.g., to the third axial segment 3012 of the rotisserie spit 3000) such that the first mounting bracket 106 and/or, more generally, the base 102 rotate(s) along with the rotation (e.g., the motor-driven rotation) of the rotisserie spit 3000. Positioning the first clip 114 in the closed position 2202 provides a mechanical failsafe that prevents the first mounting bracket 106 and/or, more generally, the base 102 of the rotisserie basket 100 from inadvertently being transversely removed from the rotisserie spit 3000. Positioning the second fastener 112 in the locked position 2600 securely couples the second mounting bracket 108 and/or, more generally, the base 102 of the rotisserie basket 100 to the rotisserie spit 3000 (e.g., to the third axial segment 3012 of the rotisserie spit 3000) such that the second mounting bracket 108 and/or, more generally, the base 102 rotate(s) along with the rotation (e.g., the motor-driven rotation) of the rotisserie spit 3000. Positioning the second clip 116 in the closed position 2602 provides a mechanical failsafe that prevents the second mounting bracket 108 and/or, more generally, the base 102 of the rotisserie basket 100 from inadvertently being transversely removed from the rotisserie spit 3000.

Figure 42:
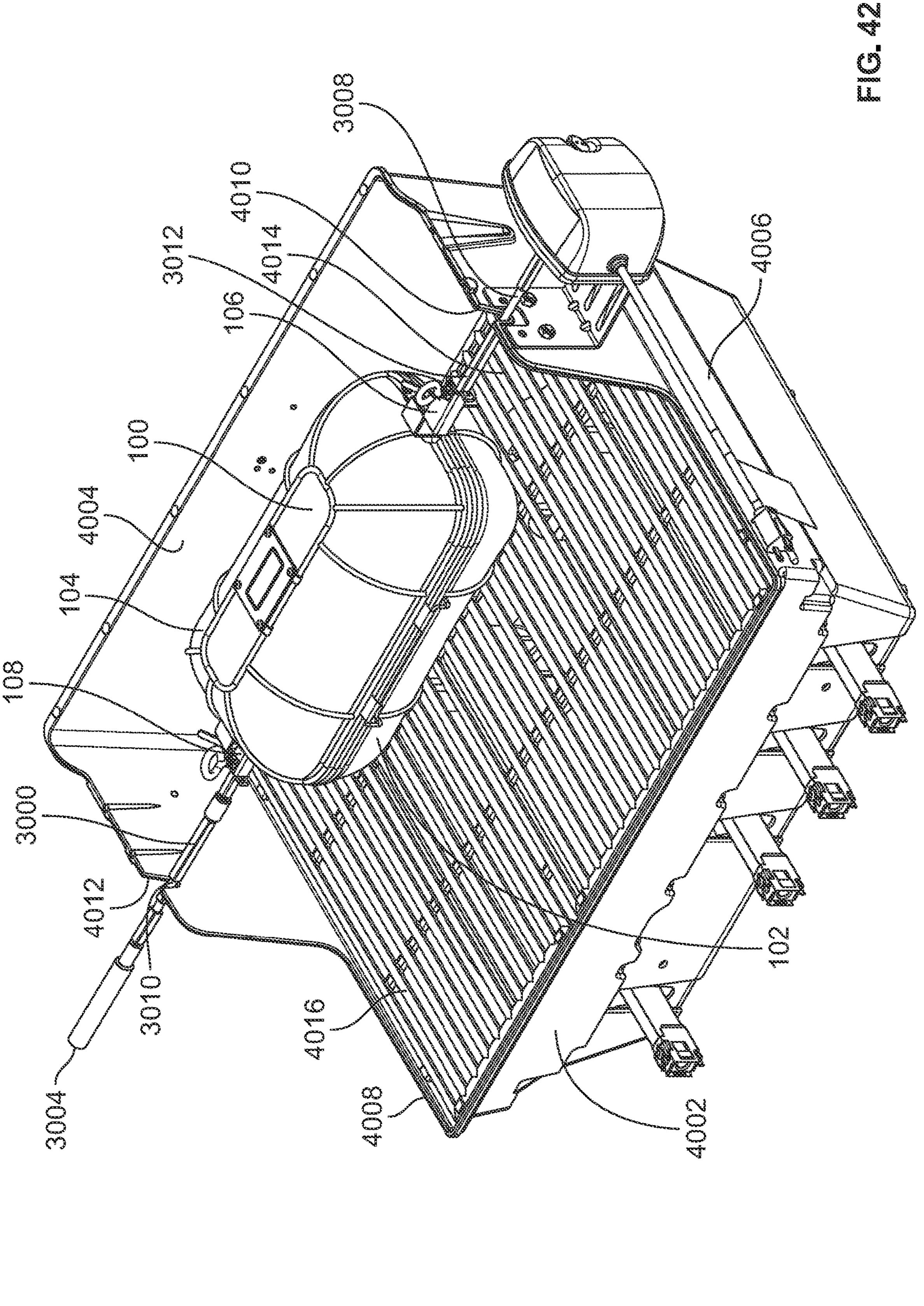
FIG. 42 is a perspective view of the cookbox of the grill of FIGS. 40 and 41, showing the rotisserie basket of FIGS. 1-9 and 31-41 transversely loaded onto the rotisserie spit of FIGS. 30-41, with the lid of the rotisserie basket shown in the closed position of FIGS. 1-8 and 37-39.

FIG. 42 is a perspective view of the cookbox 4000 of the grill of FIGS. 40 and 41, showing the rotisserie basket 100 of FIGS. 1-9 and 31-41 transversely loaded onto the rotisserie spit 3000 of FIGS. 30-41, with the lid 104 of the rotisserie basket 100 shown in the closed position of FIGS. 1-8 and 37-39. In the illustrated example of FIG. 42, the first fastener 110, the first clip 114, the second fastener 112, and the second clip 116 are respectively positioned in the same positions as shown and described above in connection with FIG. 41. Thus, the first fastener 110 is positioned in the locked position 2200 (e.g., as shown in FIGS. 22, 23, 34-39, and 41), the first clip 114 is positioned in the closed position 2202 (e.g., as shown in FIGS. 22, 23, 34-39, and 41), the second fastener 112 is positioned in the locked position 2600 (e.g., as shown in FIGS. 26, 27, 34-39, and 41), and the second clip 116 is positioned in the closed position 2602 (e.g., as shown in FIGS. 26, 27, 34-39, and 41).

As further shown in FIG. 42, the lid 104 of the rotisserie basket 100 has been moved relative to the base 102 of the rotisserie basket 100 from the open position of FIGS. 9, 31-36, 40, and 41 into the closed position of FIGS. 1-8 and 37-39. As a result of the lid 104 closure, the rotisserie spit 3000 (e.g., the third axial segment 3012 of the rotisserie spit 3000), in addition to being located within and extending laterally (e.g., axially) through the mounting channel 1006 of the first mounting bracket 106, the mounting channel 1606 of the second mounting bracket 108, and the divider channel 918 of the divider 906 of the rotisserie basket 100, is also located within and extends laterally (e.g., axially) through the first notch 148 and the second notch 210 of the frame 132 of the lid 104 of the rotisserie basket 100. In this regard, the first notch 148 and the second notch 210 of the frame 132 provide an additional or alternative mechanical failsafe (e.g., relative to the first clip 114 and the second clip 116) that prevents the rotisserie basket 100 from inadvertently being transversely removed from the rotisserie spit 3000 while the lid 104 remains closed. As further shown in FIG. 42, the first latch 502 and the second latch 602 of the base 102 of the rotisserie basket 100 have respectively been coupled to corresponding ones of the first catch 504 and the second catch 604 of the lid 104 of the rotisserie basket 100, thereby securely coupling the lid 104 of the rotisserie basket 100 to the base 102 of the rotisserie basket 100.

Example transversely-loadable rotisserie baskets are disclosed. In some disclosed examples, a rotisserie basket comprises a base and a lid coupled to the base. In some disclosed examples, the lid is movable relative to the base between an open position and a closed position. In some disclosed examples, the rotisserie basket further comprises a first mounting bracket coupled to a first side of the base, and a second mounting bracket coupled to a second side of the base located opposite the first side of the base. In some disclosed examples, the first mounting bracket and the second mounting bracket are respectively configured to be transversely loadable onto a rotisserie spit.

In some disclosed examples, the base includes a frame and a wire mesh. The frame has an upper rim, a lower rim located opposite the upper rim, and a plurality of support rods extending between the upper rim and the lower rim. The wire mesh extends between the upper rim and the lower rim, and is supported by the support rods.

In some disclosed examples, the lower rim is configured as a stabilization foot.

In some disclosed examples, the lid includes a frame and a wire mesh. The frame has a lower rim, an upper rim located opposite the lower rim, and a plurality of support rods extending between the lower rim and the upper rim. The wire mesh extends between the lower rim and the upper rim, and is supported by the support rods.

In some disclosed examples, the upper rim is configured as a stabilization foot.

In some disclosed examples, the base includes a hinge rod and the lid includes a hinge flange. The hinge flange is couplable to the hinge rod to removably hinge the lid to the base.

In some disclosed examples, the hinge rod is located along a front portion of the base, and the hinge flange is located along a front portion of the lid.

In some disclosed examples, the base includes a first catch and a second catch spaced apart from the first catch, and the lid includes a first latch and a second latch spaced apart from the first latch. The first latch is couplable to the first catch and the second latch is couplable to the second catch to selectively couple the lid to the base.

In some disclosed examples, the first catch is located along a right side portion of the base, the second catch is located along a left side portion of the base, the first latch is located along a right side portion of the lid, and the second latch is located along a left side portion of the lid.

In some disclosed examples, the rotisserie basket further comprises a divider located within an interior cavity of the base and an interior cavity of the lid. The divider is configured to separate a cooking chamber formed by the interior cavity of the base and the interior cavity of the lid into a first lateral portion and a second lateral portion.

In some disclosed examples, the divider includes a divider channel having an upper surface, a lower surface, a front surface, and a rear opening. The divider channel is configured to transversely receive the rotisserie spit via the rear opening of the divider channel.

In some disclosed examples, the first mounting bracket includes a mounting channel having an upper wall, a lower wall, a front wall, and a rear opening. The mounting channel of the first mounting bracket is configured to transversely receive the rotisserie spit via the rear opening of the mounting channel of the first mounting bracket.

In some disclosed examples, the second mounting bracket includes a mounting channel having an upper wall, a lower wall, a front wall, and a rear opening. The mounting channel of the second mounting bracket is configured to transversely receive the rotisserie spit via the rear opening of the mounting channel of the second mounting bracket.

In some disclosed examples, the mounting channel of the second mounting bracket is laterally aligned with the mounting channel of the first mounting bracket.

In some disclosed examples, the mounting channel of the first mounting bracket and the mounting channel of the second mounting bracket are respectively configured to transversely receive an axial segment of the rotisserie spit, the axial segment having a rectangular cross-sectional profile.

In some disclosed examples, the rotisserie basket further comprises a first fastener configured to be threadedly coupled to the first mounting bracket. In some disclosed examples, the rotisserie basket further comprises a second fastener configured to the threadedly coupled to the second mounting bracket.

In some disclosed examples, the first fastener is tethered to the first mounting bracket via a first cable extending between the first fastener and the first mounting bracket, and the second fastener is tethered to the second mounting bracket via a second cable extending between the second fastener and the second mounting bracket.

In some disclosed examples, the first fastener is movable relative to the first mounting bracket between a locked position that partially obstructs a forward portion of the mounting channel of the first mounting bracket and an unlocked position that does not obstruct the forward portion of the mounting channel of the first mounting bracket. In some disclosed examples, the second fastener is movable relative to the second mounting bracket between a locked position that partially obstructs a forward portion of the mounting channel of the second mounting bracket and an unlocked position that does not obstruct the forward portion of the mounting channel of the second mounting bracket.

In some disclosed examples, the rotisserie basket further comprises a first clip pivotably coupled to the first mounting bracket. In some disclosed examples, the first clip includes an engagement portion configured to be selectively positioned within a slot of the first mounting bracket. In some disclosed examples, the rotisserie basket further comprises a second clip pivotably coupled to the second mounting bracket. In some disclosed examples, the second clip includes an engagement portion configured to be selectively positioned within a slot of the second mounting bracket.

In some disclosed examples, the first clip is movable relative to the first mounting bracket between a closed position that obstructs a rearward portion of the mounting channel of the first mounting bracket and an open position that does not obstruct the rearward portion of the mounting channel of the first mounting bracket. In some disclosed examples, the second clip is movable relative to the second mounting bracket between a closed position that obstructs a rearward portion of the mounting channel of the second mounting bracket and an open position that does not obstruct the rearward portion of the mounting channel of the second mounting bracket.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A rotisserie basket, comprising:

a base;

a lid coupled to the base and movable relative to the base between an open position and a closed position;

a first mounting bracket integrally formed with the base, the first mounting bracket oriented orthogonally relative to and extending laterally away from a portion of the base that extends along a right side surface of the base, the first mounting bracket including a mounting channel having an upper wall, a lower wall, a front wall, and a rear opening, the mounting channel of the first mounting bracket configured to transversely receive a rotisserie spit via the rear opening of the mounting channel of the first mounting bracket;

a second mounting bracket integrally formed with the base, the second mounting bracket oriented orthogonally relative to and extending laterally away from a portion of the base that extends along a left side surface of the base, the second mounting bracket including a mounting channel having an upper wall, a lower wall, a front wall, and a rear opening, the mounting channel of the second mounting bracket configured to transversely receive the rotisserie spit via the rear opening of the mounting channel of the second mounting bracket, wherein the first mounting bracket and the second mounting bracket are respectively configured to be transversely loaded onto and securely coupled to the rotisserie spit while the lid of the rotisserie basket remains in the open position;

a first clip pivotably coupled to the first mounting bracket, the first clip including an engagement portion configured to be selectively positioned within a first slot formed in the upper wall of the mounting channel of the first mounting bracket, the first clip rotatable relative to the first mounting bracket between a closed position in which the engagement portion of the first clip is positioned within the first slot and in which the first clip obstructs a rearward portion of the mounting channel of the first mounting bracket, and an open position in which the engagement portion of the first clip is not positioned within the first slot and in which the first clip does not obstruct the rearward portion of the mounting channel of the first mounting bracket; and a second clip pivotably coupled to the second mounting bracket, the second clip including an engagement portion configured to be selectively positioned within a second slot formed in the upper wall of the mounting channel of the second mounting bracket, the second clip rotatable relative to the second mounting bracket between a closed position in which the engagement portion of the second clip is positioned within the second slot and in which the second clip obstructs a rearward portion of the mounting channel of the second mounting bracket, and an open position in which the engagement portion of the second clip is not positioned within the second slot and in which the second clip does not obstruct the rearward portion of the mounting channel of the second mounting bracket.

2. The rotisserie basket of claim 1, wherein the base includes a frame and a wire mesh, the frame having an upper rim, a lower rim located opposite the upper rim, and a plurality of support rods extending between the upper rim and the lower rim, the wire mesh extending between the upper rim and the lower rim, the wire mesh supported by the support rods, the first mounting bracket oriented orthogonally relative to and extending laterally away from a portion of the upper rim that extends along the right side surface of the base, the second mounting bracket oriented orthogonally relative to and extending laterally away from a portion of the upper rim that extends along the left side surface of the base.

3. The rotisserie basket of claim 2, wherein the lower rim is configured as a stabilization foot.

4. The rotisserie basket of claim 1, wherein the lid includes a frame and a wire mesh, the frame having a lower rim, an upper rim located opposite the lower rim, and a plurality of support rods extending between the lower rim and the upper rim, the wire mesh extending between the lower rim and the upper rim, the wire mesh supported by the support rods.

5. The rotisserie basket of claim 4, wherein the upper rim is configured as a stabilization foot.

6. The rotisserie basket of claim 1, wherein the base includes a hinge rod and the lid includes a hinge flange, the hinge flange couplable to the hinge rod to removably hinge the lid to the base.

7. The rotisserie basket of claim 6, wherein the hinge rod is located along a front portion of the base, and the hinge flange is located along a front portion of the lid.

8. The rotisserie basket of claim 1, wherein the base includes a first latch and a second latch spaced apart from the first latch, and the lid includes a first catch and a second catch spaced apart from the first catch, the first latch couplable to the first catch and the second latch couplable to the second catch to selectively couple the lid to the base.

9. The rotisserie basket of claim 8, wherein the first latch is located along a right side portion of the base, the second latch is located along a left side portion of the base, the first catch is located along a right side portion of the lid, and the second catch is located along a left side portion of the lid.

10. The rotisserie basket of claim 1, further comprising a divider located within an interior cavity of the base and an interior cavity of the lid, the divider configured to separate a cooking chamber formed by the interior cavity of the base and the interior cavity of the lid into a first lateral portion and a second lateral portion.

11. The rotisserie basket of claim 10, wherein the divider includes a divider channel having an upper surface, a lower surface, a front surface, and a rear opening, the divider channel configured to transversely receive the rotisserie spit via the rear opening of the divider channel.

12. The rotisserie basket of claim 1, wherein the mounting channel of the second mounting bracket is laterally aligned with the mounting channel of the first mounting bracket, and wherein the mounting channel of the first mounting bracket and the mounting channel of the second mounting bracket are respectively configured to transversely receive an axial segment of the rotisserie spit, the axial segment having a rectangular cross-sectional profile.

13. The rotisserie basket of claim 1, further comprising:

a first fastener configured to be threadedly coupled to the first mounting bracket; and a second fastener configured to be threadedly coupled to the second mounting bracket.

14. The rotisserie basket of claim 13, wherein the first fastener is tethered to the first mounting bracket via a first cable extending between the first fastener and the first mounting bracket, and the second fastener is tethered to the second mounting bracket via a second cable extending between the second fastener and the second mounting bracket.

15. The rotisserie basket of claim 13, wherein the first fastener is movable relative to the first mounting bracket between a locked position that partially obstructs a forward portion of the mounting channel of the first mounting bracket and an unlocked position that does not obstruct the forward portion of the mounting channel of the first mounting bracket, and wherein the second fastener is movable relative to the second mounting bracket between a locked position that partially obstructs a forward portion of the mounting channel of the second mounting bracket and an unlocked position that does not obstruct the forward portion of the mounting channel of the second mounting bracket.

16. The rotisserie basket of claim 1, wherein the first slot includes an expansion notch located at a closed end of the first slot, the engagement portion of the first clip being biased into the expansion notch of the first slot when the first clip is positioned within the first slot at the closed end of the first slot, and wherein the second slot includes an expansion notch located at a closed end of the second slot, the engagement portion of the second clip being biased into the expansion notch of the second slot when the second clip is positioned within the second slot at the closed end of the second slot.

17. A rotisserie basket, comprising:

a base;

a lid coupled to the base and movable relative to the base between an open position and a closed position;

a first mounting bracket coupled to the base, the first mounting bracket oriented orthogonally relative to and extending laterally away from a portion of the base that extends along a right side surface of the base, the first mounting bracket including a mounting channel having an upper wall, a lower wall, a front wall, and a rear opening, the mounting channel of the first mounting bracket configured to transversely receive a rotisserie spit via the rear opening of the mounting channel of the first mounting bracket;

a second mounting bracket coupled to the base, the second mounting bracket oriented orthogonally relative to and extending laterally away from a portion of the base that extends along a left side surface of the base, the second mounting bracket including a mounting channel having an upper wall, a lower wall, a front wall, and a rear opening, the mounting channel of the second mounting bracket configured to transversely receive the rotisserie spit via the rear opening of the mounting channel of the second mounting bracket, wherein the first mounting bracket and the second mounting bracket are respectively configured to be transversely loaded onto the rotisserie spit while the lid of the rotisserie basket remains in the open position;

a first fastener configured to be threadedly coupled to the first mounting bracket, the first fastener movable relative to the first mounting bracket between a locked position that partially obstructs a forward portion of the mounting channel of the first mounting bracket and an unlocked position that does not obstruct the forward portion of the mounting channel of the first mounting bracket;

a second fastener configured to be threadedly coupled to the second mounting bracket, the second fastener movable relative to the second mounting bracket between a locked position that partially obstructs a forward portion of the mounting channel of the second mounting bracket and an unlocked position that does not obstruct the forward portion of the mounting channel of the second mounting bracket;

a first clip pivotably coupled to the first mounting bracket, the first clip including an engagement portion configured to be selectively positioned within a first slot formed in the upper wall of the mounting channel of the first mounting bracket, the first clip rotatable relative to the first mounting bracket between a closed position in which the engagement portion of the first clip is positioned within the first slot and in which the first clip obstructs a rearward portion of the mounting channel of the first mounting bracket, and an open position in which the engagement portion of the first clip is not positioned within the first slot and in which the first clip does not obstruct the rearward portion of the mounting channel of the first mounting bracket; and a second clip pivotably coupled to the second mounting bracket, the second clip including an engagement portion configured to be selectively positioned within a second slot formed in the upper wall of the mounting channel of the second mounting bracket, the second clip rotatable relative to the second mounting bracket between a closed position in which the engagement portion of the second clip is positioned within the second slot and in which the second clip obstructs a rearward portion of the mounting channel of the second mounting bracket, and an open position in which the engagement portion of the second clip is not positioned within the second slot and in which the second clip does not obstruct the rearward portion of the mounting channel of the second mounting bracket.

18. The rotisserie basket of claim 17, wherein the first slot includes an expansion notch located at a closed end of the first slot, the engagement portion of the first clip being biased into the expansion notch of the first slot when the first clip is positioned within the first slot at the closed end of the first slot, and wherein the second slot includes an expansion notch located at a closed end of the second slot, the engagement portion of the second clip being biased into the expansion notch of the second slot when the second clip is positioned within the second slot at the closed end of the second slot.

19. The rotisserie basket of claim 17, wherein the mounting channel of the second mounting bracket is laterally aligned with the mounting channel of the first mounting bracket, and wherein the mounting channel of the first mounting bracket and the mounting channel of the second mounting bracket are respectively configured to transversely receive an axial segment of the rotisserie spit, the axial segment having a rectangular cross-sectional profile.

20. The rotisserie basket of claim 17, wherein the first fastener is tethered to the first mounting bracket via a first cable extending between the first fastener and the first mounting bracket, and the second fastener is tethered to the second mounting bracket via a second cable extending between the second fastener and the second mounting bracket.

* * * * *